(12) United States Patent
Downs et al.

(10) Patent No.: US 9,607,264 B2
(45) Date of Patent: *Mar. 28, 2017

(54) PROVIDING RECOMMENDATIONS USING INFORMATION DETERMINED FOR DOMAINS OF INTEREST

(71) Applicant: Atigeo LLC, Bellevue, WA (US)

(72) Inventors: Oliver B. Downs, Redmond, WA (US); Michael Sandoval, Kirkland, WA (US); Claudiu Alin Branzan, Timisoara (RO); Vlad Mircea Iovanov, Arad (RO); Sopurkh Singh Khalsa, Bellevue, WA (US)

(73) Assignee: Atigeo Corporation, Bellevue, WA (US)

( * ) Notice: Subject to any disclaimer, the term of this patent is extended or adjusted under 35 U.S.C. 154(b) by 982 days.

This patent is subject to a terminal disclaimer.

(21) Appl. No.: 13/847,970

(22) Filed: Mar. 20, 2013

(65) Prior Publication Data

US 2013/0325769 A1 Dec. 5, 2013

Related U.S. Application Data

(63) Continuation of application No. 12/636,630, filed on Dec. 11, 2009, now Pat. No. 8,429,106.

(Continued)

(51) Int. Cl.
*G06F 15/00* (2006.01)
*G06F 15/18* (2006.01)
(Continued)

(52) U.S. Cl.
CPC ........... *G06N 3/08* (2013.01); *G06F 17/2745* (2013.01); *G06F 17/2809* (2013.01); *G06N 7/005* (2013.01)

(58) Field of Classification Search
CPC .. G06F 17/2745; G06F 17/2809; G06F 15/00; G06F 15/18; G06N 3/08
(Continued)

(56) References Cited

U.S. PATENT DOCUMENTS 6,385,602 B1   5/2002   Tso et al.
6,408,290 B1   6/2002   Thiesson et al.
(Continued)

OTHER PUBLICATIONS

Fiaidhi, J. et al., "A Standard Framework for Personalization via Ontology-Based Query Expansion," Pakistan Journal of Information and Technology, 2 (2): pp. 96-103, 2003, retrieved on Feb. 24, 2009, from http://www.scialert.net/pdfs/itj/2003/96-103.pdf?sess=jJghHkjfd76K8JKHgh76JG7FHGDredhgJgh7GkjH7Gkjg57KJhT&userid=jhfgJKH78Jgh7GkjH7Gkjg57KJhT68JKHgh76JG7Ff.
(Continued)

*Primary Examiner* — Stanley K Hill
*Assistant Examiner* — Peter Coughlan
(74) *Attorney, Agent, or Firm* — Seed IP Law Group LLP

(57) ABSTRACT

Techniques are described for determining and using information related to domains of interest, such as by automatically analyzing documents and other information related to a domain in order to automatically determine relationships between particular terms within the domain. Such automatically determined information may then be used to assist users in obtaining information from the domain that is of interest (e.g., documents with contents that are relevant to user-specified terms and/or to other terms that are determined to be sufficiently related to the user-specified terms). For example, recommendations may be automatically generated for a user by using information about specified preferences or other interests of the user with respect to one or more terms and identifying other particular terms that are sufficiently probable to be of interest to that user, such as based on a generated probabilistic representation of relationships between particular terms for the domain.

13 Claims, 32 Drawing Sheets

Related U.S. Application Data

(60) Provisional application No. 61/122,282, filed on Dec. 12, 2008.

(51) Int. Cl.
  G06N 3/08 (2006.01)
  G06F 17/27 (2006.01)
  G06F 17/28 (2006.01)
  G06N 7/00 (2006.01)

(58) Field of Classification Search
  USPC .......................................................... 706/62
  See application file for complete search history.

(56) References Cited

U.S. PATENT DOCUMENTS

| | | | |
|---|---|---|---|
| 6,560,590 | B1 | 5/2003 | Shwe et al. |
| 2002/0107853 | A1* | 8/2002 | Hofmann .......... G06F 17/30699 |
| 2002/0129014 | A1 | 9/2002 | Kim et al. |
| 2003/0204496 | A1 | 10/2003 | Ray et al. |
| 2005/0058261 | A1* | 3/2005 | Baumard ............. G06Q 10/107 379/67.1 |
| 2005/0165753 | A1* | 7/2005 | Chen ................. G06F 17/30867 |
| 2006/0122994 | A1 | 6/2006 | Kapur et al. |
| 2007/0106659 | A1 | 5/2007 | Lu et al. |
| 2007/0130109 | A1 | 6/2007 | King et al. |
| 2007/0266019 | A1 | 11/2007 | Lavi |
| 2008/0009268 | A1 | 1/2008 | Ramer et al. |
| 2009/0216696 | A1 | 8/2009 | Downs et al. |

OTHER PUBLICATIONS

Riezler, S. et al., "Statistical Machine Translation for Query Expansion in Answer Retrieval," retrieved on Feb. 24, 2009, from http://www.scialert.net/pdfs/itj/2003/96-103.pdf?sess=jJghHkjfd76K8JKHgh76JG7FHGDredhgJgh7GkjH7Gkjg57KjhT &userid=jhfgJKH78Jgh7GkjH7Gkjg57KJhT68JKHgh76JG7Ff, 8 pages.

Amazon.Com, Statistically Improbable Phrases, retrieved on Feb. 24, 2009, from http://www.amazon.com/gp/search-inside/sipshelp. html, 1 page.

Choicestream.com, About ChoiceStream, retrieved on Feb. 24, 2009, from http://www.choicestream.com/company/, 2 pages.

Matchmine.com, Frequently Asked Questions, retrieved on Feb. 24, 2009, from http://web.archive.org/web/20071026055031rn_1/ www.matchmine.com/help/, 2 pages.

Peltarion, Applications of Adaptive Systems, retrieved on Feb. 24, 2009. from http://www.peltarion.com/doc/index. php?title=Applications_of_adaptive_systems, 7 pages.

Strands, Company Overview, retrieved on Feb. 24, 2009, from http://corp.strands.com/, 1 page.

Strands, History and Name, retrieved on Feb. 24, 2009, from http://corp.strands.com/history, 2 pages.

Query Expansion—Wikipedia, retrieved on Feb. 24, 2009, from http://en.wikipedia.org/wiki/Query_expansion, 3 pages.

Recommender System—Wikipedia, retrieved on Feb. 24, 2009, from http://en.wikipedia.org/wiki/Recommendation_engine, 4 pages.

tf-idf—Wikipedia, retrieved on Feb. 24, 2009, from http://en. wikipedia.org/wiki/Tf-idf, 3 pages.

Burke, R., "Hybrid Recommender System: Survey and Experiments," User Modeling and User-Adaptive Interaction, 12(4), Nov. 2002, pp. 331-370.

Zhang, S., et al., "An Online Personalized Recommendation Model Based on Bayesian Networks," 2007, retrieved on Aug. 21, 2009, from http://www.springerlink.com/content/r827252065g60728/, pp. 1575-1584.

Branzan, C., et al., "Relevance Networks for Cold Start Interference of User Preferences," 2010, http://snowbirb.djvuzone.org/2010/ posters.html, 2 pages.

\* cited by examiner

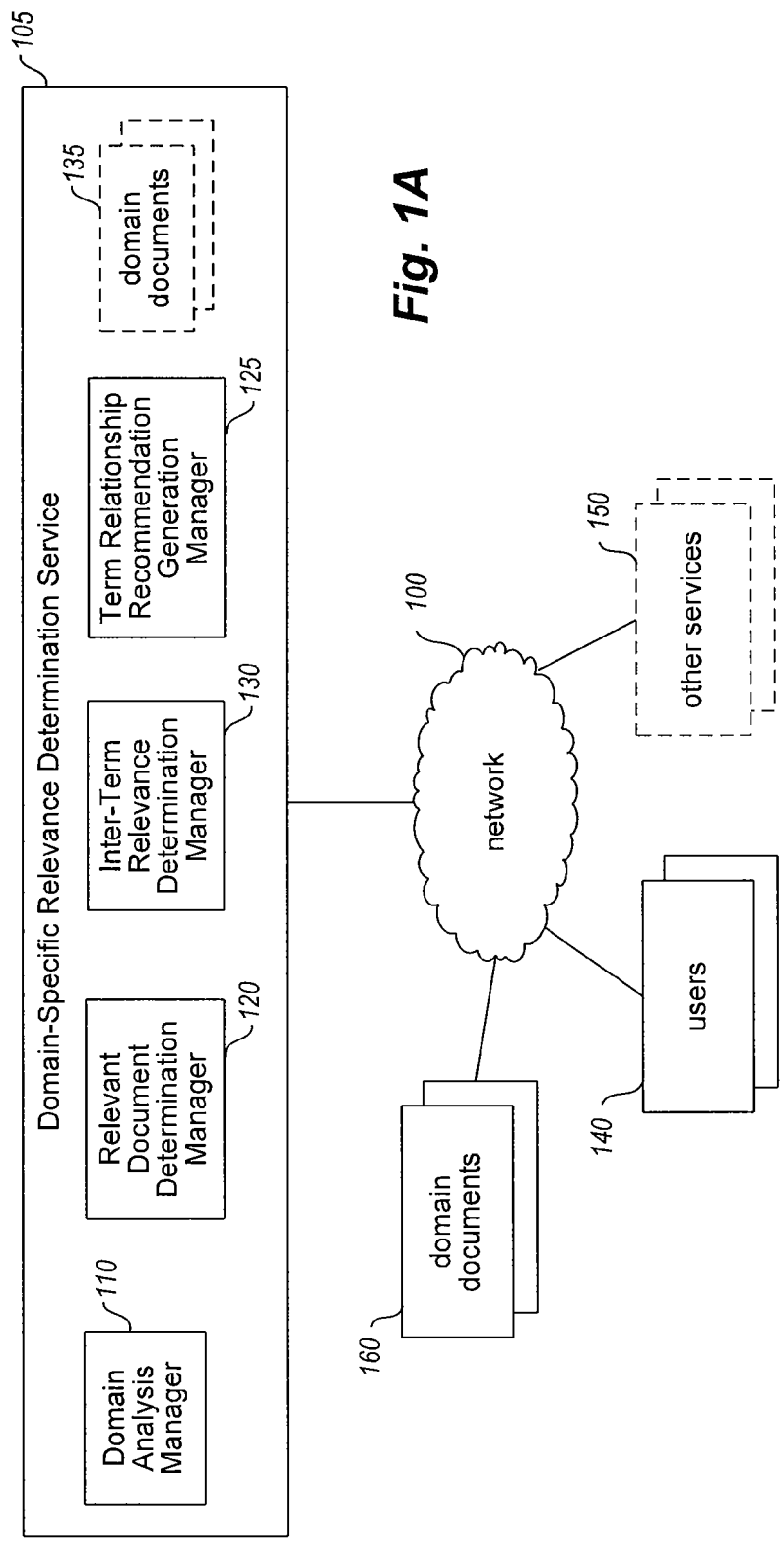

Example Document Corpus (1000 Baseball-Related Documents)

200

| | 202a | 202b | 202c | 202d |
|---|---|---|---|---|
| | Terms | Term ID | Number Of Documents | IDF |
| 204a | the | 1 | 1000 | 0.00 |
| 204b | baseball | 2 | 980 | 0.01 |
| 204c | home run | 3 | 100 | 1.00 |
| 204d | Bonds | 4 | 80 | 1.10 |
| 204e | Barry | 5 | 79 | 1.10 |
| 204f | Bobby | 6 | 40 | 1.40 |
| 204g | Giants | 7 | 60 | 1.22 |
| 204h | steroids | 8 | 40 | 1.40 |
| 204i | indictment | 9 | 25 | 1.60 |
| 204j | Hank Aaron | 10 | 10 | 2.00 |
| | ... | | | |

Example Document 1 (Bonds HR Record)

210

| | 212a | 212b | 212c | 212d | 212e |
|---|---|---|---|---|---|
| | Terms | Occurrences | TF (%) | IDF | TF-IDF |
| 214a | Bonds | 35 | 2.33 | 1.10 | 2.559 |
| 214b | home run | 20 | 1.33 | 1.00 | 1.333 |
| 214c | Hank Aaron | 5 | 0.33 | 2.00 | 0.667 |
| 214d | Giants | 5 | 0.33 | 1.22 | 0.407 |
| 214e | Barry | 5 | 0.33 | 1.10 | 0.367 |
| 214f | steroids | 3 | 0.20 | 1.40 | 0.280 |
| 214g | Bobby | 1 | 0.07 | 1.40 | 0.093 |
| 214h | baseball | 6 | 0.40 | 0.01 | 0.004 |
| 214i | the | 100 | 6.67 | 0.00 | 0.000 |
| 214j | indictment | 0 | 0.00 | 1.60 | 0.000 |
| | ... | | | | |
| 214z | TOTAL | 1500 | | | |

Example Document 2 (Barry Bonds Biography)

220

| | 222a | 222b | 222c | 222d | 222e |
|---|---|---|---|---|---|
| | Terms | Occurrences | TF (%) | IDF | TF-IDF |
| 224a | Bonds | 30 | 1.88 | 1.10 | 2.057 |
| 224b | home run | 18 | 1.13 | 1.00 | 1.125 |
| 224c | Hank Aaron | 3 | 0.19 | 2.00 | 0.375 |
| 224d | Giants | 4 | 0.25 | 1.22 | 0.305 |
| 224e | Barry | 4 | 0.25 | 1.10 | 0.276 |
| 224f | Bobby | 2 | 0.13 | 1.40 | 0.175 |
| 224g | steroids | 2 | 0.13 | 1.40 | 0.175 |
| 224h | baseball | 10 | 0.63 | 0.01 | 0.005 |
| 224i | indictment | 0 | 0.00 | 1.60 | 0.000 |
| 224j | the | 110 | 6.88 | 0.00 | 0.000 |
| | ... | | | | |
| 224z | TOTAL | 1600 | | | |

Example Document 3 (Bonds Indictment)

230

| | 232a | 232b | 232c | 232d | 232e |
|---|---|---|---|---|---|
| | Terms | Occurrences | TF (%) | IDF | TF-IDF |
| 234a | Bonds | 40 | 2.67 | 1.10 | 2.925 |
| 234b | steroids | 19 | 1.27 | 1.40 | 1.771 |
| 234c | indictment | 10 | 0.67 | 1.60 | 1.068 |
| 234d | Giants | 4 | 0.27 | 1.22 | 0.326 |
| 234e | Barry | 4 | 0.27 | 1.10 | 0.294 |
| 234f | home run | 4 | 0.27 | 1.00 | 0.267 |
| 234g | baseball | 14 | 0.93 | 0.01 | 0.008 |
| 234h | Hank Aaron | 0 | 0.00 | 2.00 | 0.000 |
| 234i | Bobby | 0 | 0.00 | 1.40 | 0.000 |
| 234j | the | 70 | 4.67 | 0.00 | 0.000 |
| | ... | | | | |
| 234z | TOTAL | 1500 | | | |

*Figure 2A*

Example Document 4 (Canseco Testimony)

| | Terms | Occurrences | TF (%) | IDF | TF-IDF |
|---|---|---|---|---|---|
| 244a | steroids | 33 | 1.74 | 1.40 | 2.432 |
| 244b | Canseco | 28 | 1.47 | 1.65 | 2.431 |
| 244c | McGwire | 2 | 0.11 | 1.70 | 0.179 |
| 244d | Bonds | 2 | 0.11 | 1.10 | 0.116 |
| 244e | home run | 3 | 0.16 | 1.00 | 0.158 |
| 244f | baseball | 14 | 0.74 | 0.01 | 0.007 |
| 244g | Giants | 0 | 0.00 | 1.22 | 0.000 |
| 244h | Hank Aaron | 0 | 0.00 | 2.00 | 0.000 |
| 244i | indictment | 0 | 0.00 | 1.60 | 0.000 |
| 244j | the | 85 | 4.47 | 0.00 | 0.000 |
| | ... | | | | |
| 244z | TOTAL | 1900 | | | |

Example Document 5 (2008 SF Giants)

| | Terms | Occurrences | TF (%) | IDF | TF-IDF |
|---|---|---|---|---|---|
| 254a | Giants | 9 | 1.13 | 1.22 | 1.373 |
| 254b | Sabean | 4 | 0.50 | 1.55 | 0.775 |
| 254c | Lincecum | 5 | 0.63 | 1.20 | 0.750 |
| 254d | Zito | 3 | 0.38 | 1.20 | 0.450 |
| 254e | Barry | 3 | 0.38 | 1.10 | 0.413 |
| 254f | Bonds | 1 | 0.13 | 1.10 | 0.138 |
| 254g | home run | 1 | 0.13 | 1.00 | 0.125 |
| 254h | baseball | 2 | 0.25 | 0.01 | 0.003 |
| 254i | Bobby | 0 | 0.00 | 1.40 | 0.000 |
| 254j | steroids | 0 | 0.00 | 1.40 | 0.000 |
| | ... | | | | |
| 254z | TOTAL | 800 | | | |

*Figure 2B*

Example Document Relevance Identification

265a Query Terms: Bonds steroids

| | | |
|---|---|---|
| 267a | Example Minimum TF-IDF for Bonds: | 0.000 |
| 267b | Example Maximum TF-IDF for Bonds: | 3.000 |
| 267c | Example Minimum TF-IDF for steroids: | 0.000 |
| 267d | Example Maximum TF-IDF for steroids: | 2.500 |

Normalized Document Relevance Numbers

| | documents 262 | 262a | 262b | 262c | 262d | 262e | |
|---|---|---|---|---|---|---|---|
| terms 264 | 261a | Document 1 | Document 2 | Document 3 | Document 4 | Document 5 | ... |
| 264a | Bonds | 0.85 | 0.69 | 0.98 | 0.04 | 0.05 | |
| 264b | steroids | 0.11 | 0.07 | 0.71 | 0.97 | 0.00 | |
| 264x | TOTAL | 0.48 | 0.38 | 0.84 | 0.51 | 0.02 | |

*Figure 2C*

Example Query Results

260

266 Query Terms: Bonds steroids

269

| | Document Relevance | Document |
|---|---|---|
| 269a | 84% (highly relevant) | Document 3 |
| 269b | 51% (moderately relevant) | Document 4 |
| 269c | 48% (moderately relevant) | Document 1 |
| 269d | 38% (somewhat relevant) | Document 2 |

⋮

268

Expand query to further describe theme?

[ Yes ]   [ No ]

*Figure 2D*

Example Term Relevance Expansion

265a Query Terms: Bonds steroids

Possible Additional Related Terms

|  | documents 272 | 272a | 272b | 272c | 272d | 272e |
|---|---|---|---|---|---|---|
| terms 274 | 270 | Document 1 | Document 2 | Document 3 | Document 4 | AVERAGE |
| 274a | home run | 1.333 | 1.125 | 0.267 | 0.158 | 0.721 |
| 274b | indictment | 0.000 | 0.000 | 1.068 | 0.000 | 0.267 |
| 274c | Hank Aaron | 0.667 | 0.375 | 0.000 | 0.000 | 0.261 |
| 274d | Giants | 0.407 | 0.305 | 0.326 | 0.000 | 0.260 |
| 274e | Barry | 0.367 | 0.276 | 0.294 | 0.000 | 0.234 |
| 274f | Canseco | 0.000 | 0.000 | 0.000 | 0.695 | 0.174 |

*Figure 2E*

Example Query Expansion

275

276 Query Terms: Bonds steroids

279

| | Term Relevance (0-10) | Term |
|---|---|---|
| 279a | 8 | home run |
| 279b | 4 | indictment |
| 279c | 4 | Hank Aaron |
| 279d | 4 | Giants |
| 279e | 3 | Barry |
| | ⋮ | |

*Figure 2F*

Example Revised Document Relevance Identification

265b  Query Terms: Bonds steroids "home run" "Hank Aaron"

Normalized Document Relevance Numbers

| input terms 264 | documents 262 261b | 262a Document 1 | 262b Document 2 | 262c Document 3 | 262d Document 4 | 262e Document 5 | ... |
|---|---|---|---|---|---|---|---|
| 264a | Bonds | 0.85 | 0.69 | 0.98 | 0.04 | 0.05 | |
| 264b | steroids | 0.11 | 0.07 | 0.71 | 0.97 | 0.00 | |
| 264c | home run | 0.95 | 0.80 | 0.19 | 0.11 | 0.09 | |
| 264d | Hank Aaron | 0.74 | 0.42 | 0.00 | 0.00 | 0.00 | |
| 264y | TOTAL | 0.66 | 0.49 | 0.47 | 0.28 | 0.03 | |

*Figure 2G*

Example Revised Document Relevance Identification

265c  Query Terms: Bonds steroids indictment Canseco

Normalized Document Relevance Numbers

| terms 264 | documents 262 261c | 262a Document 1 | 262b Document 2 | 262c Document 3 | 262d Document 4 | 262e Document 5 | ... |
|---|---|---|---|---|---|---|---|
| 264a | Bonds | 0.85 | 0.69 | 0.98 | 0.04 | 0.05 | |
| 264b | steroids | 0.11 | 0.07 | 0.71 | 0.97 | 0.00 | |
| 264g | indictment | 0 | 0 | 0.76 | 0 | 0 | |
| 264h | Canseco | 0 | 0 | 0 | 0.97 | 0 | |
| 264z | TOTAL | 0.24 | 0.19 | 0.61 | 0.50 | 0.01 | |

*Figure 2H*

Example Relevant Document Information

| terms 914 \ documents 912 | Document 1 (912a) | Document 2 (912b) | Document 3 (912c) | Document 4 (912d) | Document 5 (912e) | ... |
|---|---|---|---|---|---|---|
| 914a home run | X | X | | | | |
| 914b indictment | X | | | | | |
| 914c Hank Aaron | X | | X | | | |
| 914d Bonds | X | X | X | X | | |
| 914e steroids | | | X | X | | |
| 914f Canseco | | | | | | |
| 914g Giants | X | | | | X | |
| ... | | | | | | |

*Figure 9D*

Example Related Term Information

| input terms 924 \ output terms 922 | 922a home run | 922b indictment | 922c Hank Aaron | 922d Bonds | 922e steroids | 922f Canseco | 922g Giants | ... |
|---|---|---|---|---|---|---|---|---|
| 924a home run | - | 0.000 | 0.521 | 2.308 | 0.228 | 0.000 | 0.356 | |
| 924b indictment | 0.267 | - | 0.000 | 2.925 | 1.771 | 0.000 | 0.326 | |
| 924c Hank Aaron | 1.333 | 0.000 | - | 2.559 | 0.280 | 0.000 | 0.397 | |
| 924d Bonds | 0.908 | 0.356 | 0.347 | - | 0.742 | 0.000 | 0.346 | |
| 924e steroids | 0.213 | 0.534 | 0.000 | 1.521 | - | 1.216 | 0.163 | |
| 924f Canseco | 0.158 | 0.000 | 0.000 | 0.116 | 2.432 | - | 0.000 | |
| 924g Giants | 0.329 | 0.000 | 0.333 | 1.349 | 0.140 | 0.000 | - | |
| ... | | | | | | | | |

*Figure 9E*

Example Prior Probability Information

| Prior Probability Of Interest In Giants |
|---|
| 0.10 |

992g

| Prior Probability Of Interest In Hank Aaron | Prior Probability Of Lack of Interest In Hank Aaron |
|---|---|
| 0.05 | 0.95 |

Example Conditional Probability Information

| | Interest In Hank Aaron | Interest In Giants | Interest In Home Run | ... | Probability Of Interest In Bonds |
|---|---|---|---|---|---|
| 994a-a | no | no | no | | 0.12 |
| 994a-b | no | no | yes | | 0.88 |
| 994a-c | no | yes | no | | 0.60 |
| 994a-d | no | yes | yes | | 0.84 |
| 994a-e | yes | no | no | | 0.29 |
| 994a-f | yes | no | yes | | 0.92 |
| 994a-g | yes | yes | no | | 0.29 |
| 994a-h | yes | yes | yes | | 0.96 |

994a-1, 994a-2, 994a-3, 994a-4

994a

| | Interest In Hank Aaron | Probability Of Interest In Home Run |
|---|---|---|
| 994d-a | yes | 0.88 |
| 994d-b | no | 0.23 |

Example Updated Probability Information

994a

| | Interest In Hank Aaron | Interest In Giants | Interest In Home Run | ... | Probability Of Interest In Bonds |
|---|---|---|---|---|---|
| 994a-a | no | no | no | | 0.09 |
| 994a-b | no | no | yes | | 0.88 |
| 994a-c | no | yes | no | | 0.60 |
| 994a-d | no | yes | yes | | 0.84 |
| 994a-e | yes | no | no | | 0.29 |
| 994a-f | yes | no | yes | | 0.87 |
| 994a-g | yes | yes | no | | 0.29 |
| 994a-h | yes | yes | yes | | 0.96 |

992b

| Prior Probability Of Interest In Hank Aaron | Prior Probability Of Lack of Interest In Hank Aaron |
|---|---|
| 0.18 | 0.82 |

*Figure 9K*

PROVIDING RECOMMENDATIONS USING INFORMATION DETERMINED FOR DOMAINS OF INTEREST

CROSS-REFERENCE TO RELATED APPLICATIONS

This application claims the benefit of provisional U.S. Patent Application No. 61/122,282, filed Dec. 12, 2008 and entitled "Determining Relevant Information For Domains Of Interest," which is hereby incorporated by reference in its entirety.

TECHNICAL FIELD

The following disclosure relates generally to automatically determining information for users.

BACKGROUND

With the current abundance of available information, locating documents and other information that match interests of a user can be difficult. One option for attempting to locate documents involves performing searches using various Web-based search engines. A typical Web search involves a user providing a search query that includes one or more search terms to a search engine, with the search query in some situations also including one or more logical search operators (e.g., "AND", "OR", "NOT", an indication that a particular search term is required, etc.) that are each related to one or more of the search terms. After receiving such a search query, the search engine typically identifies at least some available documents whose contents match the search query (e.g., the contents include each of the required search terms), generates one or more Web pages that include links to one or more of the identified documents, and provides one or more of the generated Web pages to the user as search results for the search query. In addition, different users entering the same search string typically receive the same search results.

Various techniques are used by search engines to identify documents whose contents match particular search terms. For example, some search engines do automated pre-processing prior to receiving search requests in order to create an index that maps terms to Web pages whose contents include those terms. Such pre-processing typically uses an automated program called a "Web spider" that crawls the Web to identify documents to index, such as by traversing links from known Web pages to new Web pages. In addition, some search engines use manual categorization of documents to track which Web pages are related to specified categories and/or terms, such as via a hierarchical directory of categories and sub-categories. Thus, search results from a search engine may be based in some cases on information from an automatically pre-generated index and/or from a manually pre-generated category directory.

However, existing search engines and other techniques for identifying information of interest to users suffer from various problems.

BRIEF DESCRIPTION OF THE DRAWINGS

FIGS. 1A-1C illustrate examples of techniques for determining relevance information related to domains of interest.

FIGS. 2A-2M illustrate examples of techniques for automatically determining and using relevance information related to an example domain of interest.

DETAILED DESCRIPTION

Figure 1B:
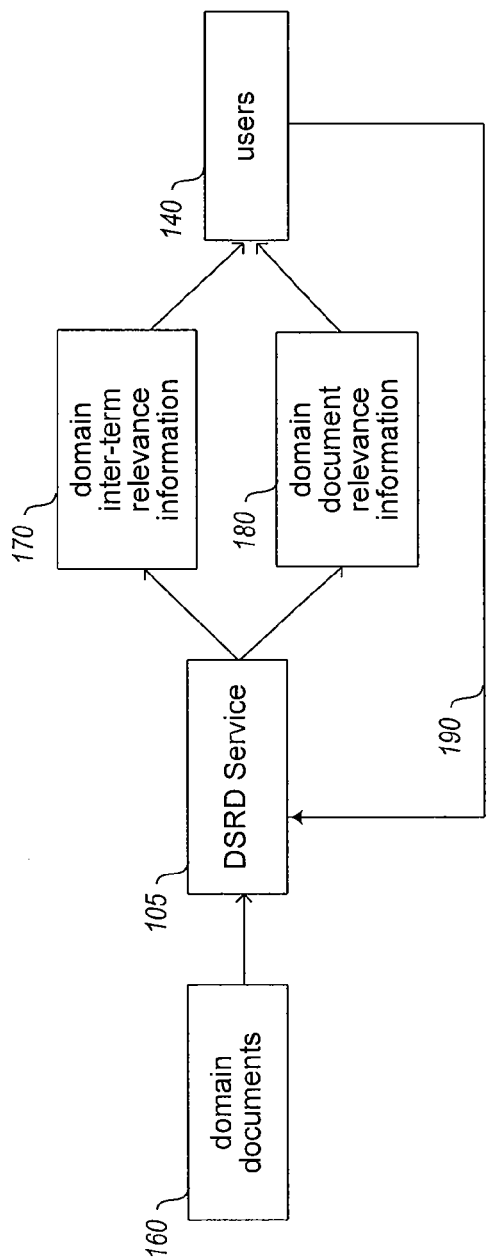

Techniques are described for determining and using relevant information related to topics and subject areas of interest, also referred to as domains of interest herein. In at least some embodiments, the techniques include automatically analyzing documents and other content items related to one or more related domains of interest in order to automatically determine information about relevant terms within the domain, such as to determine relationships between particular terms, as well as to determine which content items have contents that are relevant to particular terms. Such automatically determined relevance information for the domain(s) may then be used in various ways, including to assist users in obtaining information of possible positive interest to those users (e.g., content items with contents that are relevant to user-specific terms and/or to other terms that are determined to be sufficiently related to the user-specific terms) and/or to assist users in avoiding information of possible negative interest to those users. For example, in at least some embodiments, the automatically determined relevance information for the domain(s) may be used to generate a Bayesian network or other probabilistic representation of relationships between particular terms, such that information about specified preferences of a user with respect to one or more terms and/or other information specific to the user may be used to automatically determine the probabilities that other particular terms may also be of interest to that user, such as for use in providing user-specific recommendations or other suggestions to that user. As discussed in greater detail below, terms, preferences and content items may have various forms in various embodiments. Furthermore, in at least some situations, the techniques may be used in conjunction with an embodiment of a computer-implemented Domain-Specific Relevance Determination ("DSRD") service that automatically determines relevance information related to domains of interest and/or uses such determined relevance information to provide user-specific recommendations or other suggestions of information that is likely to be of interest to particular users, as described in greater detail below.

In at least some embodiments, the described techniques include automatically analyzing documents and/or other content items related to a domain of interest in order to automatically determine information about relevant terms within the domain, such as to determine relevant relationships between particular terms (e.g., to determine multi-term themes within the domain, or more generally to determine concepts within the domain that may each include or otherwise be associated with one or more terms). In at least some embodiments, the relationships between terms may be automatically determined based at least in part on the use of various terms in content items related to a domain of interest, and the analysis of the various content items may include generating an index that relates the contents of particular content items to particular terms. While various of the following discussion refers to content items as being "documents," it will be appreciated that the described techniques may be used with a wide variety of types of content items, including, for example, textual documents (e.g., Web pages, word processing documents, slide shows and other presentations, emails and other electronic messages, etc.), images, video files, audio files, software code, firmware and other logic, genetic codes that each accompany one or more sequences of genetic information, other biological data, etc. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; measurements of physical properties; mathematical equations and mathematical data structures; other types of alphanumeric data structures and/or symbolic data structures; encrypted data; etc.). Thus, the terms that are included in the contents of content items or otherwise associated with content items may have various forms in various embodiments, including individual textual words, combinations of multiple textual words (e.g., multi-term phrases; tuples of multiple words in a defined relationship, such as a semantic triple that includes a subject, object and a preference relationship between the subject and object; etc.), or in some embodiments any other type of recognizable data, feature, property or other attribute that is part of the contents of those content items or that is otherwise associated with those content items, as discussed in greater detail elsewhere. Furthermore, in at least some of the following discussion, references are generally made to relationships between terms, which are intended to cover groups of one or more terms unless otherwise indicated, such that a particular relationship may be between a first group of one or more first terms (e.g., related to a first concept with one or more associated terms, or otherwise to a first multi-term theme or a first aggregate term made up of a specified string or other combination of multiple other terms) and a second group of one or more second terms (e.g., related to a second concept with one or more associated terms, or otherwise to a second theme or a second aggregate term). In addition, as described in greater detail below, in some embodiments the described techniques include identifying one or more terms that reflect known preferences of a user, and automatically attempting to identify additional terms that reflect additional preferences of the user that have not been explicitly identified, such as based at least in part on the relationships between the known preference terms and the possible additional term preferences. Such known preference terms and/or possible additional term preferences may have various forms in various embodiments (e.g., as noted above, a term may reflect any type of recognizable data, feature, property or other attribute that is part of the contents of interest or that is otherwise associated with that content), and may reflect a positive interest (e.g., a preference for) a particular term and/or a negative interest (e.g., a preference against) a particular term. Furthermore, known preferences of a user may include not only terms that are explicitly identified by the user as being of positive or negative interest, but in some embodiments may include terms for which some positive or negative interest may be inferred for a particular user (e.g., based on actions of the user, such as searching for or otherwise selecting particular terms), or more generally may include any information known about or otherwise associated with a particular user (e.g., demographic information for the user, such as age, sex, gender, etc.; accomplishments or activities of the user; etc.).

In at least some embodiments, a group of multiple documents that are specific to a domain are selected and automatically analyzed by an embodiment of the DSRD service. The group of documents may be, for example, a corpus that includes all available documents for a particular domain or that includes sufficient documents to be representative of the domain. In addition, the documents to be analyzed may be obtained from one or more sources, such as from a Web site that includes comprehensive information specific to one or more domains (e.g., a hypothetical "all-baseball-now.com" Web site that includes comprehensive information about baseball, the "espn.com" Web site that includes varied information about a variety of sports, the "imdb.com" Web site that includes varied information about a variety of movies and television shows, the Wikipedia encyclopedia Web site at "wikipedia.org" and Wikipedia Commons media collection Web site at "commons.wikipedia.org" and Wikinews news source Web site at "wikinews.org" that include varied information about a large number of domains, etc.). In some embodiments, each of the documents has contents that are at least partially textual information that are analyzed.

The automated analysis of documents for a domain may in at least some embodiments include analyzing the contents of the documents in order to determine relationships between terms that are relevant to the domain, including in some embodiments to identify themes or other concepts that are relevant to the domain, such as by using data mining techniques or other techniques. For example, if the documents being analyzed are related to the baseball domain, terms may be specific to particular players, to particular teams, to particular leagues (e.g., Major League Baseball, Division I college baseball, etc.), to particular events or situations (e.g., a particular year's All-Star game or World Series, the steroid use controversy, etc.), to particular seasons, to particular records (e.g., the cumulative home run record), etc. Furthermore, relationships between terms may reflect at least some such information, such as to identify relationships corresponding to multiple players on a given team, to multiple teams that have a historical rivalry, to particular players or teams associated with particular events or records, etc.

In at least some embodiments, the automated analysis of documents for a domain to identify relevant terms includes indexing the documents to determine what terms are present in each of the documents, and then analyzing the importance of some or all such terms to the documents. For example, in at least some embodiments, an initial determination of a degree of relevance of each term in a document to the document is made based on the distinctiveness of the term to the contents of the document, such as by using a term frequency-inverse document frequency ("TF-IDF") analysis. In addition, combinations of one or more related terms used throughout the group of documents may be selected to represent themes or other concepts of the domain, such as for the most relevant terms and/or inter-term relationships, and the determined degree of relevance of the one or more related terms for a theme or a concept to one or more documents may be used to determine a degree of relevance of the one or more documents to the theme or concept, as discussed in greater detail below. While some examples and embodiments below discuss the use of multi-term themes in various manners, it will be appreciated that such discussion equally applies to the use of determined concepts having one or more associated terms, as discussed in greater detail elsewhere. Furthermore, as discussed in greater detail elsewhere, the terms or other information that are associated with a document or other content item and that are analyzed may in some embodiments include other types of information, including information that is not included in the contents of the content item, such as metadata associated with the content item and/or information associated with one or more users to whom the content item corresponds.

In addition, in some embodiments, the automated analysis of documents for a domain to identify relevant terms may include one or more other techniques, whether instead of or in addition to using a TF-IDF analysis or similar technique to determine the degree of relevance of each term in a document to the document contents. For example, the automated analysis of the contents of one or more documents may in some embodiments include performing a statistical analysis to identify terms that are distinctive in the contents of the one or more documents relative to other contents (e.g., other documents in the domain, a baseline set of contents used to represent the domain, etc.), such as to identify statistical outliers (e.g., terms that may be considered to have a high signal-to-noise ratio relative to other terms), or to otherwise identify terms that are relevant relative to other terms. In addition, in situations in which the documents for a domain are changing (e.g., based on new documents becoming available, such as to reflect current news or other recently available information), the automated analysis of the changing documents may be used in some embodiments to identify newly relevant terms (e.g., new relevant terms that are introduced in the changing documents, previously existing terms whose relevance increases in the changing documents, etc.). Such newly relevant terms may in some situations reflect "hot topics" of interest, and the changing documents used to identify such newly relevant terms may have various forms in various embodiments (e.g., news feeds; social networking site pages; blog postings; opt-in information sharing systems, such as Twitter; etc.). Furthermore, as discussed in greater detail below, when particular terms are identified as being relevant (e.g., for newly relevant terms), the described techniques may identify particular users for whom such particular terms are relevant, and provide documents or other content that are identified as being related to those particular terms to those particular users (e.g., by pushing or otherwise providing recommendations to those particular users of that identified content, by including that identified content as part of information provided to those particular users in response to requests from those particular users, etc.). The identification of particular users for whom particular terms are relevant may be performed in various manners in various embodiments, such as by identifying particular users whose known preferences include those particular terms, by analyzing information about the known user preferences of one or more users (e.g., all users) in order to determine the likelihood that the particular terms are additional terms reflecting unknown user preferences of those users, etc.

As noted above, the generation of document term analysis information may be performed in various manners in various embodiments, and in some embodiments uses a TF-IDF analysis. Such a TF-IDF analysis uses a vector space representation of the documents to be analyzed, in which each document is treated as being similar to a "bag of words," without considering the role of the terms in the document (e.g., without considering grammar, sentence structure, paragraph structure, punctuation, etc.). In such situations, the document representation may largely or solely reflect the Term Frequency ("TF") of the terms in the documents, which enables an efficient mapping of documents into a mathematically straightforward high-dimensional vector space. In addition, the distinctiveness of a particular term relative to the various documents for a domain may be considered and used when determining the relevance of terms to documents, such as by considering how ubiquitous a particular term is in the documents of a corpus or other group of documents. In particular, the Term Frequency of a term i in a document d and the Inverse Document Frequency ("IDF") of the term i across the documents of a domain may be expressed as follows in at least some embodiments:

$$TF(i,d) = \frac{\text{\# occurrence } s \text{ of term } i \text{ in document } d}{\text{\# terms in document } d},$$

$$IDF(i) = -\log\left(\frac{\text{\# documents containing term } i}{\text{\# documents}}\right)$$

The Term Frequency-Inverse Document Frequency ("TF-IDF" or "TF.IDF") score for a term and a document may then be determined by multiplying the TF score for the term and document and the IDF score for the term. Such a TF-IDF(i,d) score (also shown as "TF-IDF$_{i,d}$" or "TF.IDF$_{i,d}$") for a particular term i and a particular document d may be used as a measurement of how important that term in the vector space representation is in describing the fingerprint of that document in the corpus, such as to reflect a degree of relevance of that term to that document. It is a metric that ranks highly words that occur frequently in a specific document, but infrequently in the corpus as a whole.

The automated analysis of the documents for a domain may in at least some embodiments include analyzing the contents of selected documents in order to determine which documents have contents that are relevant to identified terms and/or determined themes for the domain. For example, in at least some embodiments, an initial determination of the relevance of the selected documents may be performed so as to determine a degree of relevance of each document to each of some or all terms or themes, such as based on the relevance of particular terms within a theme to the content of a particular document, as discussed in greater detail below. In addition, in some embodiments the documents that are selected to be analyzed as part of the document relevance determination are the same documents that were previously analyzed to determine inter-term relationships, while in other embodiments some or all of the selected document relevance determination documents are distinct from the inter-term relevance determination documents (e.g., if the document relevance determination documents include new documents that were not available during a prior inter-term relevance determination; if the inter-term relevance determination documents are a specialized subset of documents that are selected for training purposes, such as due to being representative of a domain; etc.). Furthermore, in at least some embodiments and situations, groups of multiple related documents may be analyzed together with respect to some or all terms and/or themes, such as by treating the multiple related documents as a single document for the purpose of the analysis, while in other situations a particular document may be divided into multiple parts that are each treated as a distinct document with respect to some or all terms and/or themes for the purpose of the analysis. Additional details are included below related to analyzing documents of a domain in order to determine documents that are relevant to identified terms and/or determined themes.

After documents for a domain are automatically analyzed to determine their relevance to particular terms, such relevance information may be used to further identify relationships between particular terms in at least some embodiments. For example, in at least some embodiments, the relationship between two terms may be determined based at least in part on the individual relevance of those terms to various of the documents (e.g., such that two terms that are both highly relevant to one or more common documents may be determined to be likely to be highly relevant to each other, and such that two terms that are not both highly relevant to any of the same documents may be determined to be likely to be of little relevance to each other). Thus, in embodiments in which the relevance of particular documents to particular terms is identified based at least in part on TF-IDF scores, the determination of relationships between terms may similarly be based at least in part of the TF-IDF scores. Particular manners of generating scores or other representations of the relevance of the relationships of terms are discussed in greater detail below, including in manners other than based on TF-IDF scores.

After relevance information is automatically determined by the DSRD service regarding relationships between terms within or across one or more domains, such automatically determined relevance information may then be used in various ways in various embodiments. For example, in at least some embodiments, the relevance information regarding the inter-term relationships for one or more domains is used to automatically generate a Bayesian network or other probabilistic representation of the relationships between selected terms, such as for the relationships that are identified as being the strongest or otherwise the most relevant. Such generation of the probabilistic representation information may be performed in various manners, as discussed in greater detail below, and may include selecting various particular first terms that each have sufficiently high assessed degrees of relevance to other second terms that an influence is represented from those first terms to the corresponding second terms, and may include generating probability information that represents a strength of those represented influences. In particular, the structure of a Bayesian network reflects the probabilistic dependencies of each node, and provides a framework in which to perform inference on the status of each node, as discussed in greater detail below. After the probabilistic representation information is generated, it may be used to automatically determine the probability or other measure of likelihood that a particular user has a positive or negative preference for, or other interest (whether positive or negative), in a particular target term, given a known positive or negative preference for or other interest (whether positive or negative) of that user in one or more other terms. Thus, such known preferences or interest of a particular user in particular terms may be treated as evidence of the likelihood of other unexpressed preferences or interests of that user in such target terms (e.g., other preferences or interests of which that user is aware but which are unknown to the DSRD service, other preferences or interests of which that user is not explicitly aware, etc.), from which particular unexpressed preferences or interests for particular target terms may be inferred.

In some embodiments, the determination of the likely interest of a particular user in one or more target terms based on a known or suspected interest of that particular user in one or more other terms used as evidence may be further based at least in part on information about other users that have known or suspected levels of interest in both the evidence terms and target terms, such as in a manner analogous to collaborative filtering techniques (e.g., based on user feedback and automated learning techniques, as discussed in greater detail below). In other embodiments, however, such a determination of the likely interest of a particular user in the one or more target terms based on the known or suspected interest of that particular user in the one or more other evidence terms is performed without the use of any information about other users' levels of interest in both the evidence terms and target terms, or more generally in some cases without the use of any information about other users' levels of interest in any of the target terms—in such embodiments, the described techniques may be of particular use in addressing the so-called "cold start" recommendation problem in which inferences cannot typically be initially made for collaborative filtering and other recommendation techniques due to lack of data regarding users' preferences in an area of interest. The use of such automatically generated relevance information from analysis of domain-related documents may further be used in some embodiments and situations to extend the ability to provide meaningful user-specific recommendations or other suggestions to a new domain of interest for which little or no user preference information is yet available, such as by leveraging available preference information for one or more other domains that have at least some overlap with the new domain, as discussed in greater detail below. Furthermore, even if initial determinations of the likely interest in target terms based on known interests in other evidence terms is performed without the use of any information about users' actual levels of interest in both the evidence terms and target terms, subsequent determinations may be updated to incorporate information that is learned about users' actual levels of interest in both the evidence terms and target terms, as discussed below.

After such relevance information regarding probabilistic relationships between terms within or across one or more domains is determined (e.g., as expressed using a probabilistic representation of those inter-term relationships), the relevance information may be used in various manners, including to assist a human user (or other entity) in obtaining recommendations or other suggestions of documents and/or other information that is likely to be of interest to the user, based on information about the user's preferences for or interests related to particular terms. For example, one or more particular target terms for which a user's preference is unknown may be automatically selected as being of likely interest to the user based on that user's known interests, such as target terms for which the determined probability or other likelihood of interest is above a defined threshold or otherwise satisfies one or more specified criteria, based on the use of the determined probabilistic inter-term relationships and given those known interests. Such automatically selected target terms may then be used in various manners, including to provide recommendations or other suggestions or indications of information of interest to that user (e.g., indications of documents that are relevant to those selected target terms; indications of those selected target terms, such as for selection by the user to indicate an interest or disinterest in that target term, or to indicate that a particular target term should be combined as part of a common theme with the other known terms to which the selected target terms are particular relevant; etc.). In addition, the automatically determined relevance information may be used in various other manners in various embodiments, such as by receiving one or more terms from a user and presenting related information to the user (e.g., themes that include the received terms, etc.), by presenting a list of automatically determined themes or other inter-term relationships to a user for browsing or selection or other feedback, etc. Thus, automatically determined relevance information based on documents within a domain may be used by the DSRD service or other affiliated service to assist a human user or other entity (e.g., an automated program) external to the DSRD service in obtaining content related to one or more terms of explicit or inferred interest, such as in response to a search query, by pushing or otherwise providing relevant information to a user that is not explicitly requested (e.g., based on previously specified preferences for receiving information), etc. Furthermore, information about the inter-relatedness of various terms may be displayed to users in various manners in various embodiments.

In addition, in at least some embodiments, information about how automatically determined inter-term relevance information and/or document relevance information is used by users or other entities is tracked and used in various ways. For example, in at least some embodiments, the information about the use of the automatically determined inter-term and/or document information may be used by the DSRD service as feedback related to the automatically determined inter-term and/or document relevance information. Such feedback may be used, for example, to revise the initial determination of the relevance of particular terms and inter-term relationships, and/or to revise the initial determination of the relevance of particular documents to determined terms, and such revised determined relevance information may then be used by the DSRD service or other affiliated service in a manner similar to that as the initially determined relevance information. Similarly, such feedback may be used, for example, to revise Bayesian networks, decision trees, and/or other probabilistic representations of inter-term relationships, and such revised determined inter-term relationship probabilistic representations may then be used by the DSRD service or other affiliated service in a manner similar to that as the initially determined probabilistic representation information. In this manner, a one-time feedback occurrence, or instead continuous or other repeated feedback loop, may be used to repeatedly improve the automatic relevance determinations performed by the DSRD service. As described in greater detail below, in some embodiments the feedback is used to learn or revise automatically determined inter-term relationship information and/or document relevance information, such as by use of a configured neural network or other adaptive model or system, and/or by updating a configured Bayesian network or decision tree or other probabilistic representation data structure. Furthermore, in at least some embodiments and situations, the configured neural network or other adaptive system may be automatically extended in various ways to use information about new documents that become available and/or new inter-term relationships that are determined.

For illustrative purposes, some examples and embodiments are described below in which specific types of information are analyzed in specific manners, and in which determined information related to a particular domain is used in specific manners. These examples are provided for illustrative purposes and are simplified for the sake of brevity, and it will be appreciated that the inventive techniques may be used in a wide variety of other situations, some of which are described in greater detail below. For example, while the analysis of particular textual documents is described below, information in other forms may be similarly analyzed and used. In addition, while particular algorithms and technologies are illustrated as being used to determine relevant inter-term relationships and/or themes within or across one or more domains, to determine particular documents that are relevant to terms and/or themes, and to learning improved relevance based on actual use and other feedback, other algorithms and technologies may be used in other manners.

Figure 1C:
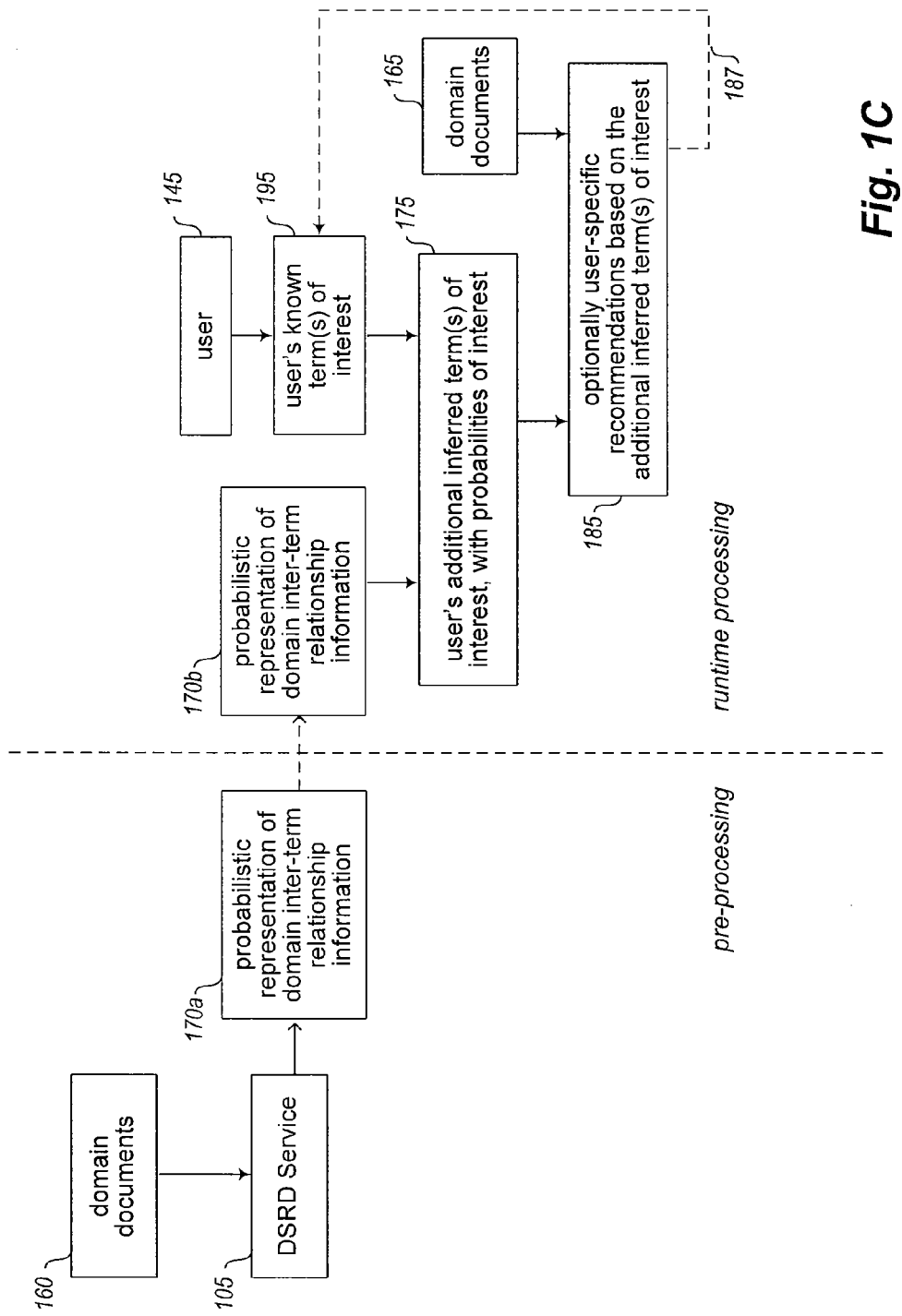

FIGS. 1A-1C illustrate examples of an automated domain-specific relevance determination service that uses the described techniques to determine relevance information related to domains of interest and to provide related information and functionality to users or other entities. In particular, FIG. 1B illustrates an embodiment of a DSRD service 105, along with a high-level description of example data flow to and from the DSRD service 105 as part of determining and using relevant domain-specific information. In this example, the DSRD service 105 accesses and analyzes various documents 160 related to one or more domains of interest in order to determine relevance information related to each of the domains. The determined relevance information that is generated by the DSRD service 105 in this example includes information 170 about relevant inter-term relationships within each of one or more domains (e.g., information about multi-term themes), and information 180 about which documents have contents that are relevant to various terms, although in other embodiments only one of the types of relevance information may be determined. As discussed in greater detail elsewhere, including with respect to FIG. 1C, the determined inter-term relevance information 170 may include data stored in various forms, including one or more inter-term neural networks, one or more Bayesian networks or other probabilistic representations of relationships between terms, one or more decision trees that encapsulate information about probabilistic or other relationships between particular terms, etc.

In this example, the DSRD service 105 provides at least some of the determined relevant inter-term relationship information 170 and/or at least some of the determined relevant document information 180 to various users 140 for their use, such as by indicating documents that are relevant to user-specified query terms, by indicating suggestions of other terms that may be relevant to user-specified terms, etc. While not illustrated here, in other embodiments the DSRD service 105 may instead provide the determined relevant inter-term relationship information 170 and/or the determined relevant document information 180 to the users 140 and/or other entities in one or more other manners, such as via one or more intermediate other services (e.g., other services that obtain the relevant domain-specific information from the DSRD service 105 and use it in various ways). Furthermore, in this example, the DSRD service 105 may obtain various feedback or other information 190 related to the use by the users 140 (or other entities) of the determined relevant domain-specific information 170 and/or 180, whether directly from the users 140 or instead from one or more intermediate other services, and may use that feedback to refine the determined relevant domain-specific information 170 and/or 180. It will be appreciated that the receiving of the feedback information and/or the use of received feedback information to the determined relevant domain-specific information may occur in various manners in various embodiments and situations, including in an incremental and dynamic manner, or instead in a batch manner (e.g., from an intermediate other service that gathers such information and periodically provides it to the DSRD service 105). Additional details related to the various data flow and actions of the DSRD service 105 are described in greater detail elsewhere, including with respect to example embodiments discussed in FIGS. 2A-2M and FIGS. 9A-9N.

FIG. 1A illustrates additional example details regarding one embodiment of the DSRD service 105 of FIG. 1B. In particular, in the example of FIG. 1A, the documents that are accessed and analyzed by the example DSRD service 105 documents may include domain documents 160 that are accessible over a network 100 (e.g., publicly accessible from one or more Web sites or other information sources) and/or optional domain documents 135 to which the DSRD service 105 has specialized access (e.g., domain documents that are generated by or otherwise provided by the service 105; domain documents that are available from a third-party source but that are not publicly accessible, such as if available for paid access or based on a defined relationship between the service 105 and the third-party source; etc.). Furthermore, after determining the relevance information for one or more domains, the DSRD service 105 further interacts over the network 100 with the various users 140 and/or with one or more optional other services 150 (e.g., other affiliated services that interact with users 140 and that use information provided by the DSRD service 105).

In addition, in this example, the DSRD service 105 includes several modules that each provides some of the functionality of the DSRD service 105, including a Domain Analysis Manager module 110, a Relevant Document Determination Manager module 120, an Inter-Term Relevance Determination Manager module 130, and a Term Relationship Recommendation Generation Manager module 125. In particular, the Domain Analysis Manager module 110 performs various actions to obtain and automatically analyze the contents of the domain-related documents, such as to make such analyzed information available for use by the modules 120 and 130. The Relevant Document Determination Manager module 120 uses the analyzed document information to determine documents that are relevant to particular terms or other themes, such as to generate the domain document relevance information 180 of FIG. 1B (not shown in FIG. 1A, but which may be stored on one or more storage devices, also not shown in FIG. 1A). Similarly, the Inter-Term Relevance Determination Manager module 130 uses the analyzed document information to determine inter-term relationships that are relevant to the domain, such as to generate the domain inter-term relevance information 170 of FIG. 1B (not shown in FIG. 1A, but which may be stored on one or more storage devices, also not shown in FIG. 1A), although in other embodiments may determine at least some of the inter-term relationship information in manners other than based on document-related information. The Term Relationship Recommendation Generation Manager module 125 then generates information for use in determining user-specific recommendations or other suggestions based on inter-term relationships, such as to generate the probabilistic representations 170a and/or 170b of inter-term relationship information of FIG. 1C (not shown in FIG. 1A, but which may be stored on one or more storage devices, also not shown in FIG. 1A). The information generated by the module 125 may be based at least in part on the determined inter-term relationship information from the module 130, and the module 125 may further optionally use the generated information to determine user-specific recommendations or other suggestions for users in some embodiments. In this illustrated embodiment, the modules 120, 130 and/or 125 may then provide the generated domain-specific relevance information and/or determined user-specific recommendations or other suggestions to the users 140 or optional other services 150, such as via provided GUIs ("graphical user interfaces") that users may interactively use and/or via provided APIs ("application programming interfaces") via which software programs may programmatically interact. In other embodiments, other modules may be present, such as a module 127 (not shown) that determines content items that are relevant to particular indicated terms of interest, or one or more other modules (not shown) of the DSRD service 105 that may instead interact with the users 140 and/or optional other services 150 via one or more GUIs and/or one or more APIs that are provided by the DSRD service 105 (such as on behalf of other of the modules 110-130).

The DSRD service 105 may be implemented in various manners, including with one or more software modules that have software instructions for execution on one or more computing systems (not shown in FIG. 1A), and may store various information on one or more local or remote storage devices (not shown). For example, in some embodiments the DSRD service 105 may be implemented on a single computing system, while in other embodiments the DSRD service 105 may be implemented in a distributed manner (e.g., with different modules 110-130 each executing on different computing systems, but interacting directly or via shared data storage locations; with one or more of the modules 110-130 each being distributed across multiple computing systems, such as to have multiple alternative implementations of a module on different computing systems that operate on distinct sets of data relative to the other alternative implementations of the same module; etc.), such as using cloud computing techniques and/or in a peer-to-peer manner. Similarly, the users 140, other services 150, and domain documents 160 may use or be associated with computing devices or systems (not shown) to perform the various described interactions and/or to store the various described information. In addition, while the DSRD service 105 and other services 150 may be provided by unaffiliated entities in some embodiments, in other embodiments the DSRD service 105 and one or more of the other services 150 may instead be provided by a single operator (e.g., in conjunction with each other). Furthermore, the network 100 illustrated in FIG. 1A may have various forms, such as, for example, a publicly accessible network of linked networks (e.g., the Internet), possibly operated by various distinct parties. In other embodiments, the network 100 may be a private network, such as, for example, a corporate or university network that is wholly or partially inaccessible to non-privileged users. In still other embodiments, the network 100 may include one or more private networks with access to and/or from the Internet, and some or all of the network 100 may further include broadband or broadcast wired or wireless links (e.g., a cellular telephone connection; a wireless computer connection that uses Wi-Fi, Wi-MAX, Bluetooth, broadcast analog or digital television, EVDO, satellite or other wireless networking or communication protocol; etc.) in at least some embodiments.

In addition, the various users 140 and other entities may interact with the DSRD service 105 in various manners to make requests and to specify various information. For example, users may register or subscribe with the DSRD service 105 and/or an optional other service 150, such as to supply various term-related preferences and other information that may be used in later requests. In such embodiments, after a user interacts with the DSRD service 105 to register, the user may be issued one or more identifiers (e.g., keys, tokens, user names, etc.) that are associated with the user and later used when other requests are made, such as requests for search results for specified queries. In addition, in some embodiments, an optional other service 150 may register or otherwise interact with the DSRD service 105 to establish an affiliated relationship, such as to allow the other service 150 to obtain access to at least some domain-specific relevance information generated by the DSRD service 105. Furthermore, various fees may be associated with the use of a DSRD service, such that the DSRD service may respond to at least some requests in exchange for fees paid by the requester, such as to provide domain-specific relevance information to an optional other service 150 in exchange for fees from the other service 150, or to provide domain-specific relevance information to a user 140 in exchange for fees from the user. In other embodiments, the DSRD service 105 may obtain fees in other manners, such as from the providers of domain-specific documents and other content to perform a relevance determination related to that content and/or for providing user-specific recommendations of such domain-specific documents and other content to particular users, from other third-parties such as advertisers and retailers (e.g., for providing advertisements or other indicated content to at least some users 140), etc.

FIG. 1C illustrates additional example details regarding one embodiment of actions that may be performed by the DSRD service 105 of FIGS. 1A and 1B. In particular, FIG. 1B illustrates that an embodiment of the DSRD service 105 analyzes various domain documents 105 for one or more domains in order to generate various domain inter-term relationship relevance information 170, which optionally may be modified and/or supplemented based on feedback from various users 140. As illustrated in additional detail in FIG. 1C, in at least some embodiments, the generated domain inter-term relevance information 170 may include a probabilistic representation 170a (e.g., a Bayesian network) of at least some of the relationships between at least some of the terms, and further that the generation of the information 170a may optionally occur as part of pre-processing activities to enable later run-time use of the generated information. Thus, in this example, the generation of the information 170a may occur at a first time, and at a later second time a copy 170b of at least some of the generated information 170a may be used for run-time activities that include generating user-specific recommendations or other suggestions based in part on the generated information 170b. The copy 170b may, for example, be configured or optimized for run-time use, such as by encoding particular portions of a generated Bayesian network 170a in each of numerous decision trees that represent the various portions, as discussed in greater detail with respect to FIGS. 9A-9N. Furthermore, the use of the generated information 170b in determining and providing the user-specific recommendations or other suggestions may be performed in various manners, including by the DSRD service 105 and/or by one or more other services.

In this example, during the runtime processing, information 195 is obtained for a particular user 145, such as to indicate preferences of the user 145 for one or more terms related to the one or more domains to which the domain documents 160 correspond. The user 145 may be one of the users 140 that optionally provided feedback as part of generating the information 170a as discussed with respect to FIG. 1B, or may instead be an unrelated user. In addition, the information 195 about the user's known preferences for (or other interest in) particular terms may be obtained in various manners, such as based on terms indicated by the user as part of a search query, terms selected by the user to represent topics of interest to the user, terms that are part of a document that the user specifies as being of interest, terms that are extracted from a profile of the user or other information related to the user, etc. The service (not shown) performing the runtime processing activities may then use the user-specific term preference information 195 and the non-user-specific inter-term relationship information 170b to identify one or more additional user-specific terms 175 that are inferred to be of interest to the user based on the various inter-term relationships, optionally with information to indicate the corresponding probability that each of the additional terms will be of interest to the particular user 145.

After the additional term(s) 175 are identified, they may be used in various manners, including to optionally provide user-specific recommendations or other suggestions 185 to the user 145. The user-specific recommendations or other suggestions may have various forms in various embodiments. For example, in at least some embodiments, some or all of the user-specific recommendations/suggestions may be some or all of the additional inferred terms 175, such as to enable the user 145 to specify that particular ones of the additional inferred terms are actually of interest or not, to specify that particular ones of the additional inferred terms should be combined with the known terms of interest 195 as part of a common theme, etc. In other embodiments, some or all of the user-specific recommendations/suggestions may be particular domain documents or other content items selected from a group of candidate domain documents 165 based on some or all of the additional inferred terms of interest 175, such as to include those selected domain documents as part of search results provided to the user 145, or to otherwise enable the user 145 to obtain access to the selected domain documents. As discussed in greater detail elsewhere, the candidate domain documents 165 may be of various types, such as to include some or all of the domain documents 160 used to generate the inter-term relationship information 170a and 170b, to not include any of the domain documents 160 but to include other documents that are related to the same one or more domains to which the domain documents 160 correspond, to include documents that are related to one or more additional domains that are distinct from the one or more initial domains to which the domain documents 160 correspond (e.g., additional domains that include documents with terms having at least some overlap with terms in the initial domains, such as to extend automatically determined inter-term relationships for the initial domains to provide initial recommendations or other suggestions for the additional domains despite having limited or no information about actual user interests for the additional domains), etc. While not explicitly illustrated in FIG. 1C, additional information may in some embodiments be obtained from the user that reflects the user's positive or negative interest in one or more of the additional inferred term(s) of interest (e.g., based on the user's selections or other indications in response to the optional providing of the user-specific recommendations 185), and if so optional feedback 187 may be used to update the user's known term(s) of interest 195 based on that additional information obtained from the user. In other embodiments, the user-specific information 195 may be updated at times even without specific confirmation or other indications from the user, such as if the probability that an additional term is of interest to the user exceeds a defined threshold or is otherwise sufficiently high. Furthermore, while not illustrated in FIG. 1C, feedback from users and other entities may similarly in some embodiments be used to update the domain inter-term relevance information 170a and 170b, as discussed in greater detail with respect to FIG. 1B.

While FIG. 1C illustrates the use of the automatically determined inter-term relationship information 170 with respect to a single user 145, it will be appreciated that the generating and providing of the user-specific recommendation or other suggestion information may be provided for a variety of users at various times. Similarly, the generated information 170a and/or 170b may be updated at various times (e.g., periodically, when new domain documents 160 become available, based on user feedback that is received, etc.), such that the most recent version of the generated information 170b is used to provide information to particular users 145. In addition, the automatically determined inter-term relationship information 170 may be used in various other manners in other embodiments (e.g., search query term expansion, identifying corrections for common misspellings, clarifying user-specific preferences, determining domain-specific multi-term themes, etc.), as discussed in greater detail elsewhere.

Figure 9A:
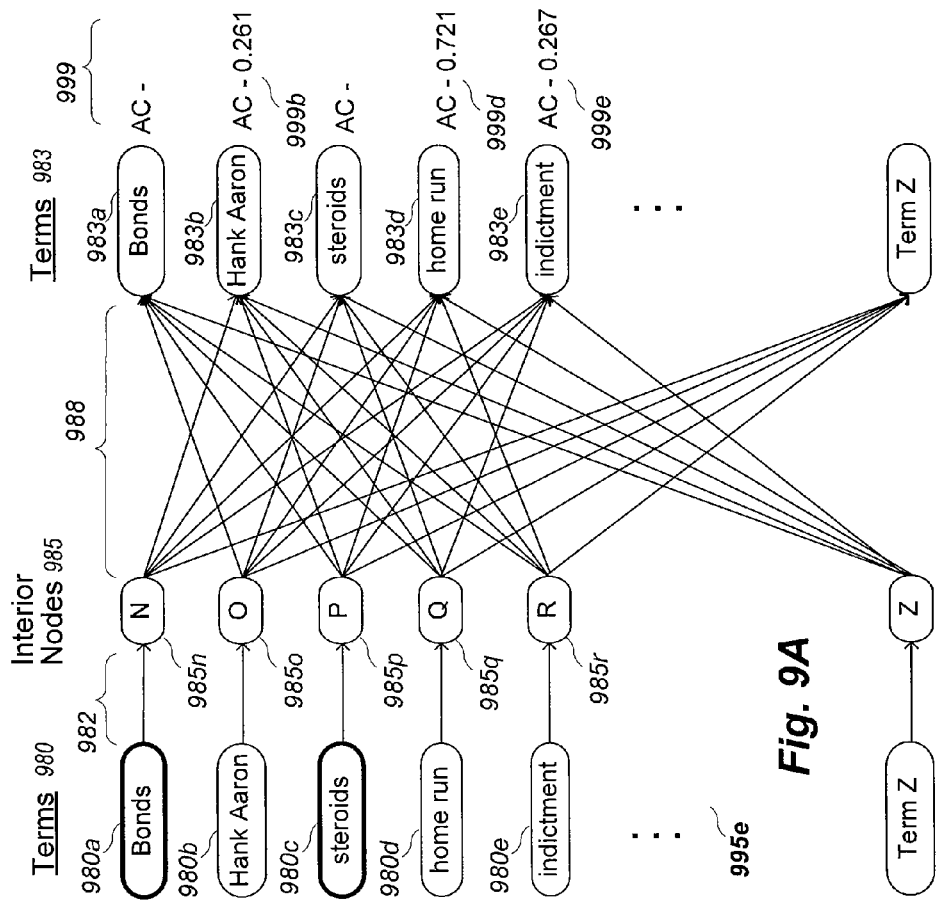
FIGS. 9A-9N illustrate examples of techniques for automatically determining user-specific information of likely interest to particular users for one or more example domains of interest, such as based on automatically determined relevance information related to at least one of the example domains of interest.
Figure 9B:
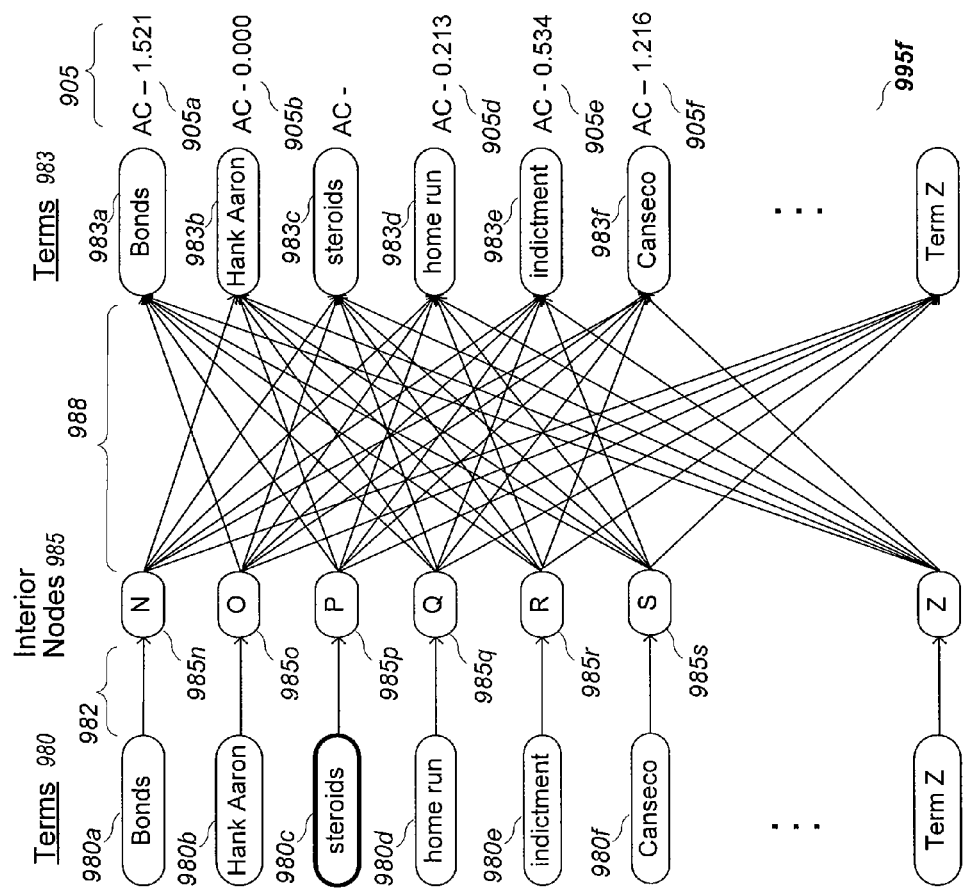
Figure 9C:
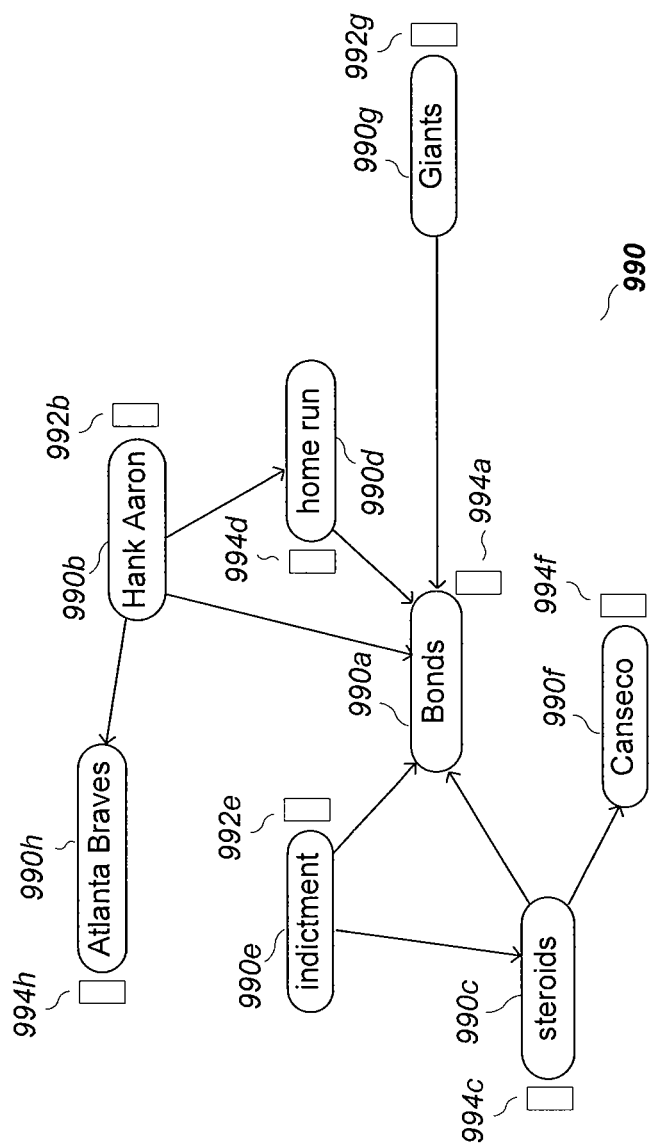
Figure 9H:
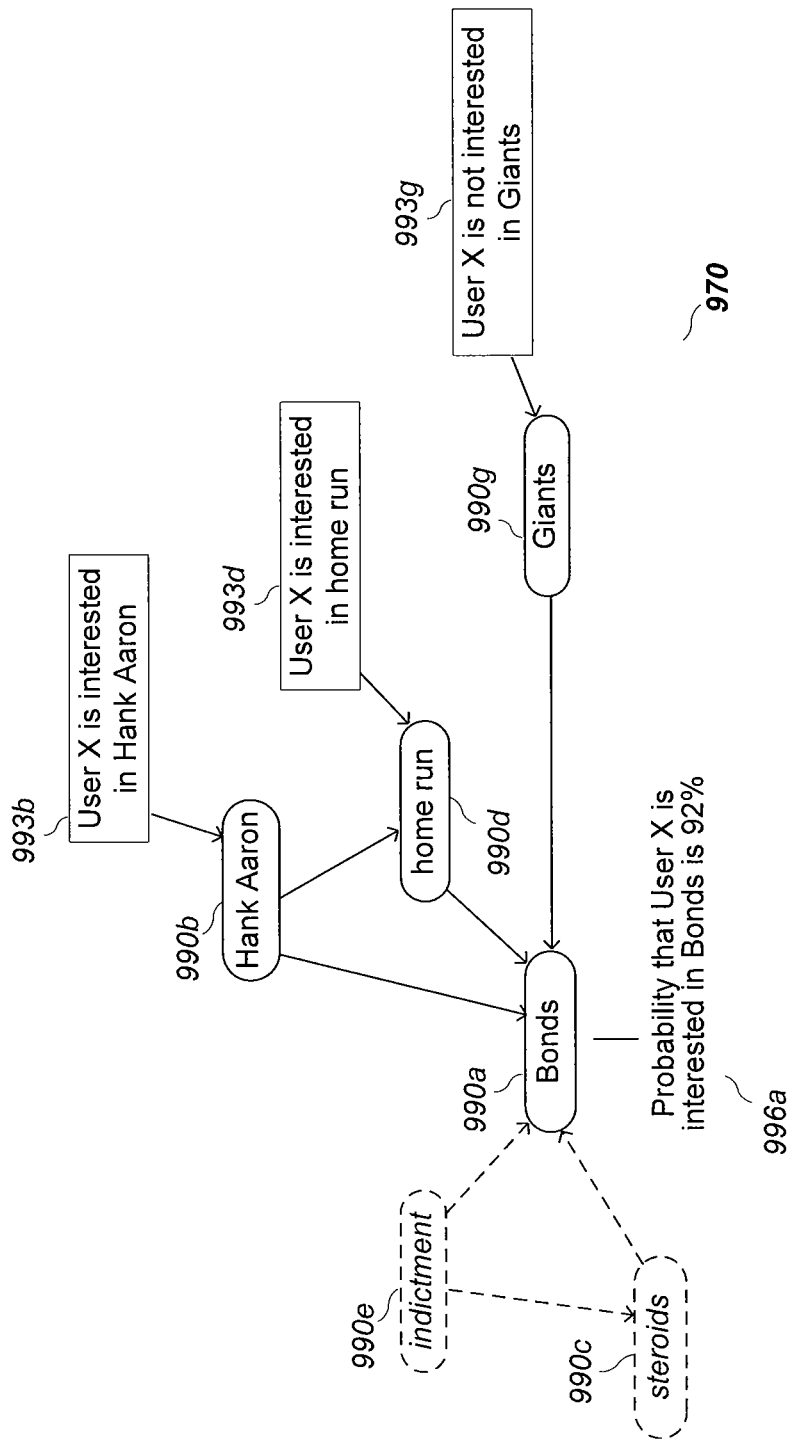
Figure 9I:
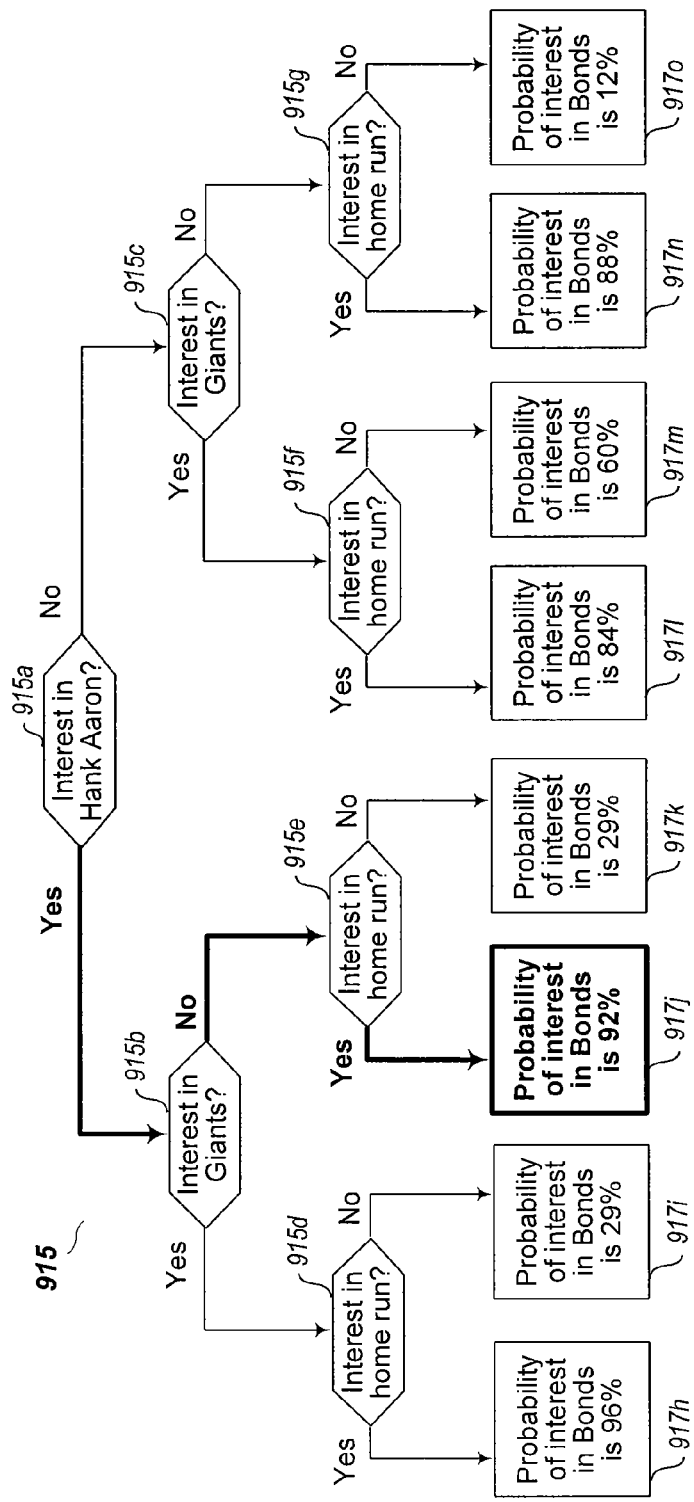
Figure 9J:
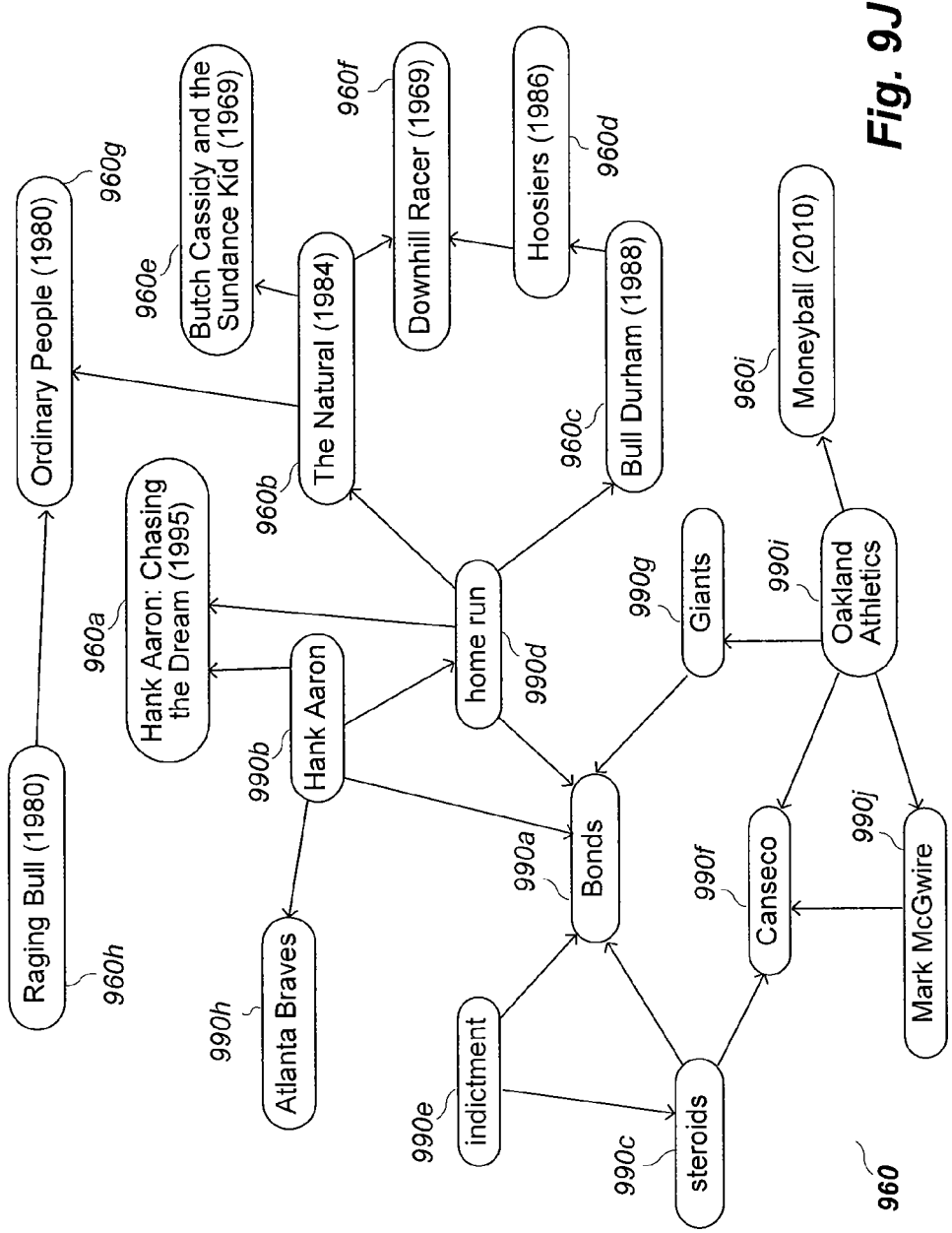
Figure 9L:
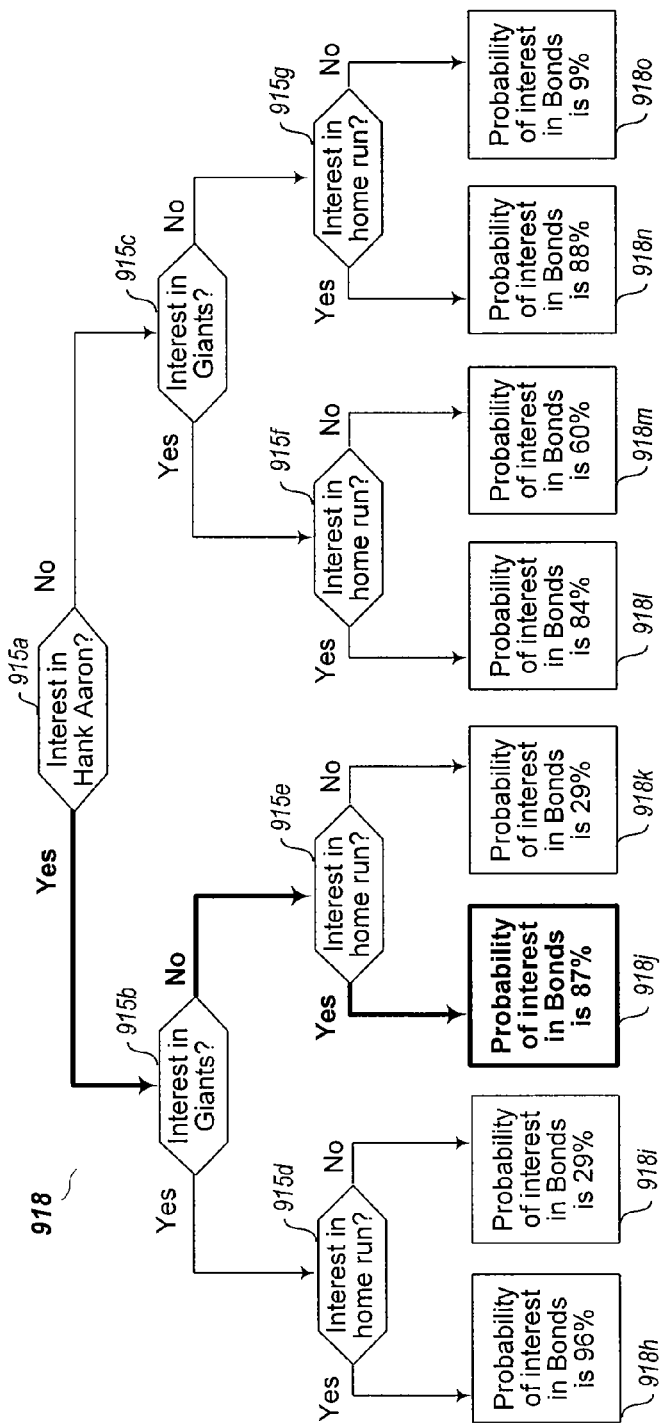
Figure 9M:
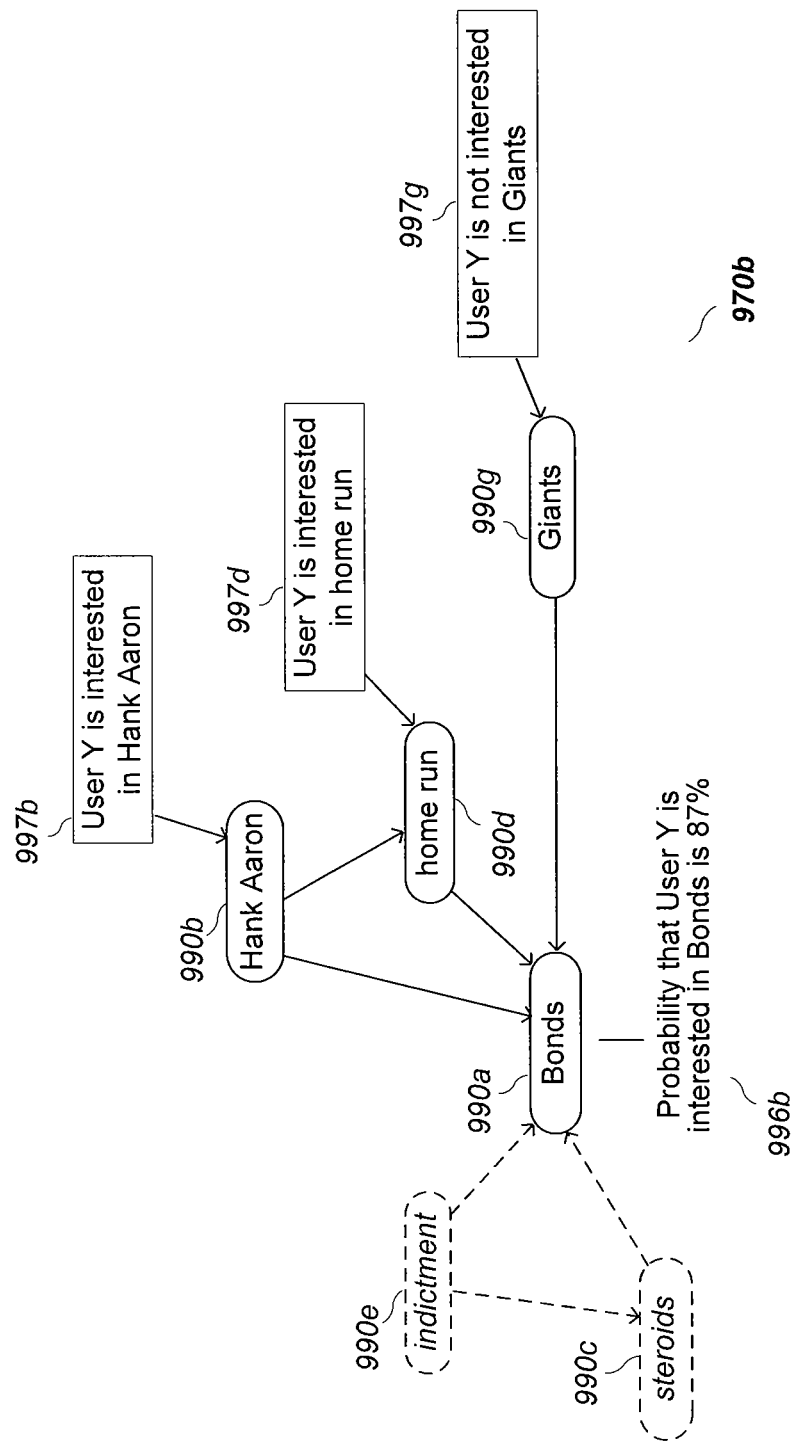
Figure 9N:
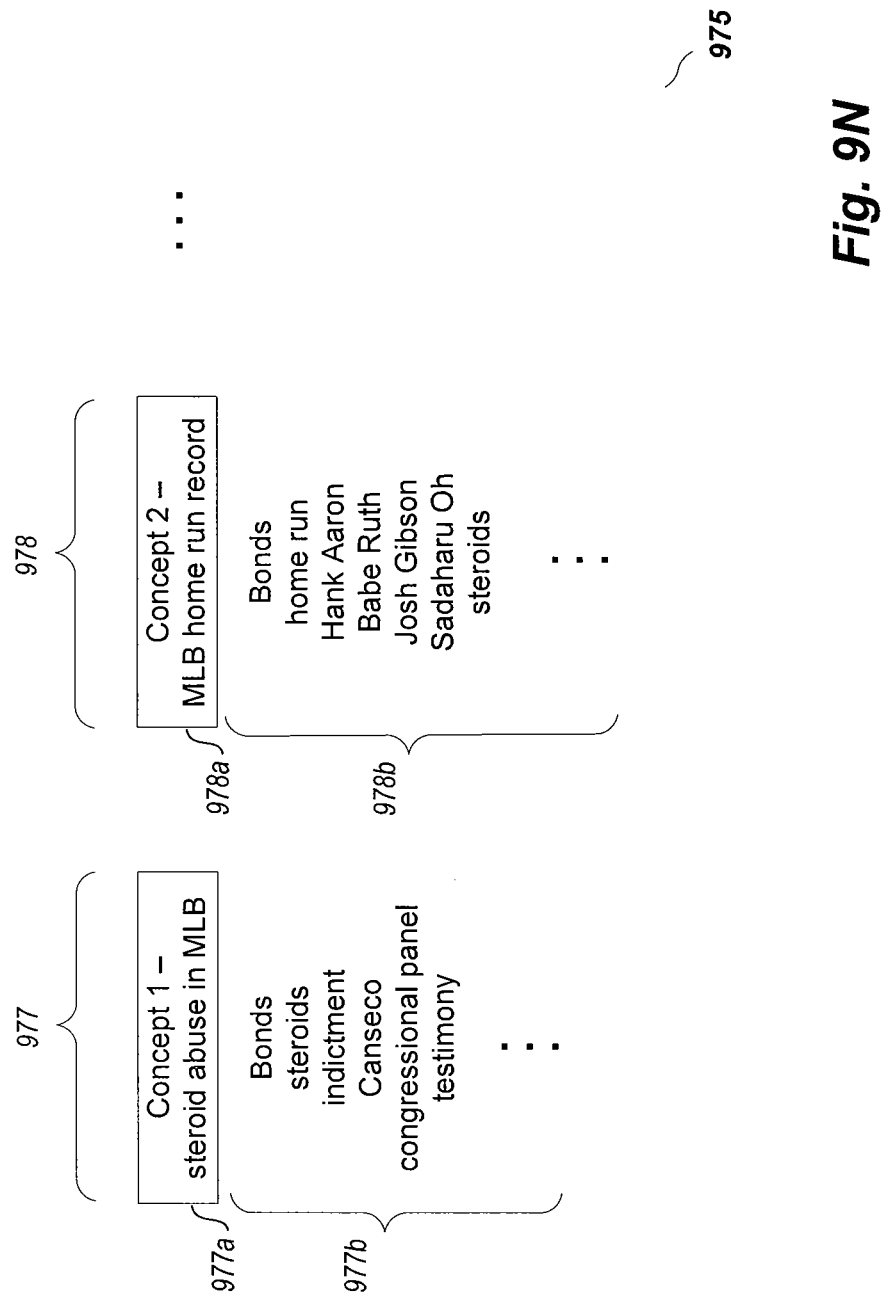

FIGS. 9A-9N illustrate examples of techniques for generating probabilistic representations of inter-term relationships for an example domain, as well as for using such generated probabilistic representation information in various manners, such as may be automatically performed in part or in whole by an embodiment of the DSRD service.

In particular, FIG. 9A illustrates an example neural network 995e that models determined inter-term relationship relevance information, which in this example has been generated based on analysis of an example corpus of domain-specific documents for an example domain of interest. In particular, the initial domain of interest relates to baseball in this example, and the example corpus of domain-specific documents that are available includes documents of various types (e.g., news articles, player biographies, team summaries, etc.), as discussed in greater detail with respect to example FIGS. 2A and 2B. Furthermore, as discussed in greater detail with respect to FIGS. 2C-2M, the example domain-specific information from the corpus documents may be analyzed and used in various manners (e.g., based in part on TF-IDF values indicating the relationships of terms to documents in the corpus), including to determine domain document relevance information and domain inter-term relevance information similar to that discussed with respect to FIGS. 1A-1C. The examples of FIGS. 2C-2M further provide details regarding example uses of automatically determined relevance information for inter-term relationships, such as to provide recommendations based on the automatically determined inter-term relationship information and/or to update the automatically determined inter-term relationship information based on user feedback.

Figure 2I:
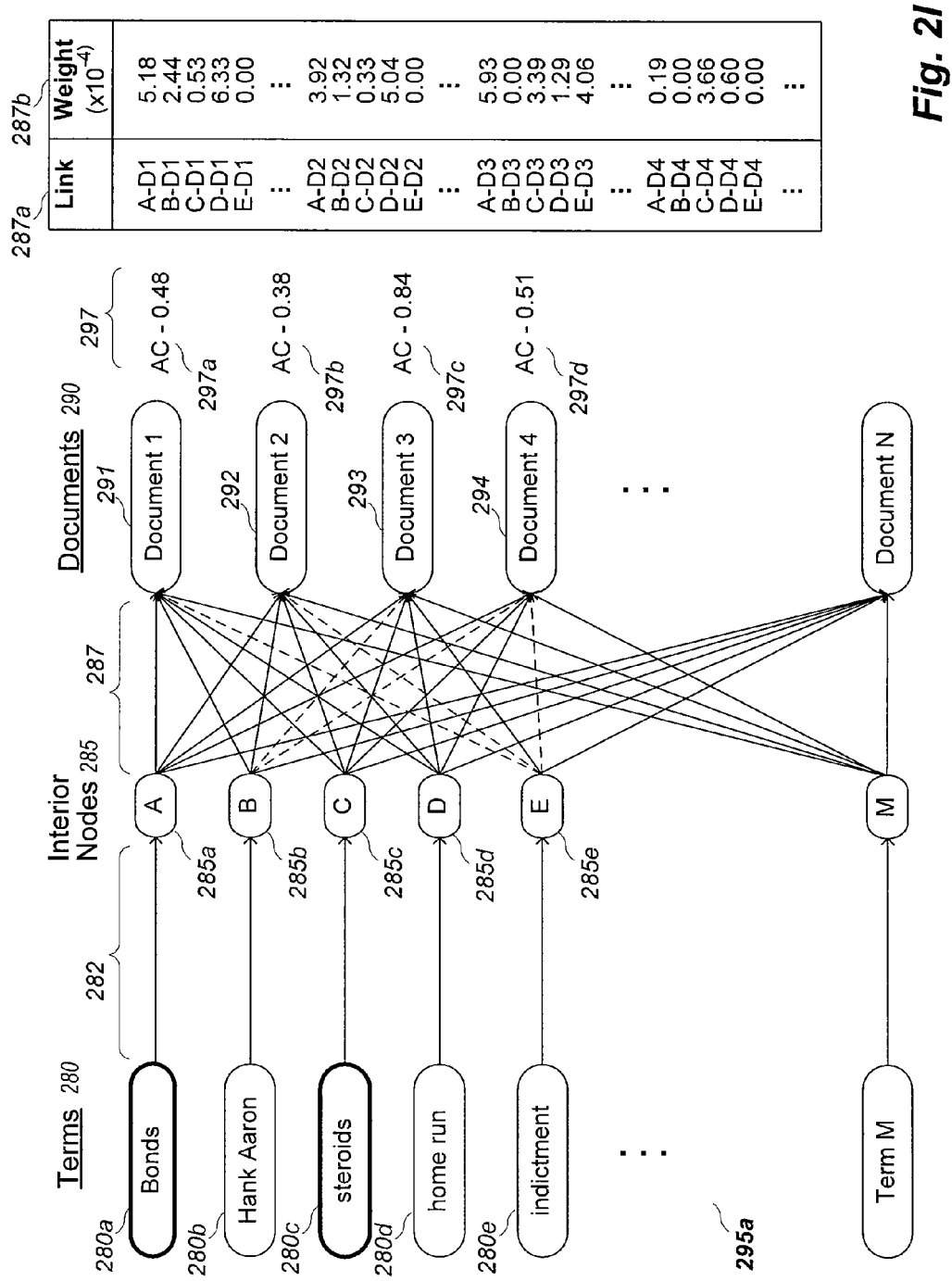
Figure 2J:
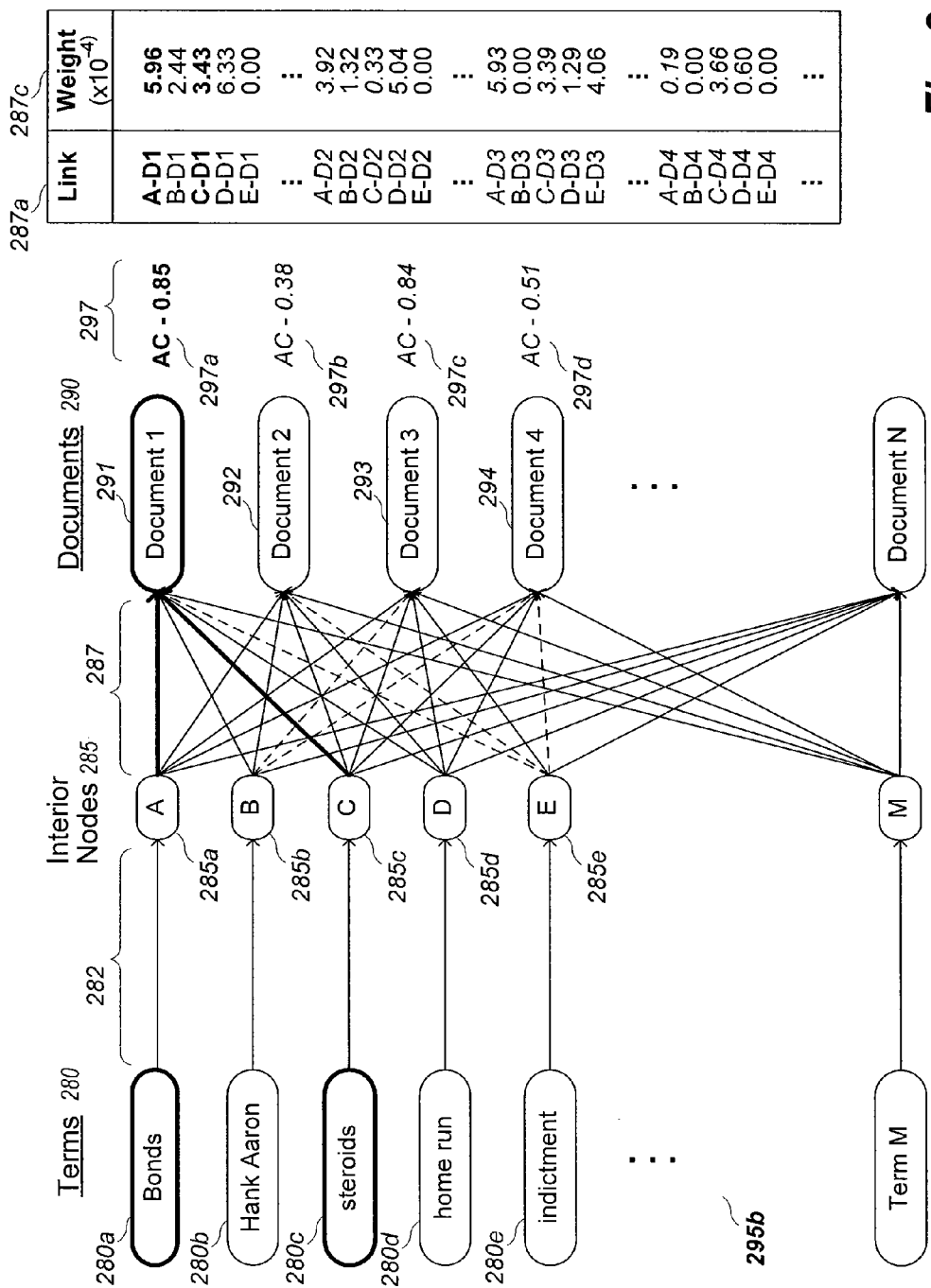
Figure 2K:
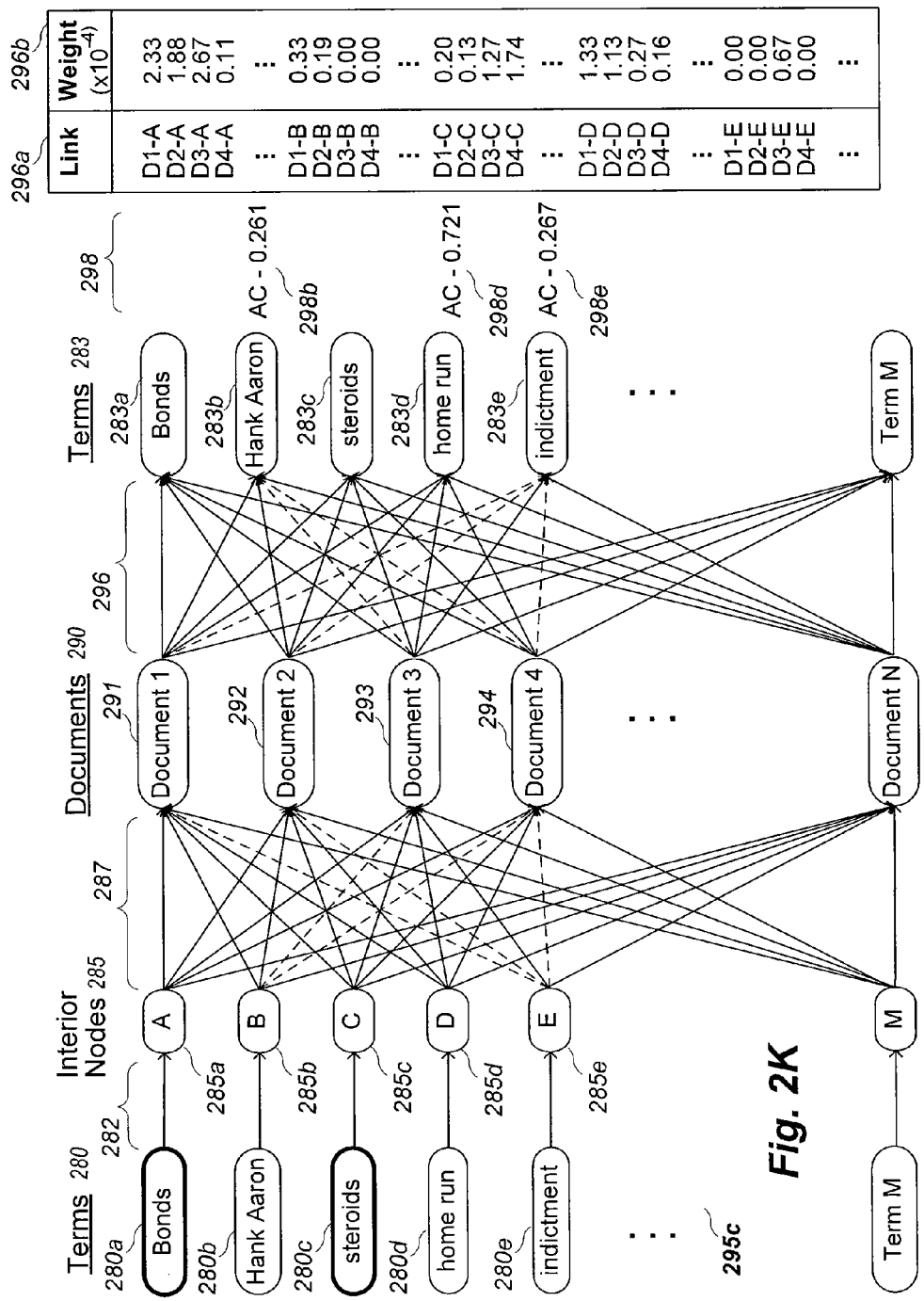

In this example, the inter-term neural network 995e of FIG. 9A is based on the example inter-term neural network 295c of FIG. 2K, whose construction is discussed in greater detail with respect to FIG. 2K. For example, the inter-term neural network 995e of FIG. 9A includes various term-based input nodes 980 and term-based output nodes 983 in an analogous manner to the term-based input and output nodes 280 and 283 of FIG. 2K, and FIG. 9A further illustrates inter-term relevance information 999 to indicate particular inter-term relevance values for particular output nodes 983 based on particular selected example input nodes 980, in a manner that is based on analogous inter-term relevance values 298 illustrated for FIG. 2K. In this example, input nodes 980a and 980c corresponding to the terms "Bonds" and "steroids" have been selected, in a manner analogous to selected input nodes 280a and 280c of FIG. 2K. With respect to FIG. 2K, the inter-term relevance value 298 for a particular output term is based on average non-normalized TF-IDF values for that output term with respect to selected domain documents, with those domain documents being selected based on being determined to be particularly relevant to the selected input term(s). Thus, the example inter-term neural network 295c of FIG. 2K determines relevance between terms based at least in part on the relevance of the terms to selected documents in the corpus, as reflected in part on the interior nodes 290 of FIG. 2K that represent particular domain documents. Conversely, the example inter-term neural network 995e of FIG. 9A does not explicitly indicate any corresponding particular document-based interior nodes. Thus, while in some embodiments the interior nodes 985 of FIG. 9A may correspond to a combination of the interior nodes 285 and 290 of FIG. 2K, such as if the determined relevance values 999 for the output nodes 983 are based on the relevance of terms to corpus documents, in other embodiments the inter-term relevance determinations for the output nodes 983 of FIG. 9A may not be based on documents to which the various terms correspond, and/or the relevance of terms to each other and/or to documents may be determined in manners other than based on TF-IDF values. Moreover, it will be appreciated that, even if the inter-term relevance determinations for output nodes of FIG. 9A were initially based on documents to which the various terms are determined to correspond and/or initially based on relevance information determined using TF-IDF values, the links and their associated weights and the resulting output node values of such an inter-term neural network may subsequently be modified based on feedback such that a current version of the inter-term neural network is no longer based on those initial determinations. More generally, and as discussed in greater detail with respect to FIG. 2I, the one or more layers of interior nodes 985 in FIG. 9A may represent various calculations that are performed as part of generating the inter-term relevance numbers 999 for particular output nodes 983 based on particular selected input terms 980. Thus, while only a single set of interior nodes 985 are illustrated in FIG. 9A for the sake of simplicity, it will be appreciated that some such neural networks may have additional layers of interior nodes. In addition, the inter-term neural network 995e of FIG. 9A further includes various inter-node links 982 and 988, and the discussion of FIGS. 2I-2L include additional details regarding how such links are determined and used as part of an inter-term neural network (e.g., how to determine weights associated with some or all such links, as well as how to use feedback to update weights and/or links).

FIG. 9B illustrates an inter-term neural network 995f similar to neural network 995e of FIG. 9A, but with only the single input node 980c (corresponding to the term "steroids") being selected. Accordingly, the inter-term relevance values 905 of FIG. 9B differ from the relevance values 999 of FIG. 9A, with the values for output nodes 983b and 983d (corresponding to terms "Hank Aaron" and "home run") in FIG. 9B dropping significantly, and with the relevance value 905e (corresponding to term "indictment") in FIG. 9B rising significantly. These relevance value changes may be understood intuitively, based on the relatively high relevance of the previously selected input term 980*a* (corresponding to term "Bonds") to the output nodes 983*b* and 983*d* that dropped significantly, and based on the relatively low relevance of the previously selected input term 980*a* (corresponding to term "Bonds") to the output node 983*e* that rose significantly. In embodiments in which the inter-term relevance values are based on the relevance of the output terms to selected documents that are most relevant to the selected input term(s), the change in inter-term relevance values 905 may be based in part on the different group of documents that are selected as being relevant to the single selected input term "steroids" for FIG. 9B relative to the previous combination of selected input terms "steroids" and "Bonds" for FIG. 9A (e.g., such that only example documents 3 and 4 of FIGS. 2A-2B are selected as being particularly relevant for the single selected input term "steroids" in FIG. 9B, rather than all of example documents 1-4 for the previous combination of selected input terms "steroids" and "Bonds" for FIG. 9A, as discussed with respect to FIGS. 2E and 9D). In addition, in the example of FIG. 9B, a relevance value 905*a* is shown for output node 983*a* (corresponding to term "Bonds"), while a corresponding relevance value in information 298 was not shown in FIG. 2K for analogous output node 283*a*, such as based on input node 280*a* being one of the selected input nodes in FIG. 9A (although in other embodiments such a relevance value may instead be calculated and shown for every output node if multiple input terms/nodes have been selected). In addition, FIG. 9B includes additional input and output nodes 980*f* and 983*f* corresponding to the term "Canseco," which while not a particularly relevant term for the combination of terms "Bonds" and "steroids" discussed with respect to FIG. 9A (as shown in row 274*f* and column 272*e* of FIG. 2E), is a highly relevant term for the single input term "steroids."

FIG. 9C illustrates an example simplified directed acyclic graph ("DAG") 990 that represents at least some significant inter-term relationships for the example domain discussed with respect to FIGS. 9A-9B and 2A-2M, such as may be used as part of a Bayesian network that includes probabilistic representations of the represented significant inter-term relationships. While various details follow regarding how the DAG and a corresponding Bayesian network may be automatically generated for the example domain, it will be appreciated that the network structure and other probabilistic representation information shown in these examples are not intended to accurately reflect an actual document corpus that fully captures the various information of interest for the baseball domain—instead, the information used in this example is based in part on the example domain documents 1-5 discussed with respect to FIGS. 2A-2B, which due to the limited amount of data may produce differences from the actual baseball domain with respect to both the network structure and other probabilistic representation information.

In the example of FIG. 9C, various graph nodes 990*a*-990*h* are illustrated, corresponding to the seven example terms illustrated in FIG. 9B, as well as an additional example term "Atlanta Braves." In the example graph 990, the graph node 990*a* (corresponding to the term "Bonds") is illustrated as being directly dependent on or otherwise influenced by five other graph nodes, those being graphs nodes 990*b*, 990*c*, 990*d*, 990*e* and 990*g* (corresponding to the terms "Hank Aaron," "steroids," "home run," "indictment," and "Giants," respectively). Some of these other nodes may themselves be directly dependent on or otherwise influenced by other graph nodes (e.g., graph node 990*d* that is influenced by graph node 990*b*, graph node 990*c* that is influenced by graph node 990*e*, etc.), while other graph nodes do not have any such influences (e.g., graph nodes 990*b*, 990*e*, 990*g*, etc.). In addition, in this example, each of the graph nodes 990*a*-990*h* may further have associated probability information 992 or 994 that is determined for and associated with the graph nodes, such as prior probability information 992 and conditional probability information 994, although in some embodiments such prior probability information 992 may not be used. Furthermore, in this example, the various graph nodes 990*a*-990*h* are all treated as being discrete random variables that each have only two possible values, although in other embodiments graph nodes may represent other types of values (e.g., more than two discrete values, continuous values over a specified range, etc.). FIGS. 9F and 9G provide additional details regarding examples of such determined probability information and possible node values. In other embodiments, the graph 990 that is constructed may instead have other forms, such as to not be a DAG (e.g., to include one or more cycles), to have at least some of the nodes be continuous random variables or otherwise have forms other than discrete random variables, etc., and more generally the inter-term relationships may be represented in a manner other than a graph.

To construct the example graph 990 in this example, each of the terms of the example domain is first consecutively selected as an individual input node for an inter-term neural network that represents the example domain (e.g., the inter-term neural network 995*f* of FIG. 9B), and the output nodes with the highest associated inter-term relevance values are selected as candidates for representing significant inter-term relationships with the selected input node, such that the terms corresponding to the selected output nodes may be likely to be influenced by the term for the selected input node. In embodiments in which the inter-term relevance is based at least initially on the relevance of terms to documents in the corpus, the individual selection of the various input terms may result in differing documents being selected as being among the most relevant to those selected input terms, as discussed with respect to FIGS. 9A and 9B. In addition, FIG. 9D illustrates example information 910 that indicates particular ones of the example documents 1-5 that may be selected for use with each of the eight example terms, although various other corpus documents may similarly be selected for some or all of the example terms that are not shown, and documents may similarly be selected for various other example terms that are not shown. As discussed in greater detail elsewhere, the particular documents to use may be selected in various manners in various embodiments, such as, for example, the following: a fixed number or percentage of the documents (e.g., ten, a thousand, etc.), such as ranked by the TF-IDF relevance value of the selected input term to the document, by a term-to-document relevance value determined by a corresponding network (e.g., neural network 295*a* of FIG. 2L), or in other manners; all of the documents above a fixed such TF-IDF value, fixed such term-to-document relevance value or other value, or above a percentage such TF-IDF value, percentage such term-to-document relevance value or other value of the selected input term for all of the corpus documents; to select all of the corpus documents but vary their influence (e.g., by weighting each document's contribution to the most relevant candidate other terms by the document's relevance to the selected input term, such as based on the TF-IDF value for the selected input term and document, on the term-to-document relevance value determined by a corresponding network, or instead in other manners); etc. As discussed elsewhere, while TF-IDF values are used as part of the example for FIGS. 2A-2M, such as to initialize term-todocument relevance values for a corresponding network, in other embodiments the relevance of terms to documents and/or to other terms may be determined in other manners. In this example, the relevant documents may be selected based on, for example, having TF-IDF values or term-to-document relevance values for the selected input term that are above 0.400. After the relevant documents are selected (and/or relative weights are selected to be used for each of some or all possible documents) for each of the selected input terms, the relevance of each other output term to the selected input term may be determined by using the TF-IDF values or term-to-document relevance values for the other term to those selected relevant documents, such as, for example, based on an average of such TF-IDF values or term-to-document relevance values. Additional details regarding the creation of an inter-term relevance neural network to model such information are included with respect to FIGS. 2I-2L, including modifying such an inter-term neural network after initial creation to reflect various user feedback (which may cause the various inter-term relevance values to vary from TDF-IF values initially determined based solely on the corpus document analysis). Furthermore, the relevance of a particular output term to multiple relevant documents may be determined in a variety of manners other than an average of the output term's TF-IDF values or term-to-document relevance values for those documents.

Thus, for the purposes of this example, and using only the five example documents 1-5, the relevance of other output term "home run" 922a of FIG. 9E to selected input term "indictment" 924b of FIG. 9E may be 0.267 (the TF-IDF value or term-to-document relevance value for the term "home run" to example document 3, which is the only one of the five example documents that is selected as being relevant for input term "indictment," as illustrated in row 914b of FIG. 9D), while the relevance of other term "indictment" 922b to selected input term "home run" 924a may be 0.000 (the average TF-IDF value or average term-to-document relevance value for the term "indictment" to example documents 1 and 2, which are the example documents selected as being relevant for input term "home run", as illustrated in row 914a of FIG. 9D). In this manner, the previously constructed inter-term neural network that represents such inter-term information may be used to provide determined inter-term relevance values for the other terms 922 for each of the individually selected input terms 924, as shown in example information 920 of FIG. 2E. Furthermore, in some embodiments the various determined inter-term relevance values are normalized (e.g., to be between 0 and 1), although such normalization is not illustrated in the example of FIG. 9E.

After the various inter-term relevance values are determined for the various output terms for each of the selected input terms, the most relevant output terms for the various input terms may be selected based on having sufficiently high inter-term relevance values. Moreover, in this example, if two terms are both selected as each being relevant to the other, only the relationship with the higher inter-term relevance value is selected to be represented in the graph, so as to provide a direction of greatest influence between those two terms. In this manner, the information in table 920 of FIG. 9E may be used to identify the structure of the graph 990 of FIG. 9C (except for term "Atlanta Braves," which is not listed in FIG. 9E), with the inter-term relevance values that are selected to identify influence relationships between terms being shown in bold for convenience. It will be appreciated that, in embodiments in which an acyclic graph is desired, additional actions may be taken if needed to prevent cycles, such as to eliminate one or more influence links that are part of a cycle (e.g., the influence links with the lowest corresponding inter-term relevance values for the cycle), or instead in other manners in other embodiments. Furthermore, as discussed in greater detail elsewhere, the particular inter-term relationships between input terms and output terms to be used for the graph may be selected in various manners in various embodiments, such as, for example, the following: a fixed number or percentage of the output terms for each input term (e.g., ten, a thousand, etc.) as ranked by the inter-term relevance values; all of the output terms above a fixed such inter-term relevance value or above a percentage such inter-term relevance value for the selected input term and all of the possible output terms; etc. In this example, for the sake of simplicity, the output terms having an inter-term non-normalized relevance value above 0.400 have been selected. In addition, the input terms that are allowed to influence any particular output term in the graph may further be limited in various manners in various embodiments, such as, for example, a fixed number or percentage of such input terms influencing each output term (e.g., ten, a thousand, etc.).

After the structure of the example inter-term relationship graph 990 of FIG. 9C is determined in this manner, the example probability information 992 and/or 994 may be determined in various manners. FIG. 9F illustrates examples of prior probability information 992b and 992g (corresponding to terms "Hank Aaron" and "Giants," respectively), which in this example are both treated as discrete random variables having only two values, corresponding to a user having a preference for or other interest in the term or instead not having a preference for or other interest (or having a negative preference or interest) in the term. As previously noted, in other embodiments, prior probability information may have forms other than discrete random variables with two values (e.g., discrete random variables with more than two discrete values, continuous random variables with continuous values over a specified range, etc.). Thus, for example, the prior probability 992b of a given user having an interest in the term "Hank Aaron" is identified as being 5% in this example, with the corresponding probability value of not being interested in the term "Hank Aaron" being 95%. The prior probability 992g of a given user having an interest in the term "Giants" is identified as being 10% in this example (and thus has a corresponding probability value of 90% of not being interested in the term "Giants," which is not shown for the sake of brevity). Such prior probability information may be automatically assessed in various manners, such as by using a term's IDF value across the corpus documents as an inverse representation of the likely interest of the term to users (e.g., to give a highest prior probability of interest to a term with the lowest IDF value, such as a predetermined maximum prior probability, and to give proportionally lower prior probabilities of interest to other terms with increasing IDF values), or instead in other manners. In other embodiments, such prior probability information may not be determined and used.

FIG. 9G further illustrates examples of conditional probability information 994a and 994d (corresponding to terms "Bonds" and "home run," respectively), which in this example are both treated as discrete random variables having only two values. Thus, for example, with respect to conditional probability information 994 for term "home run," which is influenced in this example only by term "Hank Aaron," the conditional probability information 994d illustrates the probability of a given user having an interest in the term "home run" for each possible value of that user's interest in the term "Hank Aaron." In this example, if a given user has an interest in the term "Hank Aaron," there is an 88% probability that that given user will also have an interest in the term "home run," while if the given user does not have an interest in the term "Hank Aaron," the probability that that given user will have an interest in the term "home run" drops to 23%. In a similar manner, with respect to conditional probability information 994a for term "Bonds," which is directly influenced in this example by each of terms "Hank Aaron," "Giants," "home run," "steroids," and "indictment," the conditional probability information 994d illustrates the probability of a given user having an interest in the term "Bonds" for each possible combination of values of that user's interest in the other five terms on which the term "Bonds" depends or is otherwise influenced (although only a subset of possible combinations are illustrated, without information for terms "steroids" and "indictment" being shown).

Such conditional probability information 994a and 994d may be automatically determined in various manners. For example, each combination of possible term values may be individually consecutively selected and used as input to a constructed inter-term relevance neural network that represents the domain (e.g., the inter-term relevance neural network 995f of FIG. 9B), with the various corresponding relevance values for the output term "Bonds" being tracked. Those corresponding relevance values may then be converted into probability values in various manners (e.g., to give a highest probability of interest to the combination of input term values with the highest corresponding inter-term relevance value for the output term "Bonds," such as a predetermined maximum probability, and to give proportionally lower probabilities of interest to other combinations of input term values with decreasing corresponding inter-term relevance values for the output term "Bonds"), or instead in other manners, as discussed in greater detail elsewhere. For example, in one particular embodiment, the inter-term neural network is viewed as defining a Markov Blanket over term space, in the form:

$$p(d|t;U,V,\alpha,\gamma) = \int d(\text{params})(\text{forwardcomputation of } d \text{ through } NN) \exp(-E^{(d)}) \quad \text{Equation 6}$$

where d is an output term, where U, V, $\alpha$, $\gamma$, and $E^{(d)}$ are parameters of the inter-term neural network that are discussed in greater detail with respect to FIGS. 2I-2L. For example, $E^{(d)}$ is the cost function of the inter-term relevance neural network, as follows:

$$E^{(d)} = \sum_{\text{Examples}} \left[ -\sum_j V_{ij} \left[ \sum_{l=1}^{NTerms} U_{ij} t_l \log(\alpha_l t_l) - \gamma_l \right] - d \right]^2 \quad \text{Equation 7}$$

Given the deterministic set of parameters U, V, $\alpha$, and $\gamma$ for the inter-term neural network, fixed values are assumed in the integral, with probability density functions given by Dirac delta functions, leaving the estimation problem as an integral over values of t, assumed to be the parents of the term node d. Assuming fixed values of the neural network parameters, the integral may be solved deterministically, resulting in the following:

$$p(d|t) = \sigma\left(\sum_j V_{ij} \left[\sum_{l \in \text{parents of } i} U_{ij} t_l \log(\alpha_l t_l) - \gamma_l \right]\right) \quad \text{Equation 8}$$

where normalization of the probability density function in Equation 6 results in a sigmoid or SoftMax function ensuring probabilities in the range 0 to 1. Accordingly, the conditional probability table for the term d is given by p(d|t) for each combination of the values of the parent nodes t (e.g., using the numeral 1 to represent a positive interest, and the numeral 0 or −1 to represent a negative interest or neutrality). Furthermore, for groups of terms, the joint probability of the term set over the full set of parent nodes may be calculated. As discussed in greater detail elsewhere, and for runtime efficiency (as well as enable embedding evidence from large sets of user preferences into the model), decision trees may be generated and used as parameterized generative models.

In addition, for a given user with a defined evidence set (preference terms), the likelihood of the user having a preference for another term X may be determined by performing inference in the sub-graph spanning the evidence and the specific term or terms in the preference and term X. In the case where X is disconnected from all the evidence nodes in the determined network structure, an indication of no result may be returned. When there is a graph spanning the evidence and term X, approximate inference may be performed in the graph (e.g., using Gibbs sampling, based on Markov chain Monte Carlo sampling simulations, using variational methods, etc.) to estimate the marginal, over the non-evidence initialized nodes, of the probability of term X given the evidence for the user. In other embodiments, such as if a generated Bayesian network is sufficiently small and/or the speed of response time is not important, exact inference may instead be performed in at least some situations.

Thus, once the inter-term graph structure and probability information are determined for the graph 990 of FIG. 9C, the graph may be used as a Bayesian network whose information is a probabilistic representation of the significant inter-term relationships for the domain(s) of interest. Accordingly, FIG. 9H illustrates a subset 970 of such a Bayesian network, in a manner similar to the graph 990 of FIG. 9C. In this example, evidence has been obtained regarding preferences of a given example user (User X), which include positive preferences for the terms "Hank Aaron" and "home run" but a negative preference (or non-preference) for the term "Giants," as reflected in the new user-specific evidence nodes 993b, 993d and 993g, respectively, that have been added to the Bayesian network subset 970. Furthermore, in this example, only the subset of the Bayesian network that is relevant to the target term "Bonds" and the available evidence is shown—thus, nodes 990e and 990c corresponding to the terms "indictment" and "steroids," respectively, may not be used in this situation to determine User X's probability of interest in the term "Bonds" based on the lack of evidence of User X's interest in those terms (although in other embodiments information regarding prior probability information 992e and/or conditional probability information 994c that may influence the probability of those nodes being preferred by User X may be considered). Accordingly, given the user-specific evidence 993b, 993d and 993g (and ignoring the influence of nodes 990e and 990c), a user-specific determination is made that User X has a 92% probability of having a preference for target term "Bonds" (as reflected in row 994a-f of information 994a of FIG. 9G, again ignoring the influence of nodes 990e and 990c for the sake of this example), as illustrated by the determined preference probability value 996a in this example. Similar determinations may also be made of User X's probability of preferences for other term nodes in the full Bayesian network, given the available evidence of User X's preferences, such as for node 990*h* (corresponding to the term "Atlanta Braves") and/or other nodes, although such determinations are not illustrated in FIG. 9H. Once the preference probabilities are determined for one or more such target nodes, particular target nodes may be selected as being sufficiently likely (e.g., based on exceeding a defined threshold for the preference probability or other determined likelihood, or on otherwise satisfying one or more determined criteria) to represent additional preferences of that particular user that have not yet been expressed by the user or made available to the DSRD service, such as in this example to have an unexpressed preference for term "Bonds." Such particular target nodes may be selected in various manners, such as, for example, the following: a fixed number or percentage of such target terms as ranked by the determined preference probability values; all of the target terms above a fixed such determined preference probability value or percentage such determined preference probability value for all of the possible target terms; etc.

As previously discussed, one or more decision trees may also be generated to each represent a subset of a Bayesian network or other probabilistic representation of inter-term relationship information. FIG. 9I illustrates an example of a decision tree 915 that is constructed to represent the portion of the Bayesian network 970 illustrated in FIG. 9H (that being nodes 990*a*, 990*b*, 990*d*, and 990*g*, again with the simplifying assumption that other nodes 990*e* and 990*c* do not have an influence on the node 990*a* corresponding to term "Bonds" for this example). The various eight end nodes 917*h*-917*o* of the decision tree correspond to the eight rows 994*a-h* through 994*a-a* of FIG. 9G, and with each such end node having a corresponding preference probability value for graph node 990*a* corresponding to term "Bonds" as shown in the column 994*a*-4 of the information 994*a* of FIG. 9G. The additional decision nodes 915*a*-915*g* of the decision tree correspond to the varying values for the three nodes 990*b*, 990*d*, and 990*g* that are treated in this example as having an influence on the preference probability value for graph node 990*a*. Thus, using the user-specific evidence 993*b*, 993*d* and 993*g* of FIG. 9H for User X, the decision tree 915 would be traversed in the indicated manner, as follows: by taking the left arrow out of decision node 915*a* (corresponding to a positive preference for term "Hank Aaron"), by next taking the right arrow out of decision node 915*b* (corresponding to a negative or neutral preference for term "Giants"), and by then taking the left arrow out of decision node 915*e* (corresponding to a positive preference for term "home run"), thus arriving at end node 917*j* indicating the preference probability value of 92% for the term "Bonds." It will be appreciated that such decision trees may be generated, encoded and compiled in various manners to enhance the speed of run-time processing given particular preference evidence for a particular user.

In addition, as discussed elsewhere, in some embodiments the determined inter-term relevance information for one or more first domains (e.g., obtained by document analysis for those first domains and/or user feedback corresponding to those first domains) may be extended to one or more second domains for which only limited or no user preference information is available. FIG. 9J illustrates an example graph 960 that is similar to graph 990 of FIG. 9C, but which has been expanded in this example to identify inter-term relevance information to new terms from a new second domain of interest. In particular, in this example, various documents or other content items have been analyzed corresponding to the domain of American movies, and various significant inter-term probabilistic relationships have been identified between new terms in the movie domain to existing terms in the baseball domain. In this example, the movie-related terms correspond to titles of movies, such that the expanded graph 960 is a Bayesian network that includes not only the graph nodes 990*a*-990*h*, but also new graph nodes 960*a*-960*i* corresponding to nine example movies (furthermore, for use as part of the example, two additional baseball domain-related nodes 990*i* and 990*j* have been added corresponding to terms "Oakland Athletics" and "Mark McGwire," which influence previously existing nodes 990*g* and 990*f* as illustrated).

In particular, in this expanded example, influences have been automatically identified from the existing graph node 990*d* (corresponding to term "home run") to multiple baseball-related movies in which home runs are an important part of the plot, which in this example include the movies "Bull Durham," "The Natural," and "Hank Aaron: Chasing The Dream." Such automatic identification of influences may be determined in a manner similar to that previously discussed, such as by analyzing content items that include summaries of movie plots and/or reviewers' critiques of movies, and identifying a significant relevance of the term "home run" to those movies—furthermore, as discussed in greater detail elsewhere, this automatic identification of additional influences may optionally be performed without any information about any users that had preferences for both the term "home run" and any of the indicated movies (or more generally without any information about any users' preferences for any movies). In addition, in this example, various other significant inter-term probabilistic relationships have been further determined, such as the following: between the baseball-related movie "Bull Durham" and the basketball-related movie "Hoosiers" (e.g., based on both movies being on lists of the best sports-related movies, or otherwise being compared in content items for the second and/or first domains); between "The Natural" and "Butch Cassidy and the Sundance Kid" (e.g., based on both having Robert Redford as a leading actor); from each of "The Natural" and "Hoosiers" to "Downhill Racer" (e.g., based on leading actors in both of those two movies also being in the latter movie); between "The Natural" and "Ordinary People" (e.g., based on having Robert Redford as an actor in one and a director for the other); between "Ordinary People" and "Raging Bull" (e.g., based on both being nominated for best picture in the same year, and/or otherwise being discussed together); etc. It will be appreciated that relationships between movies, and between baseball-related terms and movies, may be identified in a variety of manners in various embodiments. Furthermore, given such an expanded Bayesian network, a given user's preferences in the baseball-related domain may be used to identify likely target movies in which that user will also have a preference. For example, given User X's evidence discussed in FIG. 9H, including preferences for the terms "Hank Aaron" and "home run," it may be inferred that User X is likely to have preferences for movies such as "Hank Aaron: Chasing the Dream," "The Natural," and "Bull Durham," and possibly to other related movies as well (e.g., "Hoosiers," "Ordinary People," etc.).

As discussed with respect to FIGS. 9F-G and elsewhere, probability information for use in a Bayesian network or other determined probabilistic relationship data structure related to one or more domains may be determined in various manners in various embodiments, including based on analysis of documents for the domain(s), and optionally without any feedback of actual users' interests in particular inter-term relationships. Furthermore, as previously noted, if such actual user interest information is available, the actual user interest information may be incorporated with the automatically determined inter-term relationship information from the automated document analysis at various times (e.g., as part of the initial creation of the probability information, to update probability information that was initially determined based solely on the automated document analysis, etc.), and in some situations and embodiments may be used to replace the automatically determined inter-term relationship information from the automated document analysis (e.g., if sufficient actual user interest information becomes available). FIG. 9K illustrates updated examples of the prior probability information 992b of FIG. 9F and of the conditional probability information 994a of FIG. 9G, such as if the initial versions of the probability information 992b and 994a is generated based on automatically determined inter-term relationship information from the automated document analysis, and the updated versions of the probability information 992b and 994a is based at least in part on actual user interest information. For example, FIG. 9K illustrates that the updated prior probability information 992b related to user interest in the term "Hank Aaron" reflects a current prior probability of 18% of a given user's interest in the term "Hank Aaron," updated from the previous prior probability of only 5% of a given user's interest in the term "Hank Aaron." In addition, the updated conditional probability information 994a in FIG. 9K shows that updates have been made to the probability 994a-4 of a given user's interest in the term "Bonds" for the rows 994a-a (from 0.12 to 0.09) and 994a-f (from 0.92 to 0.87), and other rows' values may similarly be updated actual user interest related to the combination of input values for those rows becomes available. Such updated probability information may further be used with an updated version of a corresponding Bayesian network and/or decision tree, as described in greater detail with respect to FIGS. 9L and 9M.

Thus, in at least some embodiments, automatically determined information about inter-term relationships for a domain may be obtained and used (e.g., based on analysis of documents for the domain), and distinct actual user interest information that reflects inter-term relationships for the domain may be obtained and used. In situations in which both of these types of information are available, they may be combined in various manners. For example, as previously discussed, FIGS. 9A and 9C illustrate examples of inter-term networks that may be generated based on an automated analysis of documents of a domain, and that may optionally be modified based on user feedback. While not illustrated here, in some embodiments one or more similar inter-term networks may be generated that reflect actual user interest information, but that may optionally differ in one or more manners from the inter-term networks generated from the automated document analysis. For example, with comparison to FIG. 9C, a similar inter-term network may be generated based on actual user interest information, but that lacks the existing link in FIG. 9C from the term "indictment" 990e to "Bonds" 990a (e.g., based on there being few or no users who actually indicated positive and/or negative interests for both of those terms together), and that further includes a new link relative to FIG. 9C from the term "Canseco" 990f to "Bonds" 990a (e.g., based on there being one or more users who indicated positive and/or negative interests for both of those terms together, such as based at least in part on Jose Canseco's ability to hit home runs). In addition, such a similar actual user interest inter-term network may include different degrees of relevance of particular terms (e.g., as reflected in conditional probability tables and/or prior probability information for the actual user interest inter-term network), whether instead of or in addition to one or more structural differences in the actual user interest inter-term network relative to the automated document analysis inter-term network. If data is available corresponding to both an automated document analysis inter-term network and an actual user interest inter-term network for the same domain, the data may be used in various manners. For example, to generate a particular set of recommendations given a particular set of known user preferences, both types of networks may be independently assessed using those known user preferences in some embodiments, and the results from the two networks may be aggregated together. Alternatively, the data corresponding to the two types of graphs may be used to construct a single aggregate inter-term network in various manners, and that single aggregate inter-term network may be used to provide recommendations corresponding to a particular set of known user preferences. The construction of a single aggregate inter-term network may include, for example, using the information about the structure of the actual user interest inter-term network and the data from the automated document analysis inter-term network to specify the degree of relevance between terms, or more generally may include using data from one of the networks to prune and/or augment the structure of the other network, and/or more generally may include using data from one of the networks to adjust the strength or influence of inter-term relationships for the other network. Thus, as discussed above, inter-term relevance information obtained from the automated analysis of corpus documents may be automatically integrated in at least some embodiments with user-related inter-term relevance data that is obtained in other manners (e.g., collaborative filtering, etc.), potentially providing benefits over the use of any of such techniques alone.

It will be appreciated that updates to determined probability information may be made in a variety of manners in various embodiments, and may reflect various factors. For example, the update to the prior probability information 992b for the term "Hank Aaron" may reflect that the documents in the initially analyzed domain corpus focus primarily on current news, such that current actual user interest in at least some historical players may be higher than would be indicated by the analyzed domain corpus documents, may reflect a recent growing interest in the term "Hank Aaron" relative to a time to which the initially analyzed domain corpus documents correspond, etc. When actual user interest information is combined with automatically determined user interest information based on automated analysis of domain corpus documents, the combination may be performed in various manners, such as by weighting one or both types of user interest information (e.g., to give greater weight to the type of information that is believed to be more accurate, to give greater weight to the type of information that is more recent, etc.). As one simplistic example, the user interest information that is automatically determined based on automated analysis of domain corpus documents may be treated as the equivalent of actual user interest information from 10 users, such that if 5 of 20 actual users are determined to have an interest in the term "Hank Aaron," the updated prior probability information would be as indicated in the example (i.e., $(5+0.05*10)/(20+10)=0.183$). Alternatively, the weight given to actual user interest information may vary based on the number of actual users, such as to give only limited weight to the actual user interest of the first few users (e.g., so as to prevent anomalous information from having a disparate effect on the combined probability information), to increase the weight exponentially as the number of users grows, and optionally to eventually discard or ignore (or give very low relative weight to) the automatically determined user interest information based on automated analysis of domain corpus documents as the number of actual users reaches a sufficient quantity. The updates to the conditional probability information 994a for the output term "Bonds" may be updated in a manner similar to that of the prior probability information 992b. For example, with respect to the changes in the probability 994a-4 for the term "Bonds" with respect to row 994a-f, the reduction in that probability may be based on one or more users who are determined to have actual interest in the terms "Hank Aaron" and "home run" (corresponding to the "yes" values in the columns 994a-1 and 994a-3 for row 994a-f) and to have an actual lack of interest (or negative interest) in the term "Giants" (corresponding to the "no" value in the column 994a-2 for row 994a-f), and further to have an actual lack of interest (or negative interest) in the term "Bonds."

FIG. 9L illustrates an updated decision tree 918 data structure that is similar to the decision tree 915 of FIG. 9I, with the same decision nodes 915a-915g, but with the end nodes 918h-918o illustrated in FIG. 9L reflecting current conditional probability information corresponding to the term "Bonds." In particular, in this example, nodes 918j and 918o have been updated with respect to nodes 917j and 917o of FIG. 9I, with node 918j in this example illustrating the updated probability value 87% of column 994a-4 and row 994a-f of FIG. 9K, and with node 918o in this example illustrating the updated probability value 9% of column 994a-4 and row 994a-a of FIG. 9K. Thus, as actual user interest information becomes available to update probability information (such as information 994a of FIG. 9K), corresponding decision tree information (such as for decision tree 915) may be updated for future use. Thus, additional users who, for example, are determined to have a preference for or other interest in terms "Hank Aaron" and "home run," but to have a lack of a preference for or other interest (or negative preference or interest) in the term "Giants," will be determined to have an 87% probability of having a preference for or other interest in term "Bonds" in accordance with node 918j of the updated decision tree 918.

In a manner similar to that of FIG. 9L, FIG. 9M illustrates an updated Bayesian network portion 970b data structure that is similar to the Bayesian network portion 970 of FIG. 9H, with the same graph nodes 990a-990e and 990g, but with the evidence nodes 997b, 997d and 997g illustrated in FIG. 9M reflecting evidence for a new user (in this example, User Y) who has the same indicated preference information as example User X of FIG. 9H. In particular, in this example, the conditional probability table information 994a (not shown) for graph node 990a (corresponding to term "Bonds") of FIG. 9M has been updated with respect to the conditional probability table information for the same node in FIG. 9H, such as to in this example reflect the updated probability value 87% of column 994a-4 and row 994a-f of FIG. 9K (as well as the updated probability value 9% of column 994a-4 and row 994a-a of FIG. 9K). The prior probability information 992b (not shown) for graph node 990b (corresponding to term "Hank Aaron") of FIG. 9M may similarly be updated with respect to the same graph node of FIG. 9H, such as to reflect the updated prior probability information 992b of FIG. 2K, but is not used in this example. Thus, as actual user interest information becomes available to update probability information (such as information 994a of FIG. 9K), corresponding Bayesian network information (such as for Bayesian network portion 970b) may be updated for future use. Thus, in this example, with respect to User Y who is determined to have a preference for or other interest in terms "Hank Aaron" and "home run" (as shown in evidence nodes 997b and 997d), but to have a lack of a preference for or other interest (or negative preference or interest) in the term "Giants" (as shown in evidence node 997g), will be determined to have an 87% probability of having a preference for or other interest in term "Bonds," as shown by the determined preference probability value 996b of FIG. 9M.

Thus, information corresponding to probabilistic representations of inter-term relationships, such as may be determined at least in part on automated analysis of documents related to a domain, may be updated to reflect actual user interest information that becomes available, such as in the manner illustrated with respect to FIGS. 9K-9M. Furthermore, in some situations, such actual user interest information may identify additional inter-term relationships that were not previously determined to be sufficiently relevant based solely on the information that was previously available, and if so the generated probabilistic representations of the inter-term relationships may be updated to reflect the additional inter-term relationships. As one example, an inter-term relevance neural network or other representation of inter-term relevance information may be updated to reflect the actual user interest information, and the probabilistic representations of the inter-term relationships may be newly generated based on the updated inter-term relevance information. In other embodiments and situations, at least some types of generated inter-term relationship probabilistic representation information may instead be updated in other manners.

As previously noted, FIGS. 2A-2M illustrate examples of techniques for determining and using relevance information related to an example domain of interest, such as that may be automatically performed by an embodiment of the DSRD service, and include additional details related to various of the examples discussed in FIGS. 9A-9J.

For example, FIGS. 2A and 2B illustrate examples of summary information about several documents that are part of a particular example domain of interest, along with example term analysis information that may be generated by an embodiment of the DSRD service for the documents related to the domain. In particular, as indicated with respect to example summary information 200, the example domain of interest relates to baseball, and the corpus of domain-specific documents that are available in this example for the domain includes 1000 documents (e.g., news articles, player biographies, team summaries, etc.).

The information 200 in this example includes a summary of a few example terms that are present in the corpus, along with IDF information for those terms. In particular, several terms 202a are shown, with each having a unique term ID 202b, an indication of a number of documents 202c in the corpus that include that term, and a corresponding IDF value 202d for the term and the corpus documents. Various other summary information may also be generated and stored, but is not shown in this example. In addition, each row 204 in the example table 200 reflects a distinct term, such as for row 204a that corresponds to the common term "the", which is present in every one of the 1000 documents in the corpus, and thus has an IDF value of zero. In this example, the rows 204 are sorted based on IDF value, such that subsequent terms have increasing IDF values, reflecting their presence in less of the documents of the corpus than preceding terms, and thus being more distinctive with respect to those documents in which they are present. Additional details regarding calculating IDF values are included elsewhere. In addition, in some embodiments, some common terms or other indicated terms (e.g., the term "the") may be removed as part of the document term analysis, and thus may not be shown in such summary information 200 or used in the later determination of relevance-related information. Furthermore, some of the terms 202a in this example are phrases that include multiple related words, such as "home run" and "Hank Aaron," while other terms that may be used together at times (e.g., "Barry Bonds" and "Bobby Bonds") are shown as separate terms. It will be appreciated that such multi-word aggregate terms may be determined in various manners, such as automatically based on their repeated use together and lack of use separately, automatically based on the inclusion of such terms in a dictionary of common terms for the domain or other similar information, at least partially in a manual manner based on input from an operator of the DSRD service, etc. In other embodiments, each word may be treated as a separate term, at least initially, and may optionally be later grouped together as part of a common multi-term theme based on a learned relevance of the inter-relatedness of those terms from the terms being repeatedly used together by users, as discussed in greater detail elsewhere.

The other example tables 210, 220, 230, 240 and 250 that are illustrated in FIGS. 2A and 2B each reflect an example document in the corpus, and include various information about example terms in those documents and corresponding term relevance information for those terms and those documents. In particular, information 210 corresponds to an example document 1, which in this example is a news article related to Barry Bonds setting the career home run ("HR") record in 2007 while playing for the San Francisco Giants, surpassing the previous record held by Hank Aaron. While Bonds was pursuing the home run record, there was also significant ongoing news coverage related to a steroid controversy among players in Major League Baseball, and Bonds was later indicted on charges related to statements regarding his alleged use of steroids.

The various entries 214 in the table 210 each correspond to an example subset of terms 212a that are present in the 1500-word document 1, such as the term "Bonds" in entry 214a, the term "Hank Aaron" in entry 214c, etc. The number of occurrences 212b of each term in document 1 is also illustrated, and a corresponding term frequency value 212c is shown. IDF values 212d are also replicated here for the terms, and correspond to the same values 202d in information 200. Furthermore, each entry 214 includes a TF-IDF value 212e based on the term frequency value 212c and IDF value 212d. For example, the term "Bonds" in entry 214a is indicated to occur 35 times in document 1, which results in a 2.33% frequency among the 1500 words of the document. The IDF value 212d for the term "Bonds" is 1.10, as corresponds to information 202d of entry 204d of information 200, and the TF-IDF value 212e for Bonds in entry 214a in this example is 2.559. The entries 214 are illustrated in this example in order of decreasing value of TF-IDF values, indicating that the term "Bonds" is the most descriptive term for this document that is illustrated, while other terms such as "the" and "indictment" in entries 214i and 214j, respectively, are not descriptive of this document (e.g., due to the term "the" being present in all the documents of the corpus and thus having a zero IDF value, and due to the term "indictment" not occurring in this example document and thus having a zero term frequency value 212c). While the term "indictment" is included in this example for document 1 for explanatory reasons, in other embodiments the term would not be included in information 210 since is not present in document 1. Additional details regarding calculating TF and TF-IDF values are included elsewhere.

Tables 220, 230, 240, and 250 include similar information for example documents 2, 3, 4, and 5, respectively. In particular, example document 2 is an overview biography of Barry Bonds, focusing on Bonds' various accomplishments and including corresponding terms 222a as shown in various entries 224. Example document 3 is a news article corresponding to Bonds' indictment on bases related to possible steroid-related abuses, and includes corresponding terms 232a as shown in various entries 234. The example document 4 corresponds to an event that occurred prior to Bonds' indictment and initiated some of the steroids-related controversy in Major League Baseball, and in particular corresponds to former Major League Baseball player Jose Canseco testifying before Congress related to alleged steroid use in Major League Baseball, with corresponding terms 242a shown in various entries 244. Example document 5 is a news article from the middle of the 2008 Major League Baseball season and focuses on the current status of the San Francisco Giants team, for which Bonds stopped playing after the 2007 season, with corresponding terms 252a shown in various entries 254. As discussed in greater detail with respect to FIGS. 2C-2M, the example term information for these example documents will be used to illustrate some of the described techniques in terms of determining relevant multi-term themes and other inter-term relationships, as well as determining relevant documents for particular terms, for this example baseball-related domain.

FIGS. 2C and 2D illustrate an example of a search query specified by a user, in which the example term analysis information illustrated in FIGS. 2A and 2B for the example documents 1-5 of the corpus may be used by the DSRD service to determine particular information that is relevant to the query. In particular, FIG. 2C illustrates a query that has been specified by a user, which in this example includes the query terms 265a "Bonds" and "steroids". Various information 261a is shown that indicates an assessed degree of relevance of each of the two query terms to each of the example documents 1-5, including a generated normalized aggregated document relevance score or number 264x for each of the example documents 262. As described in greater detail below, a normalized document relevance number may be generated for each term 264 and each document 262, with the normalized scores for each term for a document being averaged in this example to generate a document relevance number 264x for the document based on the combination of the two query terms. In particular, in this example, the relevance of a term to a document is based in part on the TF-IDF value for that term and document, and is normalized in part using maximum and minimum TF-IDF values for that term across all the documents in the corpus. Example minimum and maximum TF-IDF values for the two query terms are shown in information 267a-267d in this example, although such information 267 and/or the table 261a may not be illustrated to the user that specified the query in at least some embodiments. Additional details related to the generation of example document relevance numbers are included below.

In this example, example document 3 has the highest generated document relevance value for the query terms, as the contents of document 3 related to Bonds' steroid-related indictment are highly relevant to both query terms 265a. Example documents 1 and 4 are each moderately relevant to the combination of query terms 265a, based on each of those example documents being highly relevant to one of the query terms and only slightly relevant to the other query term (i.e., with example document 1 being highly relevant to the "Bonds" term and only slightly relevant to the "steroids" term, and with example document 4 being highly relevant to the "steroids" term and only slightly relevant to the "Bonds" term), as shown in column 262a for document 1 and column 262d for document 4, in entries 264a and 264b of information 261a. The other example documents 2 and 5 are less relevant to the query terms 265a than the other three example documents.

As previously noted, the determination of the relevance of a particular document to one or more specified terms (e.g., terms that are part of a search query), such as multiple related terms that are part of a theme, may be performed in various manners in various embodiments. As one specific example, the TF-IDF scores for each of the specified terms and document may be combined in various manners, such as to generate an average or sum. In particular, in at least some embodiments, an average of the TF-IDF scores for the various specified terms is generated, and may further be normalized (e.g., to represent a relevance percentage or other number between 0 and 1), so as to produce a normalized document relevance ("DR") score for the specified terms that facilitates comparison between documents and that facilitates human understanding of the DR scores. The DR score for a document d relative to a group g of one or more specified terms i may be determined as follows in at least some embodiments:

$$DR(d, g) = \frac{1}{NTerms(g)} \sum_{i}^{g} \frac{TF \cdot IDF_{i,d} - \min(TF \cdot IDF_i)}{(\max(TF \cdot IDF_i) - \min(TF \cdot IDF_i))}$$

with the summation performed for each of the terms i in g, with NTerms(g) reflecting the quantity of terms i in group g, and with the minimum and maximum $TF\text{-}IDF_i$ scores for a particular term i reflecting the lowest and highest scores, respectively, for that term across all the documents k for a domain.

FIG. 2D illustrates an example of information 260 that may be displayed to or otherwise provided to the user in response to the query terms 265a "Bonds" and "steroids" indicated in FIG. 2C. The information 260 may, for example, be part of a Web page that is generated and provided to a client device of the user for display, or may otherwise be part of an information screen that is presented to the user.

In particular, in this example, the information 260 includes a visual indication 266 of the specified query terms 265a, and a list 269 of corresponding search results are shown in order of generated document relevance. Furthermore, in this example, each of the entries in the list 269 includes an indication not only of the corresponding relevant document (e.g., a name or other identifier of the document, such as may be displayed as a user-selectable link that may be selected by the user to access the document), but also an indication of the corresponding generated normalized document relevance number for the document, such as to provide information to the user in assessing whether to obtain further information about a particular document or otherwise select the document as being relevant to the query terms 265a. The indicated normalized document relevance numbers in this example each also include a textual assessment of the degree of relevance of the normalized document relevance number, although in other embodiments only one (or neither) of the normalized document relevance numbers and associated textual assessments may be shown. In addition, the selection and display of particular search results may be performed in various manners in various embodiments, including to show a specified quantity of query results, to show some or all query results that are above a specified minimum document relevance value, etc.

In addition, in this example, additional information and user-selectable controls 268 are provided for possible selection by the user, although in other embodiments such additional information may not be shown. In this example, the additional information 268 asks the user if he/she would like to expand the previously specified search query to further describe a relevant theme for the domain, such as to improve the accuracy of the search results by specifying a more specific or otherwise different theme that better represents the user's interests than the query terms 265a. As one possible example, as previously discussed with respect to example documents 1 and 4 that are each highly relevant to one of the specified query terms but only mildly relevant to the other specified query term, the user may be able to improve the accuracy of the search results by clarifying whether the user is primarily interested in the steroids-related controversy in Major League Baseball (e.g., as it pertains to not only Bonds but also to other players), or instead is primarily interested in information related to Bonds that is only partially related to Bonds' alleged use of steroids (e.g., the career home run record set by Bonds). More generally, by identifying additional terms that are particularly relevant to the user's current interest, the resulting expanded query terms may better disambiguate the various possible themes that may be associated with the terms in the initial query.

The selection of the user-selectable "Yes" control in information 268 of FIG. 2D may prompt various additional actions by the DSRD service, with one such example described in greater detail with respect to FIGS. 2E and 2F. In particular, FIG. 2E illustrates information 270 about other terms 274 that may be related to the specified query terms 265a "Bonds" and "steroids", with indications of the assessed degrees of relevance of the other terms to the specified query terms 265a that are determined. In other embodiments, the use of the inter-term relevance information may be prompted in other manners, such as if it is performed automatically for some or all users in some or all situations (e.g., so as to display additional information with information 260 of FIG. 2D regarding the possible relevance of one or more other terms, whether instead of or in addition to the information 268).

The various information 270 in FIG. 2E may be used in various ways, such as part of further defining a particular theme for use in a refined search query that is based in part on the initially specified query terms 265a, or to otherwise identify general interests of the user. For example, in some embodiments some or all of such information 270 may be illustrated to the user that specified the query terms 265a, although in the illustrated embodiment the information 270 is not displayed to the user. In this example, the information 270 includes a number of term entries 274a-274f that each correspond to a candidate additional term for possible combination with the query terms 265a, and document columns 272a-272d indicate an assessed degree of relevance of those terms to example documents 1-4. Column 272e indicates an aggregate term relevance score for the candidate term in each entry 274 with respect to the query terms 265a, such as to reflect an assessed degree of relevance of the candidate term to the term combination represented by the query terms 265*a*. The various example documents 272 and candidate additional terms 274 may be selected in various manners in various embodiments. For example, the candidate additional terms may be selected by first selecting a subset of the documents of the corpus that are determined to be most relevant to the query terms 265*a*, such as based on the normalized document relevance numbers 264*x* illustrated in FIG. 2C. The most relevant documents may be selected in various manners, such as to select a specified quantity of the documents with the highest document relevance numbers, to select a specified percentage of the documents with the highest document relevance numbers, to select some or all of the documents whose document relevance numbers are above a specified threshold or otherwise satisfy one or more defined criteria (e.g., a predefined threshold, such as a minimum document relevance number threshold; or a dynamically determined threshold, such as if grouping documents with similar document relevance number values provides a naturally occurring threshold point between a group of the most relevant documents and other documents), etc. In this example of FIG. 2E, example document 5 has not been selected as a most relevant document for further use in this example based on its low document relevance number of 2%, as indicated in column 262*e* for entry 264*x* in FIG. 2C, but the other example documents 1-4 have been selected for use as relevant documents.

In this example, once the most relevant documents are selected for the query terms 265*a*, candidate additional terms are selected for the query terms 265*a* based at least in part on those selected documents. For example, the candidate additional terms may be selected based on terms in the selected documents other than the query terms 265*a* that are most relevant for those selected documents, such as based on TF-IDF values of those other terms for the selected documents and/or based on term frequency values for those other terms for the selected documents. In this example, the numbers illustrated in the information 270 for each term entry 274 and example document 272 reflects the TF-IDF value for that term and document. For example, with respect to entry 274*a* corresponding to term "home run", the term relevance value 272*a* of that term for example document 1 is indicated to be the TF-IDF value 1.333 (as previously indicated in entry 214*b* and column 212*e* of information 210 of FIG. 2A), and the term relevance value 272*b* for term "home run" in entry 274*a* for example document 2 is indicated to be the TF-IDF value of 1.125 (as previously indicated in row 224*b* and column 222*e* of information 220 of FIG. 2A).

Furthermore, in this example, the term relevance values for each of the terms 274 is then aggregated across the selected documents, such as by averaging those individual TF-IDF document-specific values, with the resulting determined aggregate term relevance score or number for each candidate additional term 274 being reflected in column 272*e*. In this example, the candidate terms 274 are shown in decreasing order of their determined aggregate relevance values for the query terms 265*a*, such that the candidate term "home run" in entry 274*a* is determined to be the most relevant candidate additional term for the specified query terms, and such that the candidate additional term "Canseco" in entry 274*f* is determined to be the least relevant candidate additional term for the specified query terms that are shown. The particular candidate additional terms that are selected for consideration based on the group of selected documents may be identified in various ways, such as by using a specified quantity of other terms from each document or from all documents that are determined to be most potentially relevant (e.g., by using TF-IDF values, term frequency values, or other individual document term relevance values), by using a specified percentage of the most potentially relevant other terms from each document or from all documents, by using some or all of the other terms whose TF-IDF values (or other individual document term relevance values) are above a specified threshold for at least one of the selected documents or for all of the selected documents or for some specified minimum subset of the most relevant documents or otherwise satisfy one or more defined criteria (e.g., a predefined threshold, such as a minimum term relevance number threshold; or a dynamically determined threshold, such as if grouping terms with similar term relevance number values provides a naturally occurring threshold between a group of the most relevant terms and other terms), etc. In other embodiments, the candidate additional terms and/or relevant documents may be selected in other manners, and the individual term relevance values and/or aggregate term relevance values may be determined in other manners. Additional details related to the generation of example term relevance scores or other values are included elsewhere.

FIG. 2F continues the example of FIGS. 2A-2E, and illustrates an example of information 275 that may be displayed or otherwise provided to the user to include information about possible other terms for selection and use with the previously indicated query terms 265*a*, which were shown with the visual indication 266 in FIG. 2D and are shown with the visual indication 276 in FIG. 2F. As previously noted, the provision of the information 275 may be prompted in various manners, such as in response to selection of the "Yes" user-selectable control in information 268 of the information 260 in FIG. 2D, or instead in other manners. In addition, in a manner similar to that of information 260 of FIG. 2D, the illustrated information 275 may be provided to the user in various manners, such as, for example, as part of a Web page that is generated and provided to a client device of the user for display, or otherwise as part of an information screen that is presented to the user (e.g., as part of the GUI of a software application executing on a computing device of the user, such as a software application provided by an operator of the DSRD service for use with the DSRD service, or instead provided by a third party).

The information screen 275 in this example includes a list 279 of possible other related terms for the specified query terms 265*a*, such as is generated in this example based on at least some of the candidate additional terms 274 of FIG. 2E. In particular, the example related other terms 279 include several entries 279*a*-279*e* that have been selected as being likely to be of interest to the user based on the inter-term relationship between the specified query terms 265*a* and the candidate additional terms 274, and are shown in order of decreasing determined inter-term relevance based on the aggregate relevance scores 272*e* of FIG. 2E. In addition, in this example, an indication of the inter-term relevance of each of the included possible other terms is shown, although in other embodiments such inter-term relevance information may not be included or may be shown in other manners—in this example, the determined term relevance scores from column 272*e* of FIG. 2*e* have been translated into a scale from 0 to 10, with possible other terms that are determined to be most relevant having a possible value of 10, and with the possible other terms that are determined to be less relevant having lower values. While not illustrated here, each of the possible other terms may be a user-selectable link or otherwise have one or more associated user-selectable controls to allow the user to select or otherwise specify that term as being of interest, such as to specify to include that selected term as part of a revised query, or to otherwise treat that term as being among the interests of the user. In other embodiments, the inter-term relevance information may be displayed in other manners, such as to indicate the actual determined term relevance scores 272e from FIG. 2E, to display a normalized version of such term relevance scores (in a manner similar to that previously described with respect to FIG. 2D for document relevance scores), etc. In addition, while textual descriptions of the term relevance values are not shown in FIG. 2F in a manner similar to those of FIG. 2D, in other embodiments such term relevance values may be shown.

FIGS. 2G and 2H continue the examples of FIG. 2A-2F, and in particular correspond to two alternative concepts or themes that the user may specify, such as by selecting additional related terms as indicated in FIG. 2F, or instead in another manner. In particular, FIG. 2G corresponds to an example in which the user has selected additional other terms "home run" and "Hank Aaron" to use along with prior terms "Bonds" and "steroids" as part of a group of expanded query terms 265b, such as based on selection of entries 279a and 279c of the list 279 in FIG. 2F. FIG. 2G also includes additional information 261b that indicates the relevance of the various example documents 1-5 to the expanded query terms 265b, in a similar manner to that previously discussed with respect to information 261a of FIG. 2C. The various information 261b in FIG. 2G may be used in various ways, such as to determine new search results that include the documents of the corpus that are most relevant to the expanded query terms 265b, which may be displayed or otherwise provided to the user (e.g., in a manner similar to that of FIG. 2D, such as to provide recommendations to the user based in part on the additional query terms). In addition, in some embodiments some or all of such information 261b may be illustrated to the user that specified the expanded query terms 265b, although in the illustrated embodiment the information 261b is not displayed to the user.

In this example, information 261b includes additional entries 264c and 264d relative to the information 261a of FIG. 2C, which have been added to correspond to the two additional query terms. Accordingly, the resulting aggregate normalized document relevance numbers in entry 264y have been updated with respect to the previous document relevance numbers of entry 264x of FIG. 2C to reflect the addition of the two additional terms. In this example, the aggregate normalized document relevance information in entry 264y continues to be based on an average of the individual term relevance numbers for each of the four expanded query terms 265b, although in other embodiments the aggregate normalized document relevance scores may be calculated in other manners (e.g., using a weighted average). In this example, the addition of the two additional search terms has reduced the determined relevance for example document 3, which was previously determined to be the most relevant document in FIG. 2C for the initial query terms 265a. In particular, as shown in column 262c and entry 264y of information 261b, the revised document relevance score for document 3 has been reduced from the previous value of 84% to the current value of 47%. In addition, the relative relevance of example documents 1 and 2 has increased relative to the information in FIG. 2C, as shown in columns 262a and 262b of information 261b, such that document 1 is determined to be the most relevant document for the expanded query terms 265b, and document 2 is determined to be the second most relevant document for the expanded query terms 265b.

In this example, the changes in the document relevance numbers can be understood intuitively based on the general topics of the example documents and the theme specified using the expanded query terms 265b. In particular, relative to the two initial query terms 265a of FIG. 2C, the expanded query terms 265b of FIG. 2G appear to be less related to the general steroids-related controversy in Major League Baseball, and more related to information specific to Barry Bonds and his attainment of the home run record. Accordingly, the example document 1 news article related to Bonds setting the home run record has now become the most relevant document to the expanded query, and example document 4 that is related to the steroids controversy more generally has become much less relevant. Example documents 2 and 3 continue to be at least moderately relevant to the expanded query terms 265b, as the example document 2 biography related to Bonds and the example document 3 related to Bonds' indictment both include discussion of the home run record, and example document 2 mentions the prior record holder Hank Aaron. While the user is illustrated in this example as having selected the two additional query terms "home run" and "Hank Aaron," in other embodiments and situations such additional terms may be automatically selected as being of likely interest to the user based on the inter-term relationships between the additional query terms and the two original query terms of "Bonds" and "steroids," and if so documents that are particularly relevant to the expanded query terms 265b (e.g., document 1) may be provided to the user as automatically generated user-specific recommendations for the user.

FIG. 2H illustrates an alternative to that shown in FIG. 2G, in which the initial query terms 265a of FIG. 2C have been expanded in a different manner, so as to specify a group of expanded query terms 265c that include additional query terms "indictment" and "Canseco," as well as the prior terms "Bonds" and "steroids". Such expanded query terms 265c may, for example, reflect a concept or theme of interest to the user that is, relative to the expanded query 265b of FIG. 2G, more related to Bond's alleged steroid use and the general steroids-related controversy in Major League Baseball, and less related to particular information about Bonds that is unrelated to his alleged steroid use. Accordingly, the information 261c of FIG. 2H is similar to information 261a and 261b of FIGS. 2C and 2G, respectively, but includes additional entries 264g and 264h corresponding to the two new query terms, and new entries 264z reflect revised document relevance numbers that are generated based on the new expanded query terms 265c. As would be intuitively expected, example documents 3 and 4, related to Bond's steroid-related indictment and Canseco's steroids-related testimony, respectively, are the most relevant documents among the example documents, while the relevance of example documents 1 and 2 that are not specific to the steroids controversy have significantly dropped. While the user in this example may have selected the two additional query terms "indictment" and "Canseco," in other embodiments and situations such additional terms may be automatically selected as being of likely interest to the user based on the inter-term relationships between the additional query terms and the two original query terms of "Bonds" and "steroids," and if so documents that are particularly relevant to the expanded query terms 265c (e.g., document 3) may be provided to the user as automatically generated user-specific recommendations for the user.

In a similar manner to that of FIG. 2G, the illustrated information 261c may in at least some embodiments not be displayed to the user, but other information similar to that of FIG. 2D may be displayed to the user to illustrate a revised list of relevant documents based on the new query terms 265c. In addition, the feedback provided by the user by selecting additional query terms as shown in FIGS. 2G and 2H may be used in other manners in at least some embodiments, including as feedback to modify the determined relevance of particular documents and/or of the inter-term relationships for particular terms relative to the initial query terms 265a of FIG. 2C.

Thus, as discussed with respect to FIGS. 2G and 2H, as well as elsewhere, the relevance of particular terms to each other and/or to a more general concept may be identified in various manners, including based on analysis of documents for a domain and/or based on user feedback related to particular terms. FIG. 9N provides a graphical illustration 975 of various concepts that may be identified and used for a particular domain of interest, which in this example continues to be baseball, including Major League Baseball ("MLB"). In this example, multiple concepts 977 and 978 have been automatically identified and are illustrated in FIG. 9N, with each concept including a textual summary or other label, as well as one or more related terms. Thus, for example, concept 977 has a textual label 977a of "steroid abuse in MLB," while concept 978 has a textual label 978a of "MLB home run record." Concepts 977 and 978 correspond generally to the examples of FIGS. 2H and 2G, respectively, as discussed above. In addition, concept 977 includes various related terms 977b, while concept 978 includes various related terms 978b, which in this example include some overlap (e.g., "Bonds" and "steroids") and each include multiple terms, although in other situations may have only a single term and/or may not have an overlap in terms with other concepts. It will be appreciated that a large number of additional concepts (e.g., hundreds, thousands, etc.) may be identified and used for a domain.

In addition, in the previously discussed examples, the example query terms 265a-265c have been specified in a relatively simple manner, in which the terms are listed without any indicated logical combination operation (e.g., AND, OR, etc.) or other indication of relative weighting or use. In other embodiments, other types of information may be specified for such search queries, and may be used in various ways. For example, in some other embodiments, users may be able to indicate not only query terms that are of interest (or in which they have a positive interest), but may also be able to indicate query terms that are not of interest for a particular query or theme (or in which they have a negative interest), and may also be allowed to modify an initial query in various other ways. For example, in a manner similar to that illustrated with respect to FIGS. 2E and 2F, information may be determined to reflect the least relevant other terms based on the initial query terms 265a, and such least relevant term information may similarly be displayed to the user to allow selection of terms to exclude from the expanded query. In such situations, the terms of interest may be combined with terms indicated to be excluded or that are otherwise not of interest in various ways. For example, with respect to the example of FIGS. 2C and 2D, query terms "Bonds" and "steroids" may be indicated to be of interest, but an expanded query term with the term "Canseco" indicated to be excluded may be specified. As shown in entry 264h of information 261c of FIG. 2H, the term "Canseco" is relevant only to document 4 of the example documents 1-5, and in particular has a document relevance number of 0.97 for document 4 in this example. Such information may be combined with the information 261a of FIG. 2C in various ways to treat the relevance of the excluded term "Canseco" to each of the documents as a reduction in overall document relevance number for the document based on the expanded query terms, such as by treating the term relevance value of an excluded term to a document as the negative of the term relevance value for an included term (along with expanding the range of possible values for the normalized document relevance numbers to be from −1 to 1). If so, a revised document relevance number of 0.01 may be generated for document 4 and the expanded query terms in this example, by taking an average of the individual term relevance numbers of 0.04 and 0.97 for "Bonds" and "steroids," along with the negative term relevance number of "−0.97" for "Canseco." It will be appreciated that relevance information about excluded terms and other terms that are not of interest may be used and combined with relevance information for terms of interest in other manners in other embodiments.

In addition, in a manner similar to that of FIG. 2D, in some embodiments a user may be allowed to specify one or more documents that the user considers to be particularly relevant to the query terms 265a, such as for use in determining other terms that are relevant to the query terms 265a and/or other documents that are relevant to the specified document (e.g., to request similar documents to the specified document). Alternatively, rather than listing particular other possible terms in the manner shown in FIG. 2F, one or more previously defined multi-term themes may instead be displayed to the user for possible selection and use in identifying further relevant documents. Such other defined themes may be specified in various ways, including a textual label (e.g., "Bonds career home run record") and/or using particular terms that are part of that defined theme (e.g., "Bonds, steroids, home run, Hank Aaron"). If particular defined themes are selected based on their relevance to the initial query terms 265a, at least some of the defined themes may not be based on at least one of the initially specified query terms 265a, such as to indicate a defined theme based on terms such as "Bonds, home run, Hank Aaron" but without "steroids," and another defined theme similar to that of query 265c. Similarly, in situations in which the user selects additional query terms to use as part of an expanded query, the user may further remove one or more of the prior query terms if so desired, such as to remove the term "steroids" in the example of FIG. 2G, or to indicate that such a term should be excluded as previously discussed. The determined term relevance and document relevance information may be similarly used in a variety of other manners in other embodiments.

As another illustrative example, techniques similar to those described above for query term expansion or other modification may also be used in situations in which an initially specified query term is misspelled or otherwise in a non-standard or atypical form (e.g., based on being in singular or plural form, based on a verb being in a particular tense, based on being in a different language, etc.). Thus, for example, if the query terms 276 of FIG. 2F were instead "bonds" and "staroids" (e.g., based on a user entering those terms but introducing uncertainty by misspelling "steroids" as "staroids" and by not capitalizing "Bonds"), the candidate other terms 279 may be expanded or otherwise modified to include additional terms related to addressing the uncertainty in the user-specified terms. With respect to "staroids," for example, one of the most relevant additional terms may be the term "steroids," such as for use instead of or in addition to "staroids." The additional term "steroids" may in some embodiments be identified based solely on a dictionary lookup for the unrecognized word "staroids" (e.g., optionally along with other suggested replacement terms, such as "asteroids," "toroids," etc.), although in other embodiments the previously discussed inter-term relevance techniques may be used to identify "steroids" as a possible or likely candidate for a replacement or supplementary term based on a previously identified relationship between the terms "staroids" and "steroids" (e.g., if "staroids" is a common misspelling of "steroids" by users) and/or based on a previously identified relationship between the terms "bonds" and "steroids." In a similar manner, in an effort to disambiguate the term "bonds," the additional terms may include choices such as "Barry Bonds," "stocks," "interest rates," "Bobby Bonds," etc., such as based on previously identified relationships between the term "bonds" and the other additional terms.

As previously noted, in some embodiments, an initial determination of the relevance of particular terms to particular documents and/or to particular other terms may be made based at least in part on using TF-IDF values or other information related to term frequency. In other embodiments, determinations of such relevance information may be made in other manners. As one example, the relevance of a particular term to one or more documents may be represented as a probability distribution or other distribution, and the respective distributions for two or more such terms may be compared to determine how similar those distributions are, as a measure of how related the respective terms are. Similarly, particular documents may each be represented as a distribution across multiple terms, and the respective distributions for two or more such documents may similarly be compared to determine how similar those documents are. Thus, for example, a search query with one or more terms and a document may be represented as a pair of probability distributions over desired and contained document terms, with a comparison of such probability distributions being performed for some or all documents in the corpus, so that the document having the most statistical information related to the query may be determined. As one example of performing such a comparison between two distributions, the Kullback-Leibler divergence statistical measure may be calculated to provide a convex measure of the similarity between two such distributions, while in other embodiments differences in statistical information entropy may be used to compare two such distributions. Additional details regarding performing examples of such comparisons are included below, and it will be appreciated that such comparisons may be performed in other manners in other embodiments.

In particular, the Kullback-Leibler divergence between two document-related or term-related distributions may be utilized to determine the similarity between the two distributions in some embodiments. The Kullback-Leibler divergence for two distributions P and Q may be expressed as follows, $$D_{KL}(P \| Q) = \sum_i P_i \log\left(\frac{P_i}{Q_i}\right)$$

where $P_i$ and $Q_i$ are values of the discretized probability distributions P and Q (e.g., for a document-related distribution for a document P, each $P_i$ may represent the percentage of words in document that match term i, may represent the degree of relevance of a particular term i to the document P, may represent the probability that term i is the most relevant term in document P, etc.). Other embodiments may use other statistical measures to compare two distributions, such as the difference between two statistical information entropy measures, whether instead of or in addition to a similarity measure such as from the Kullback-Leibler divergence. The statistical entropy of a probability distribution is a measure of the diversity of the probability distribution. Statistical entropy of a probability distribution P may be expressed as follows, $$H(P) = -\sum_i P_i \log P_i$$

where $P_i$ is a value of the discretized probability distributions P. The difference between two statistical entropy measures may then be measured by calculating the entropy difference measure. The entropy difference measure between two probability distributions P and Q may be expressed as the mutual information between the random variables as, $$I(P, Q) = \sum_{p \in P, q \in Q} p(p, q) \log\left(\frac{p(p, q)}{p(p)p(q)}\right)$$

where p(p) and p(q) represent the marginal distributions of P and Q, respectively, and where p(p,q) represents the joint distribution of P and Q. Alternatively, the entropy difference measure between two probability distributions P and Q could be expressed as, $$EM = \|H(P) - H(Q)\|^2$$

where H(P) and H(Q) are the entropies of the probability distributions P and Q, respectively, as described above.

In addition, as previously discussed, FIGS. 2A-2H illustrate examples of determining document-related relevance information and inter-term theme-related relevance information for a particular example group of documents, and using that relevance information in various manners. As discussed elsewhere, in some embodiments at least some of the determined relevance-related information may be represented in various particular manners, and may be updated to reflect user feedback and other changes. FIGS. 2I-2L illustrate particular examples of representing and revising determined document relevance information and term-related relevance information in various ways, and in particular in these examples by generating and updating neural networks that represent determined relevance-related information.

In particular, FIG. 2I illustrates an example neural network 295a that represents the relevance of particular documents to particular terms. In this example, the neural network 295a includes various input nodes 280 that correspond to terms identified for the corpus of documents, various output nodes 290 that represent documents in the corpus, and one or more layers of interior nodes 285 that represent calculations performed to generate document relevance numbers for particular output documents 290 based on particular input terms 280. While only a single set of interior nodes 285 are illustrated in FIG. 2I for the sake of simplicity, it will be appreciated that some such neural networks may have additional interior nodes. In addition, the links between nodes represent relationships between those nodes, and may include associated weights as discussed below.

As previously discussed with respect to FIG. 2C, a search query was specified that included two query terms 265a, those being "Bonds" and "steroids". Nodes 280a and 280c in FIG. 2I represent those terms in the generated neural network, and are illustrated in bold for the sake of recognition. In addition, in the example of FIG. 2C, normalized document relevance numbers 264x were determined for various documents in the corpus, including example documents 1-4, and those example documents 1-4 have corresponding nodes 291-294 in this example. In addition, information 297 is illustrated in this example to show the normalized document relevance numbers for those example documents 1-4 based on the two query terms 265a for this example, referred to as "AC" for shorthand to reflect the associated interior nodes 285a and 285c that correspond to the nodes 280a and 280c for those terms. Thus, for example, the illustrated normalized document relevance value 297a for document 1 based on the query terms 265a is a value of 0.48, as previously shown in column 262a for entry 264x of FIG. 2C. Similar information 297b-297d is illustrated for example documents 2-4.

In this example, the calculation of the document relevance numbers for the output documents 290 in the generated neural network is separated into two parts that correspond to the links 282 between the input terms 280 and the interior nodes 285, and the links 287 between the interior nodes 285 and the output documents 290. In addition, information 287a and 287b is illustrated to reflect information about the various links 287 that are shown, including by indicating an initial weight that is associated with each link based on the initial determined document relevance information. For example, with respect to the link between interior node A 285a and output node 291 corresponding to example document 1 (referred to in shorthand as link "A-D1" in the information 287a), that link is initially given a weight of 0.000518, or $5.18 \times 10^{-4}$, as shown in information 287b. Similarly, with respect to the link between interior node C 285c and output node 291 (referred to in shorthand as link "C-D1" in the information 287a), that link is initially given a weight of 0.000053 in information 287b. In addition, the links 282 between input nodes 280a and 280c and interior nodes 285a and 285c, respectively, may be used to determine values of 1,641 and 2,075, respectively, based on the example term relevance information described in FIG. 2C, and as described in greater detail below. Thus, the normalized document relevance value 297a for example document 1 based on the query terms 280a and 280c may be determined from the neural network based on those two links A-D1 and C-D1, as well as on the interior nodes 285a and 285c, and on the links 282 between the input node 280a and interior node 285a and between the input node 280c and interior node 285c (e.g., by calculating 1641*0.000518=0.85 as the document relevance number for term "Bonds", by calculating 2075*0.000053=0.11 as the document relevance number for term "steroids", and with their average being 0.48, as illustrated in information 261a of FIG. 2C). Additional details regarding one example embodiment of generating such a neural network follows, including with respect to equations 1-5 below.

In particular, once the relevance of particular terms to particular documents has been determined (e.g., as reflected in the DR scores for the combination of those documents and those terms), that information may be represented in various ways, including using a neural network that may be updated based on user feedback and in other manners. Similarly, once the relevance of inter-term relationships from particular terms to other groups of one or more terms has been determined (e.g., such as based in part on relevant documents for some or all of those terms), that information may also be represented and updated in various ways, including using a similar neural network that may be updated based on user feedback and in other manners. The weights and/or other aspects of such neural networks (e.g., particular links) may be then modified to reflect feedback and other additional information that is obtained over time, such as to improve the relevance information provided by the neural network over time to reflect automated learning from the feedback and other additional information that may be obtained. The following illustrates one particular example of generating such neural networks and of updating weights in such neural networks, and other embodiments may use other related techniques.

As previously noted, the DR score (also referred to below as a "HDR score") for a document d relative to a group g of one or more specified terms i may be determined as follows in at least some embodiments.

$$DR(d, g) = \frac{1}{NTerms(g)} \sum_{i}^{g} \frac{TF \cdot IDF_{i,d} - \min(TF \cdot IDF_i)}{(\max(TF \cdot IDF_i) - \min(TF \cdot IDF_i))} \quad \text{Equation 1}$$

This DR formula may similarly be used to represent a set of neural network weights representing a linear combination, plus biases, of TF.IDF values for individual terms i in a query having a group g of one or more such terms i corresponding to a particular document j as follows.

$$HDR(j) = \sum_{i=1}^{g} [\beta_{ij} TF \cdot IDF_{ij} - \gamma_i] \quad \text{Equation 2}$$

where $$\beta_{ij} = \frac{1}{NTerms(g) \cdot \left(\max_k TF \cdot IDF_{ik} - \min_k TF \cdot IDF_{ik}\right)},$$

and $$\gamma_i = \frac{\min_k TF \cdot IDF_{ik}}{NTerms(g) \cdot \left(\max_k TF \cdot IDF_{ik} - \min_k TF \cdot IDF_{ik}\right)}.$$

Such neural network weights based on calculated DR scores may be used to initialize a generated neural network to correspond to the calculated DR scores.

Furthermore, using the definition of TF.IDF, where $x_{ij}$ is the Term Frequency of term i in document j, a TF.IDF value may be represented as follows:

$$TF \cdot IDF_{ij} = -x_{ij} \log\left(\frac{\sum_j \sigma(x_{ij})}{N}\right) \quad \text{Equation 3}$$

where σ(x) is the Heaviside Function (whose value is zero if its argument x is negative and one if its argument x is zero or positive), and N is the number of documents in the corpus.

Therefore, substituting in HDR(j) results in the following:

$$HDR(j) = -\sum_{i=1}^{g}\left[\beta_{ij}x_{ij}\log\left(\frac{\sum_{j}\sigma(x_{ij})}{N}\right) - \gamma_i\right] \quad \text{Equation 4}$$

For a query having a group g of one or more terms t, the term frequencies in the document may be viewed as the weights of those terms in a projection into each document, and then for a given query a set of weights $U_{ij}=\beta_{ij}*x_{ij}$ and coefficients $\alpha_l$ may be defined such that a relevance Neural Network may generally be expressed as follows, $$HDR(j) = h_j = -\sum_{l=1}^{NTerms}[U_{lj}t_l\log(\alpha_l t_l) - \gamma_l] \quad \text{Equation 5}$$

and initialized with weights such that it implements TF.IDF query relevance scoring, where $$U_{ij} = \frac{x_{ij}}{NTerms(g) \cdot \left(\max_{k}TF \cdot IDF_{ik} - \min_{k}TF \cdot IDF_{ik}\right)},$$

$$\gamma_i = \frac{\min_{k}TF \cdot IDF_{ik}}{NTerms(g) \cdot \left(\max_{k}TF \cdot IDF_{ik} - \min_{k}TF \cdot IDF_{ik}\right)},$$

and $$\alpha_l = \frac{\sum_{j}\sigma(x_{ij})}{N}.$$

Such weights U correspond generally to the weights 287b of FIG. 2I for links 287 between interior nodes 285 and output document nodes 290.

Furthermore, as previously noted, such a generated neural network may be updated to reflect feedback and other information that indicates additional relevance-related information for the domain. For example, a quadratic error function may be used over a set of training examples {t,h}, as follows:

$$E = \sum_{examples}\left[-\sum_{l=1}^{NTerms}[U_{lj}t_l\log(\alpha_l t_l) - \gamma_l] - h\right]^2$$

Back-propagation rules for updating the network weights by stochastic gradient descent may then be derived. Accordingly, the derivatives of E with respect to the weights of the model may be calculated, as follows:

$$\frac{\partial E}{\partial U_{lj}} = 2\sum_{Examples}\left[-\sum_{l=1}^{NTerms}[U_{lj}t_l\log(\alpha_l t_l) - \gamma_l] - h\right] \cdot t_l\log(\alpha_l t_l)$$

$$\frac{\partial E}{\partial \alpha_l} = 2\sum_{Examples}\left[-\sum_{l=1}^{NTerms}[U_{lj}t_l\log(\alpha_l t_l) - \gamma_l] - h\right] \cdot \frac{U_{lj}}{\alpha_l}$$

$$\frac{\partial E}{\partial \gamma_l} = -2\sum_{Examples}\left[-\sum_{l=1}^{NTerms}[U_{lj}t_l\log(\alpha_l t_l) - \gamma_l] - h\right]$$

Training cases may be developed in various manners in various embodiments, including by using user selection of a given document to set a target value of $h_j$ equal to or some percentage greater than the value for the current most relevant document.

When a generated neural network is expanded to reflect relationships between terms, such as may be useful for disambiguating between multiple overlapping or otherwise related themes, learning may be performed in various manners in various embodiments. The example neural network 295c of FIG. 2K illustrates such an expanded neural network, in which new term-based output nodes 283 are illustrated, with new links 296 between the document-based nodes 290 and the new term-based output nodes 283. For example, in such situations, it is possible to choose either to keep the term frequency weights V fixed, or instead to adapt both weights U and V via back-propagation. As previously noted, the weights U correspond generally to the links 287 between interior nodes 285 and document nodes 290, with exemplary weights 287b illustrated in FIG. 2I, and the weights V correspond generally to the links 296 between document nodes 290 and term-based output nodes 283, with exemplary weights 296b illustrated in FIG. 2K.

In such a situation, one further feed-forward step is used for the links between the document-based nodes 290 and new term-based output nodes 283, for the purpose of disambiguation d, as follows:

$$d_i = \sum_{j}V_{ij}h_j, \text{ initialized with } V_{ij} = x_{ij}$$

In the situation in which weights V are fixed, the weights V may be inverted and applied to the new d to obtain appropriate feedback values of h. Alternatively, weights U and V and $\alpha_l$ and $\gamma_l$ may be modified with an updated error function $E^{(d)}$, as follows:

$$E^{(d)} = \sum_{Examples}\left[-\sum_{j}V_{ij}\left[\sum_{l=1}^{NTerms}U_{lj}t_l\log(\alpha_l t_l) - \gamma_l\right] - d\right]^2$$

Then the gradient descent learning rules have the form as follows:

$$\frac{\partial E^{(d)}}{\partial V_{ij}} = 2\sum_{Examples}\left[-\sum_{j}V_{ij}\right]$$
$$\left[\sum_{l=1}^{NTerms}U_{lj}t_l\log(\alpha_l t_l) - \gamma_l\right] \cdot \left[-\sum_{l=1}^{NTerms}U_{lj}t_l\log(\alpha_l t_l) - \gamma_l\right]$$

$$\frac{\partial E^{(d)}}{\partial U_{lj}} = 2\sum_{Examples}\left[-\sum_{j}V_{ij}\left[\sum_{l=1}^{NTerms}U_{lj}t_l\log(\alpha_l t_l) - \gamma_l\right] - d\right] \cdot V_{ij}t_l\log(\alpha_l t_l)$$

$$\frac{\partial E^{(d)}}{\partial \alpha_l} = 2\sum_{Examples}\left[-\sum_{j}V_{ij}\left[\sum_{l=1}^{NTerms}U_{lj}t_l\log(\alpha_l t_l) - \gamma_l\right] - d\right] \cdot \sum_{j}\frac{V_{ij}U_{lj}}{\alpha_l}$$

$$\frac{\partial E^{(d)}}{\partial \gamma_l} = -2 \sum_{Examples} \left[ -\sum_j V_{ij} \left[ \sum_{l=1}^{NTerms} U_{lj} t_l \log(\alpha_l t_l) - \gamma_l \right] - d \right]$$

In addition, the range of learned parameters may be constrained by implementing a 'weight decay' regularization in at least some embodiments. As such, this results in adding quadratic terms to E and $E^{(d)}$ in U, V, $\alpha_l$ and $\gamma_l$. The derivatives on the different weights therefore result in linear terms in the gradients of E and $E^{(d)}$ in the weights causing gradient descent to effect and exponential decay in them in the absence of an error signal based on difference to the target values of h or d. Thus for w (any network weight U, V, $\alpha_l$ and $\gamma_l$) an additional term $$\frac{\partial \Delta E}{\partial w} = \epsilon w$$

may be added to the gradient, where $\epsilon$ is a parameter.

While particular details have been described with respect to embodiments for generating and updating such neural networks, it will be appreciated that other neural networks may be generated and/or updated in other manners in other embodiments.

Returning to the examples previously described with respect to FIGS. 2A-2I, FIG. 2J continues those examples, and in particular illustrates changes that may occur for the neural network 295a of FIG. 2I over time based on feedback related to use of the determined relevance information for the corpus. In particular, a modified neural network 295b is illustrated in FIG. 2J, in which modifications have been made to the normalized document relevance value of example document 1 for the query terms 280a and 280c. Such changes may be based on, for example, repeated selection by users of example document 1 for review or other use after query terms 280a and 280c have been specified, such as to reflect implicit user feedback that example document 1 is the most relevant document that corresponds to those specified terms, or instead explicit feedback from users that indicates such relevance of example document 1. Accordingly, in this example the document relevance number 297a for example document 1 has been modified so that document 1 is the most relevant of all the example documents based on the user feedback, such as in this example by modifying the normalized document relevance number to be equal to or above the most relevant other document by a specified margin (e.g., by 0.01 in this example). In addition, to reflect the higher normalized document relevance number 297a, the value of links A-D1 and C-D1 have been modified, as shown in modified information 287c. In this example, the modified link weights and document relevance number 297a are shown in bold for the sake of convenience, as well as the visual representations of the links A-D1 and C-D1. It will be appreciated that the modifications to the weights for links A-D1 and C-D1 to reflect the increased document relevance value 297a may be distributed between those links in various ways, such as by increasing the link weights equally or proportionally to correspond to the increased document relevance number. Alternatively, in other embodiments the learning may cause particular link weights to be updated, and updated document relevance numbers may instead be generated to correspond to those updated link weights.

In addition, while not illustrated in FIG. 2J, in some embodiments the modification of the document relevance score for example document 1 and/or the modification of the link weights for links A-D1 and C-D1 may further cause modifications to other generated document relevance numbers and/or link weights. For example, when the relevance of example document 1 is increased for the specified terms 280a and 280c, the relevance of other example documents 2-4 may be lowered with respect to those specified terms 280a and 280c to reflect a lower relative relevance value. If so, the determined document relevance numbers 297b-297d may be lowered in various manners (e.g., proportionally), and corresponding link weights for the links between interior nodes 285a and 285c and those other example documents 2-4 may be lowered. Such other information that may be lowered in this example is shown in italics for the sake of convenience, although the example values have not been adjusted in FIG. 2J. In addition, it will be appreciated that in some situations a particular term may be determined to have no relevance to a particular example document, such as with respect to the term "indictment" as represented in input node 280e and the example document 1, as reflected in the value 212e in row 214j for that term and document in FIG. 2A. If so, the link between the interior node 285e and the node 291 corresponding to the example document 1 may not be present, or instead may be present but with a weight value of 0. In this example, the links 287 that have 0 value weights and may not be present are shown using dashed lines. It will be appreciated, however, that a particular link such as E-D1 may initially be determined to have a weight of 0 and no relevance to a particular document such as example document 1, but learning and other modifications over time to the determined relevance information for the domain may indicate that some relevance does exist between that term and that document, and if so the corresponding link and associated weight in the modified neural network may be modified to reflect that modified determined relevance.

In addition, while not illustrated here, in some embodiments neural networks such as 295a and 295b of FIGS. 2I and 2J may be modified in other manners after they are created. For example, if additional documents for the corpus become available after a neural network for the corpus has been generated and/or updated, in some embodiments the additional documents may be incorporated into the existing neural network in various manners without re-generating the entire neural network. As one example, new output nodes 290 may be created for such new documents and new links 287 may be generated between the interior nodes 285 and output document nodes 290. Furthermore, the weights to be assigned to the new links 287 may be determined in various manners, such as by initializing those weights based on initial determined relevance values for existing terms to the new documents, by taking an average of corresponding link weights that are already in the neural network or otherwise generating the new link weights based on some or all of the existing link weights, by determining the most similar other existing documents (e.g., by assessing document similarity using the Kullback-Leibler divergence statistical measure, as previously discussed, or instead in another manner) and initializing link weights and/or document relevance values for the new documents based on the most similar other existing documents (e.g., to take the average of the corresponding values for the most similar other existing documents), etc.

FIG. 2K illustrates an example neural network 295c that is similar to the neural network 295a of FIG. 2I, but reflects additional determined theme-related relevance information for the corpus. In particular, in this example, the neural network 295c includes similar input nodes 280 corresponding to terms, interior nodes 285 and document nodes 290 corresponding to determined normalized relevance numbers for the documents based on the input terms, but further includes additional output nodes 283 that correspond to the terms for the corpus, as well as additional links 296 between the document-related nodes 290 and the new term-related output nodes 283. As discussed in greater detail elsewhere, in some embodiments the determination of relevance between one or more first terms and one or more other terms may be based at least in part on documents that are determined to be relevant to the first terms, such as to identify possible other relevant terms using those documents. In this example, additional information 296a and 296b is shown to reflect the weights of the links 296, in a manner similar to that previously described with respect to FIG. 2I.

The initial state of this example neural network 295c corresponds to the example of FIG. 2E, in which the relevance of other terms is determined based on the example initial query terms 265a. Thus, for example, the displayed information 298 in FIG. 2K includes indications of determined relevance of particular other output terms 283 based on the input terms 280a and 280c (shown in bold for the sake of convenience), such as the term relevance number 298b for output term 283b for term "Hank Aaron" that corresponds to information 272e for entry 274c in FIG. 2E. Term relevance numbers 298d and 298e similarly indicate term relevance numbers determined for output terms "home run" 283d and "indictment" 283e based on the input terms 280a and 280c.

Figure 2L:
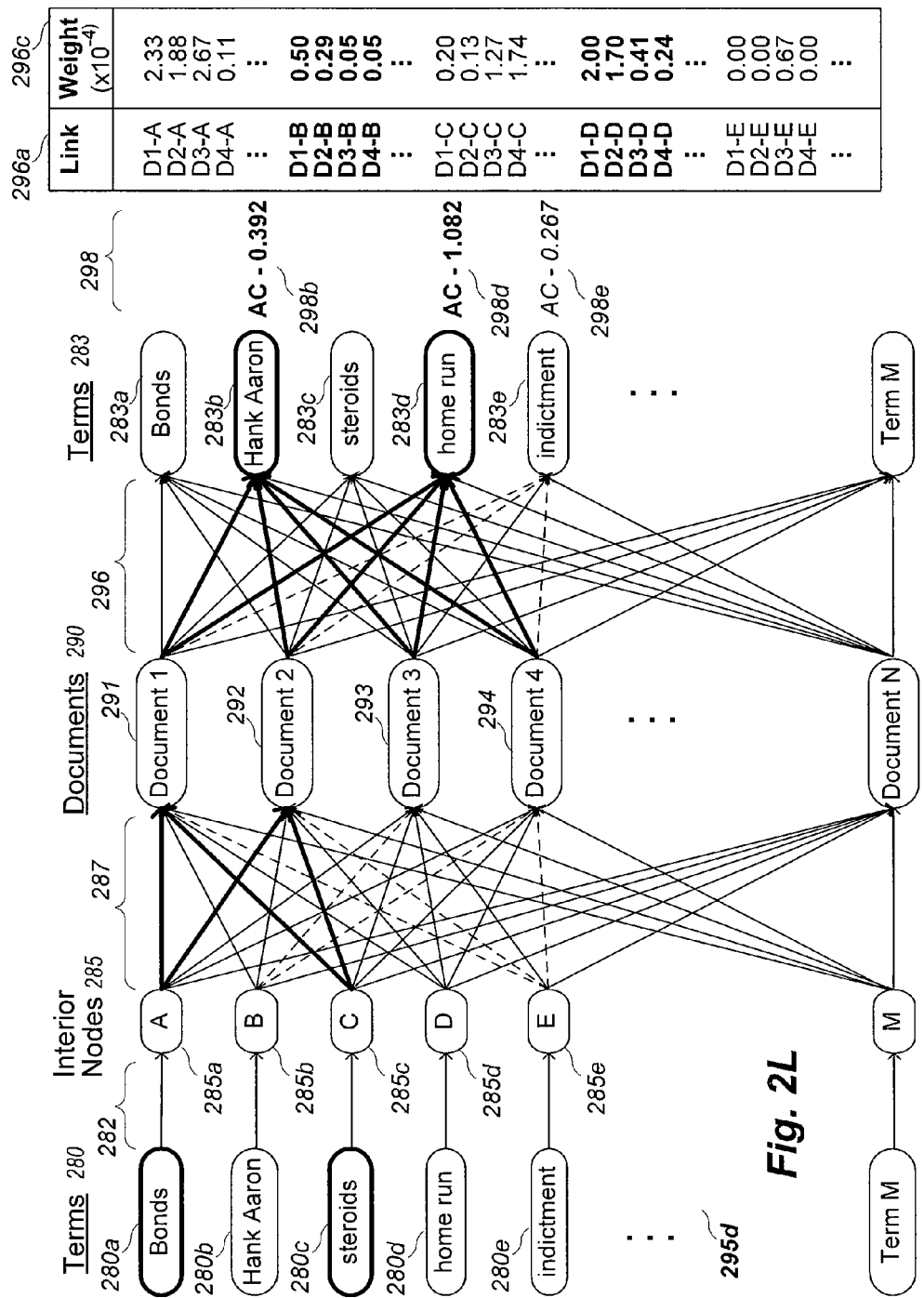

In a manner similar to that of FIG. 2J, FIG. 2L illustrates a modified neural network 295d that shows changes to the neural network 295c of FIG. 2K corresponding to learned changes in the relevance of particular output terms to particular input terms. In this example, the input terms of current interest continue to be the query terms 265a corresponding to input nodes 280a and 280c, and the determined relevance of output terms "Hank Aaron" 283b and "home run" 283d has been modified to reflect a learned increase in the relevance of those output terms with respect to those input terms. For example, as illustrated in FIG. 2G, a number of users may have selected the additional terms "Hank Aaron" and "home run" for use in expanded queries with the terms "Bonds" and "steroids," as was previously discussed with respect to the example of FIG. 2G. In this example, revised term relevance numbers 298b and 298d have been selected for output nodes 283b and 283d, respectively, which in this example correspond to a 50% increase in the relevance numbers for these two output terms based on the two input terms. In addition, the corresponding link weights have been modified accordingly, which in this example correspond to the links from each of the subset of documents that were determined to be most relevant to the input terms 280a and 280c (which in this example include example documents 1-4 as described in FIGS. 2C and 2D) to the affected output term nodes 283b and 283d. The term relevance numbers 298 and links 296 that have been modified in this example are shown in bold for the sake of convenience.

In addition, in some embodiments the weights associated with some of the links 287 may similarly be modified, either instead of or in addition to the modifications to the links 296, such as to increase the weights for the links between the interior nodes 285a and 285c and one or more of the example documents 1-4 to accommodate some or all of the increased relevance of the output terms 283b and 283d for the input terms 280a and 280c. In addition, it will be noted that the weights of links D3-B and D4-B have been increased from having 0 values in FIG. 2K to having small associated weights in this example, although in other embodiments such weights with 0 values may not be increased.

Figure 2M:
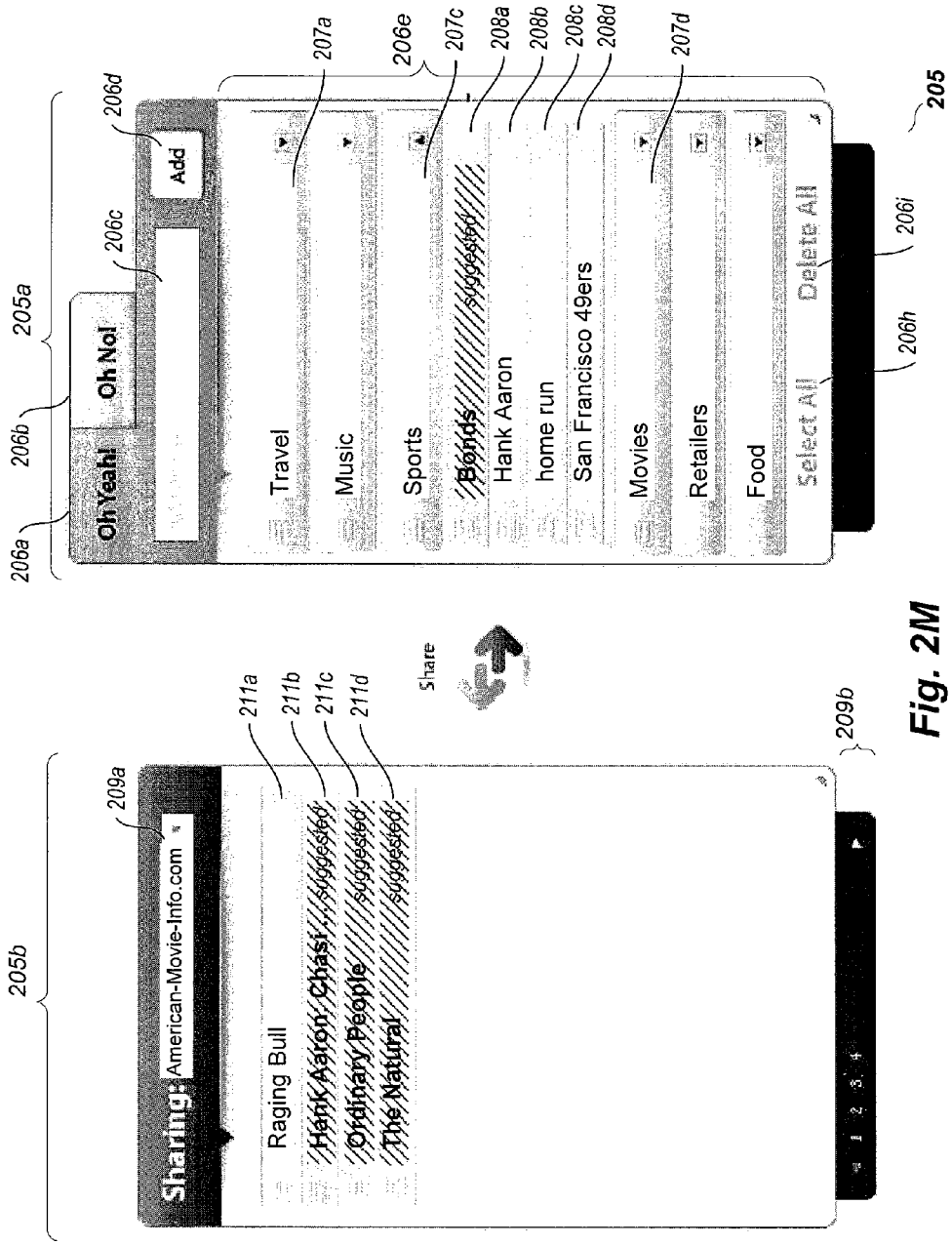

FIG. 2M illustrates one example of a GUI 205 that may be used in some embodiments to provide a user with information about determined relevance information for one or more domains of interest, such as by the DSRD service in this example, or instead by a related service. For example, as previously discussed with respect to FIG. 2D, FIG. 2F and elsewhere, a user may in some embodiments be provided with recommendations based on known preferences of the user, such as to include additional terms that are determined to likely also be preferred by the user and/or to include content items that are related to such likely additional terms. In the example of FIG. 2M, the GUI 205 is being provided to a particular user based on known and inferred preferences of the user, with the particular user in this example being User X previously discussed with respect to FIGS. 9H-9I. As previously discussed, User X is known to have positive preferences for the terms "Hank Aaron" and "home run" and to have a negative preference for the term "Giants," with respect to the baseball domain. From those known preferences, other preferences may be inferred related to the baseball domain, such as with respect to the term "Bonds." Furthermore, preferences in other domains may similarly be inferred for User X based on the known and inferred preferences in the baseball domain, such as is discussed in further detail with respect to the domain of American movies in FIG. 9J.

In particular, in the example of FIG. 2M, the GUI 205 includes a pane 205a that is displayed to User X (not shown), which includes information about various known and inferred term preferences 208 for various categories or domains 207. In this illustrated example, a user-selectable tab 206a corresponding to User X's positive preferences is currently selected, such that the information in the lower section 206e of pane 205a currently includes information about such positive preferences. If the user-selectable tab 206b is instead selected, the information in the lower section 206e will be updated to show information about User X's known and inferred negative preferences. In addition, one or more of the categories/domains 207 may be selected for expansion in the lower section 206e so as to show the known and preferred preferences for User X for that category/domain, such as is currently shown with respect to the "Sports" category/domain 207c. In particular, in this example, four known and inferred positive term preferences 208 are shown for the "Sports" category/domain 207c, including known preferences 208b-208d for terms "Hank Aaron," "home run," and "San Francisco 49ers," respectively, and inferred suggested preference 208a for terms "Bonds" (shown in this example in a shaded or otherwise highlighted fashion, such as with a different color in a GUI that uses multiple colors, to indicate to User X that it is a suggested preference). In addition, in this example, User X may specify other preferences using user-selectable text input control 206c and selection control 206d, or otherwise modify and manipulate preferences using user-selectable controls 206h and 206i. It will be appreciated that other GUIs may display the same or other information in a wide variety of manners and using a wide variety of user interface controls and manipulation techniques. As one example, User X may be provided with a mechanism to select or otherwise indicate whether the suggested term preference 208a for term "Bonds" is an actual positive or negative preference, or to otherwise remove the suggested term preference from the current view. Furthermore, some embodiments and situations may involve GUI screens of differing size that display varying amounts of information, such as to display many more term preferences (whether known and/or inferred suggestions) at a single time.

In addition, in the example of FIG. 2M, additional information 205b is illustrated to correspond to another service (in this example, an online service with information about movies, using a hypothetical "American-Movie-Info.com" Web domain) that interacts with the DSRD service to exchange information about known and inferred term preferences of User X. In some embodiments, the information 205b may be illustrated as an additional pane of the GUI 205 of the DSRD service, such as simultaneously or serially with the pane 205a. In other embodiments, the information 205b may instead by displayed or otherwise presented to User X by the other service in a manner independent of the GUI 205, or instead some or all of the additional information 205b may be displayed to User X as part of pane 205a (e.g., by expanding category/domain 207d of pane 205a, such as to illustrate information provided to the DSRD service by the other movie-related service. Furthermore, in some embodiments and situations, multiple such other services may be available and affiliated with the DSRD service, and if so may be selected using the user-selectable dropdown control 209a, selection controls 209b, or in other manners.

In this example, the additional information 205b illustrates a known preference 211a of User X for the movie "Raging Bull" (e.g., based on information that is previously or dynamically supplied to the other service by the DSRD service, based on information that the other service previously obtained from User X or other sources, etc.), and illustrates three inferred suggested preferences 211b-211d for User X based on the known preference 211a and other preference information 208 available from the DSRD service. For example, FIG. 9J provides additional exemplary details regarding how movie-related preferences may be determined based at least in part on such preference information 208 for User X. Thus, in this manner, a service that provides a GUI such as GUI 205 may provide and obtain preference-related information for various users, and may use such information to provide various benefits to the users and to the service. In a manner similar to that of pane 205a, it will be appreciated that other GUIs may display the same or other information such as that of information 205b in a wide variety of manners and using a wide variety of user interface controls and manipulation techniques, including with varying amounts of information.

It will also be appreciated that the various weights, relevance numbers, and other information illustrated for the example neural networks 295a-295d are provided for the sake of illustration, and may have other forms and may be modified in other manners in other embodiments. In addition, the information illustrated in the examples of FIG. 2A-2M has been provided for illustrative purposes only, and it will be appreciated that various of the activities described may be performed in other manners in other embodiments. In addition, various other details have been shown in an abstract manner or not illustrated for the sake of understanding. Furthermore, various other types of functionality may be provided and used by a DSRD service in various embodiments, as discussed in greater detail elsewhere. It will also be appreciated that while a small number of terms, documents, and neural network nodes are illustrated, in actual embodiments the actual quantities may be much larger, such as to include hundreds of thousands of terms and millions of documents, with corresponding numbers of neural network nodes.

While the examples of FIGS. 2A-2M are based on analyzing terms that are present in textual documents or other content items, it will be appreciated that the described techniques may be used in other manners and with other types of content. In particular, a corpus of content items with other types of content may be analyzed in order to identify any other type of recognizable feature or property or other attribute that is part of the contents of those content items or that is otherwise associated with those content items, and the relevance of particular attributes to content and/or to other such attributes may be determined in manners similar to those discussed for textual terms. A non-exclusive list of such content item attributes includes the following: a type of a content item (e.g., an audio stream or file, a video stream or file, an image etc.); a source of a content item; a particular object in image or video content; a particular pattern of information in a stream or file content item; a particular type of metadata associated with a content item; etc. Such attributes may each be treated as a term, such as to provide search results that are relevant to specified attributes and/or to define themes or other groups of one or more related attributes.

In addition, while the examples of FIGS. 2I-2L use neural networks and back propagation learning to improve determined relevance information over time, in other embodiments other types of machine learning techniques or adaptive systems may instead be used. As one example, in some other embodiments the initial determined relevance information may be represented using a probabilistic Bayesian neural network that has a similar structure to that discussed in the examples of FIGS. 2I-2L, but with the node values representing conditional probabilities based on corresponding input values from preceding linked nodes in the network, with probabilistic belief propagation used to determine particular relevance values, and with learning involving updating conditional probability values to correspond to feedback over time.

In addition, while examples are previously discussed with respect to a user specifying query terms or preference information, other types of information may be used in various manners in various embodiments. For example, a group of information that is specific to a user may be automatically analyzed and used to determine preference information for that user, which may then be used to automatically determine other content that is relevant to that preference information. Non-exclusive examples of such user-specific information that may be analyzed include groups of email and other communications (e.g., all email that a user has sent and/or received for a specified period of time, some or all entries in a user's blog or other set of records, etc.), logs or histories of user actions of various types (e.g., histories of searches that are performed and/or interactions with resulting search results), information about a user's social networks and other relationships, etc. Alternatively, one or more such groups of user-specific information may instead in some embodiments be treated as a corpus of documents that may be of interest to that user (and/or to others), such as automatically determine themes of interest to the user based on an analysis of such user-specific information, and/or to allow retrieval of particular pieces of such user-specific information that is relevant to current interests of the user.

For example, a user may be accessing a document, and the context of information from that document may be used to identify other relevant content items (e.g., from that user's computing system, from the Internet or other external network or data store, etc.). As one specific illustrative example, a user John Doe may be editing his/her resume, and may desire to obtain relevant work history data or other related data from the user's email store and the Web. The email store may, for example, have emails related to past work done by the user for Company 1 and Company 2, with the headers of those emails including the respective company names. A data store for the user (whether local or remote) may also contain one or more past resumes of the user or resume examples, and a work-related social networking site may have a history of the user's past employment. In such a situation, the context that the particular user has the resume open may be used to automatically expand or supplement a search that the user specifies with the query term "Doe," such as to add one or more of the additional query terms "John," "Company 1," "Company 2," "resume," job title or description information from the resume, geographical location information for the user from the resume or from other stored profile or preference information for the user, etc. The expanded search may then identify various types of relevant documents or other information, such as the emails related to past work done by the user for Company 1 and Company 2, other stored documents related to Company 1 and Company 2, the past resumes or resume examples, the employment history information from the work-related social networking site, etc.

Additional details related to examples of determination of relevant information related to domains of interest and to possible use of such determined relevant information are available in U.S. patent application Ser. No. 12/334,389, filed Dec. 12, 2008 and entitled "Electronic Profile Development, Storage, Use, and Systems Therefor;" in U.S. patent application Ser. No. 12/334,416, filed Dec. 12, 2008 and entitled "Advertising Selection and Display Based on Electronic Profile Information;" in U.S. patent application Ser. No. 12/392,933, filed Feb. 25, 2009 and entitled "Determining Relevant Information For Domains Of Interest;" in U.S. patent application Ser. No. 12/334,389, filed Dec. 12, 2008 and entitled "Electronic Profile Development, Storage, Use, and Systems Therefor;" in U.S. patent application Ser. No. 12/334,416, filed Dec. 12, 2008 and entitled "Advertising Selection and Display Based on Electronic Profile Information;" in U.S. patent application Ser. No. 12/392,908, filed Feb. 25, 2009 and entitled "Electronic Profile Development, Storage, Use, and Systems For Taking Action Based Thereon;" and in U.S. patent application Ser. No. 12/392,900, filed Feb. 25, 2009 and entitled "Platform For Data Aggregation, Communication, Rule Evaluation, And Combinations Thereof, Using Templated Auto-Generation," each of which is hereby incorporated by reference in its entirety.

Furthermore, as described in greater detail elsewhere, the described techniques may be used in situations other than identifying or retrieving relevant content items. For example, an automated analysis of a first group of content items may be used to identify themes that correspond to types or categories of data in the content items of the first group (e.g., based on the data having matching or similar patterns), and those identified themes may be used to categorize or otherwise determine a type of another data item that is used as a query term. As one illustrative example, various types of encrypted data may be analyzed, such that themes are identified that correspond to types of encryption schemes. If an encrypted file or other piece of encrypted data is later supplied or otherwise specified, the DSRD service may automatically be used to identify one or more of the most likely encryption schemes used to encrypt that specified data piece. More generally, the identified themes from a first group of content items may be types of valid solutions that are relevant to a subject area, so that later queries may pose some type of mathematical or other problem for which one or more corresponding identified themes are automatically determined as possible solutions. It will be appreciated that the described techniques may similarly be used in a variety of other manners.

Figure 3:
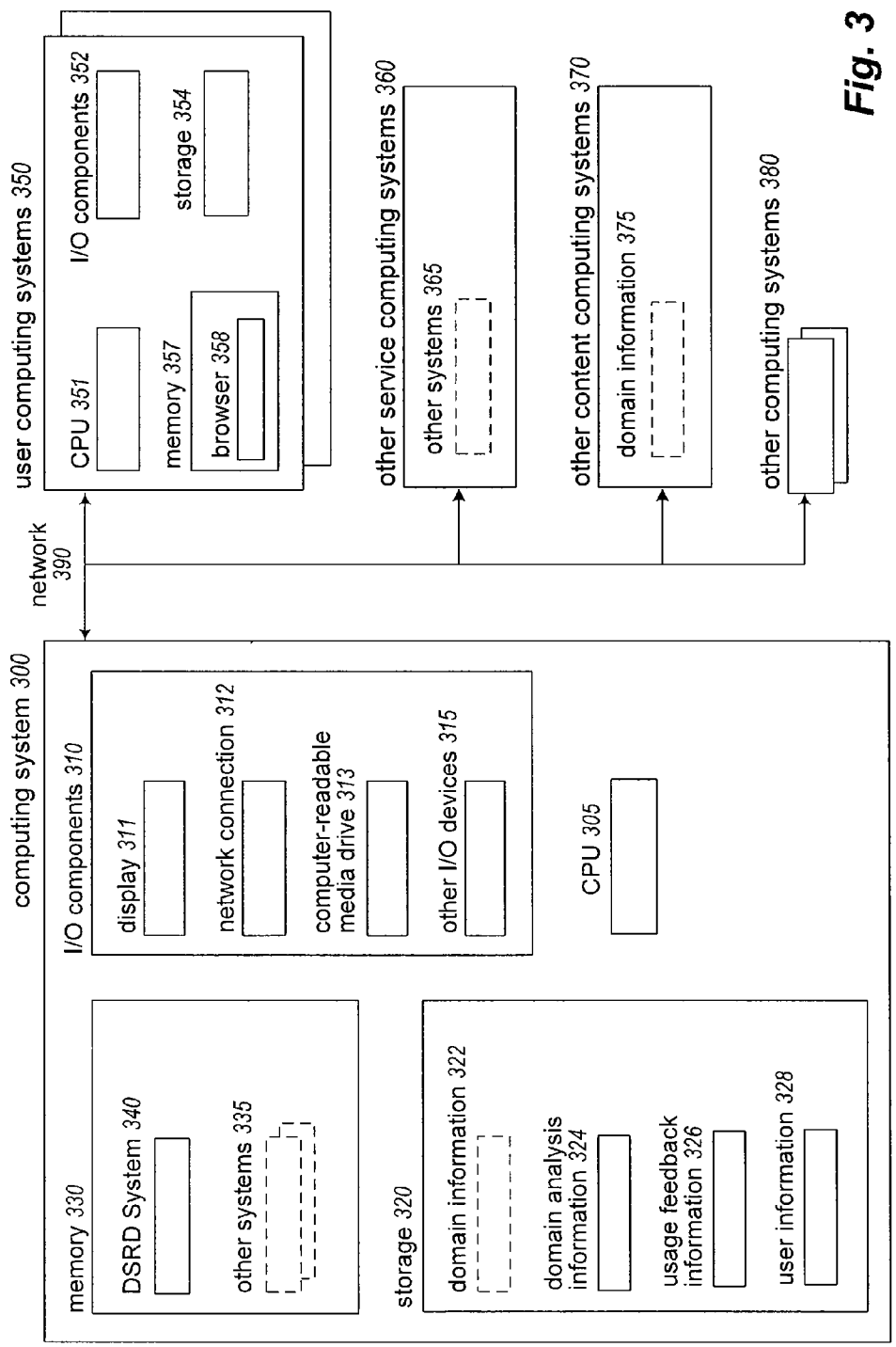
FIG. 3 is a block diagram illustrating an example of a computing system for use in the determination of relevance information related to domains of interest.

FIG. 3 is a block diagram illustrating an example embodiment of a system suitable for performing techniques to determine relevant information related to domains of interest. In particular, FIG. 3 illustrates a computing system 300 suitable for executing an embodiment of a DSRD system 340, as well as various user computing systems 350 and other computing systems 360, 370 and 380. In the illustrated embodiment, the computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357, although some details are not illustrated (e.g., particular I/O components). The other computing systems 360, 370 and 380 may also each include similar components to some or all of the components illustrated with respect to computing system 300, but such components are not illustrated in this example for the sake of brevity.

The DSRD system 340 may include software instructions executable in memory 330 by the CPU 305, such as to provide an embodiment of the DSRD service. In particular, the DSRD system 340 interacts with some or all of computing systems 350, 360, 370 and 380 over the network 390 (e.g., via the Internet and/or the World Wide Web, via a private cellular network, etc.) to obtain information and requests, and to provide information in response. For example, the DSRD system 340 in this example receives requests from various users (not shown) who are interacting with user computing systems 350, such as requests to provide requested search results and/or information about determined themes or other inter-term relationships for a domain, and responds accordingly. In some embodiments, the DSRD system 340 may further receive requests for user-specific recommendations on behalf of particular users (whether from the users directly or from another system on behalf of the users) and provide corresponding user-specific recommendations that are based at least in part on domain-specific determined relevance information, while in other embodiments one or more other systems 335 and/or 365 may instead use domain-specific determined relevance information provided by the DSRD system 340 to generate and provide such user-specific recommendations. In addition, one or more of the user computing systems 350 may interact with DSRD system 340 to perform various other types of actions, such as to provide various types of feedback regarding user actions, as discussed in greater detail elsewhere. The other computing systems 350 may be executing various software as part of interactions with the DSRD system 340. For example, user computing systems 350 may each be executing a Web browser 358 or other software in memory 357 to interact with DSRD system 340, such as to interact with a Web-based GUI of the DSRD service provided by the DSRD system 340.

In order to determine domain-specific relevance information, the DSRD system 340 obtains domain-specific documents or other content from one or more sources, and analyzes that information to automatically determine the domain-specific relevance information. The sources of the domain-specific content may vary in various embodiments, such as to optionally include domain-related information 322 on local storage 320, optional domain information 375 on other remote computing systems 370, information supplied for analysis by one or more users from user computing systems 350 and/or from optional other systems 365 on other computing systems 360; etc. The optional other systems 365 on other computing systems 360 and/or the optional other systems 335 executing in memory 330 may have various forms in various embodiments, such as affiliated services that obtain determined relevance information from the DSRD system 340 and use that obtained information in various ways (e.g., to interact with users of the user computing systems 350), and/or content provision services that provide content to the DSRD system for analysis. For example, a particular optional other system 365 may maintain and provide domain information to the DSRD system 340 for analysis, and obtain and use resulting determined relevance information from the DSRD system 340, but with at least some of the information that is used by the DSRD system 340 in the determination of the relevance information (e.g., textual analysis information, generated neural networks, etc.) being stored on the computing system 300 and not provided to the other system 365. Alternatively, in other embodiments, the DSRD system 340 may generate and use determined relevance information for one or more domains without interacting with any such optional other services. Furthermore, one or more optional other third parties may use one or more of the other computing systems 380 and interact with the DSRD service in various other manners.

Various information related to the operation of the DSRD system 340 may be stored in storage 320 or elsewhere (e.g., remotely on one or more other computing systems 380), such as information 322 related to one or more domains of interest (e.g., domain-specific content to be analyzed or that has already been analyzed), information 324 related to the results of the analysis of domain-specific content (e.g., domain-specific relevance information, such as generated neural network data structures, Bayesian network data structures that include probabilistic representations of inter-term relationships, generated decision tree data structures that represent subsets of probabilistic representation information, etc.; determined scores and other information related to particular terms and themes and documents; etc.), information 326 to reflect information about users' interactions with various domain-specific information and other feedback information, and various user information 328 (e.g., preferences for or other interests in particular terms, or more generally preferences related to communication or interaction mechanisms). In other embodiments, some or all of the information used by or generated by the DSRD system 340 may be stored in other manners, including on other computing systems 380 or on other storage nodes/systems (not shown). The DSRD system 340 may obtain the feedback information 326 in various manners, such as by generating the information based on interactions of the DSRD system 340 with users (e.g., when providing them with determined relevance information), from optional other systems 335 and/or 365 that interact with users and that provide those users with determined relevance information from the DSRD system 340, by one or more systems interacting with users for the purpose of generating feedback information, etc.

It will be appreciated that computing systems 300, 350, 360, 370 and 380 are merely illustrative and are not intended to limit the scope of the present invention. The computing systems may instead each include multiple interacting computing systems or devices, and the computing systems may be connected to other devices that are not illustrated, including through one or more networks such as the Internet, via the Web, or via private networks (e.g., mobile communication networks, etc.). More generally, a computing system may comprise any combination of hardware or software that may interact and perform the described types of functionality, including without limitation desktop or other computers, database servers, network storage devices and other network devices, PDAs, cellphones and wireless phones and other phone systems, pagers, electronic organizers, Internet appliances, television-based systems (e.g., using set-top boxes and/or personal/digital video recorders), broadcast systems, and various other consumer products that include appropriate communication capabilities using any appropriate communication protocol. In addition, the functionality provided by the illustrated DSRD system 340 may in some embodiments be distributed in various modules, as discussed in greater detail elsewhere. Similarly, in some embodiments some of the functionality of the DSRD system 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. Some or all of the modules, systems and data structures may also be stored (e.g., as software instructions or structured data) on a computer-readable medium, such as a hard disk, a memory, a network, or a portable media article to be read by an appropriate drive or via an appropriate connection, including as encoded in one or more barcodes or other related codes stored on one or more such computer-readable mediums and being readable by an appropriate reader device. The systems, modules and data structures may also be transmitted as generated data signals (e.g., as part of a carrier wave) on a variety of computer-readable transmission mediums, including wireless-based and wired/cable-based mediums, and may take a variety of forms, or more generally may be mediated on any computer-readable medium. Such computer program products may also take other forms in other embodiments. Accordingly, the present invention may be practiced with other computer system configurations.

Figure 4:
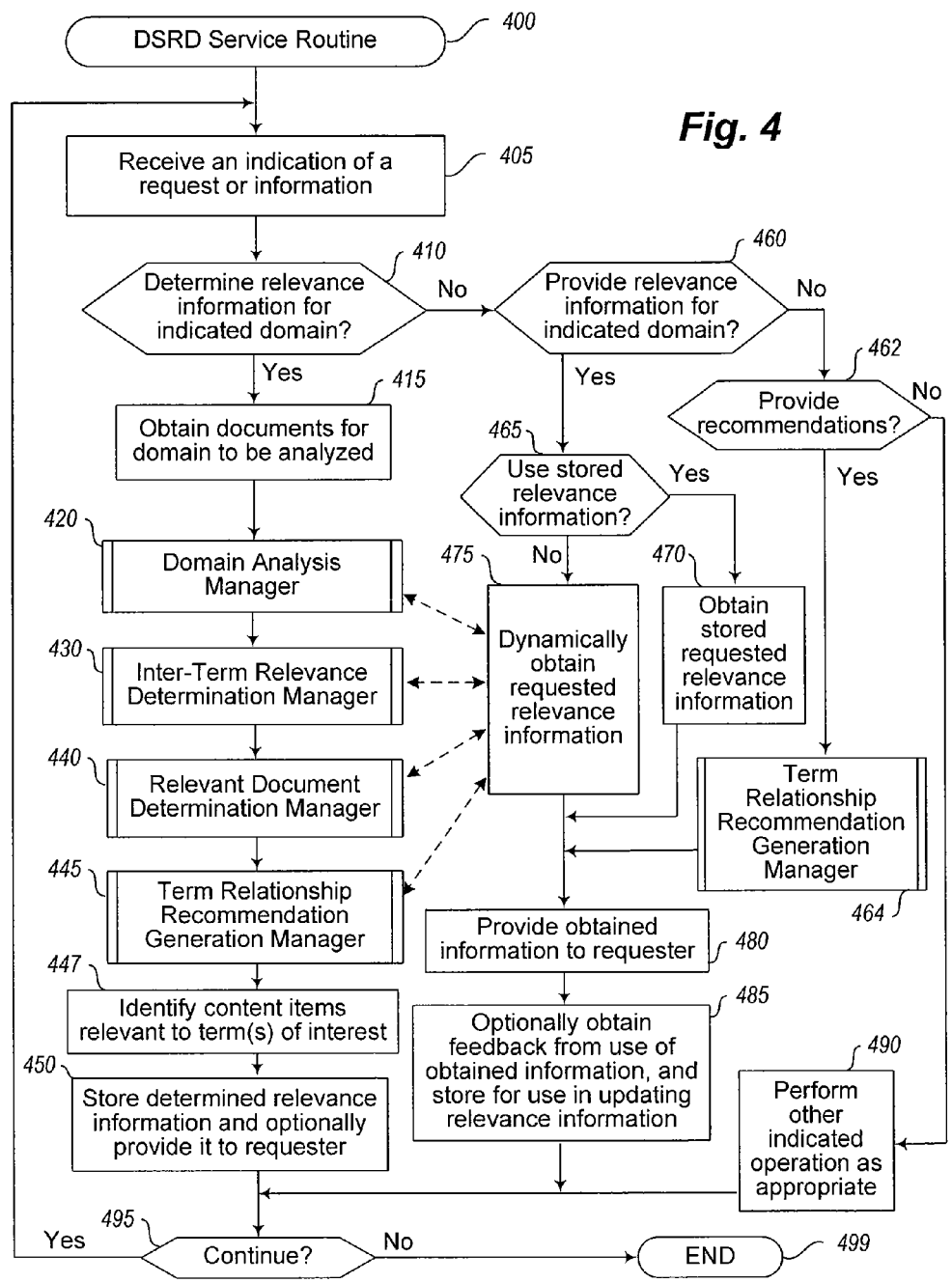
FIG. 4 illustrates a flow diagram of an example embodiment of a Domain-Specific Relevance Determination Service routine.

FIG. 4 is a flow diagram of an example embodiment of a DSRD Service routine 400. The routine may be provided by, for example, execution of the DSRD service 105 of FIGS. 1A-1C and/or the DSRD system 340 of FIG. 3, such as to manage the determination of relevance information related to domains of interest, as well as corresponding interactions with users or other entities. In the illustrated embodiment, the routine analyzes information about one or more domains of interest at various times, such as to pre-process information about a particular domain (e.g., as instructed by a human operator of the DSRD service, as requested by a third-party entity, etc.) to determine at least some types of domain-specific relevance information for use in responding to later requests based on such information, or instead to dynamically generate at least some types of domain-specific relevance information in response to requests from users or other entities in at least some situations.

In the illustrated embodiment, the routine begins at block 405, where an indication of a request or other information is received. The routine continues to block 410 to determine whether a request is received to determine relevance-related information for an indicated domain or if domain-specific content to be analyzed has been provided, and if so continues to block 415. In blocks 415-450, the routine then analyzes domain-specific information in order to determine relevance-related information for the domain, and stores that information for later use. In addition, while blocks 415-450 are illustrated as performing an initial determination of relevance-related information for a domain of interest, in at least some embodiments some or all of blocks 415-450 may similarly be performed to modify previously determined relevance information, such as to revise the previously determined relevance information based on user feedback and/or to expand the previously determined relevance information based on newly available domain-specific content.

In particular, the routine in block 415 obtains documents or other domain-specific information for the domain to be analyzed, such as based on documents currently received in block 405, documents previously received and stored for later use, documents retrieved from an external location indicated in the request received in block 405, etc. After block 415, the routine continues to block 420 to perform a Domain Analysis Manager routine to analyze term information for the available domain-specific content, with one example of such a routine being illustrated with respect to FIG. 5. After block 420, the routine continues to block 430 to perform an Inter-Term Relevance Determination Manager routine to determine relevant inter-term relationships (e.g., theme-related information) for the domain (e.g., based on data generated by block 420), with one example of such a routine being illustrated with respect to FIG. 6. After block 430, the routine continues to block 440 to perform a Relevant Document Determination Manager routine to determine particular documents of the domain that are relevant to particular terms and themes (e.g., based on data generated by block 420), with one example of such a routine being illustrated with respect to FIG. 7. After block 440, the routine continues to block 445 to perform a Term Relationship Recommendation Generation Manager routine to generate probabilistic representations of relationships between particular terms for the domain(s) (e.g., based on data generated by blocks 430 and/or 440) for later use in generating user-specific recommendations based at least in part on such inter-term relationships, with one example of such a routine being illustrated with respect to FIGS. 8A-8B. After block 445, the routine continues to block 447 to optionally perform a routine or otherwise operate to identify content items that are relevant to particular terms of interest related to the domain being analyzed (e.g., additional term content items that are identified as being of particular interest for other indicated terms, such as based on the output of the Term Relationship Recommendation Generation Manager routine of block 445), such as may be performed by the optional module 127 discussed with respect to FIG. 1A (e.g., for later use in generating user-specific recommendations based at least in part on such indicated terms and/or additional terms), although in some embodiments such content item identification is not performed at this time or at all. After block 447, the routine continues to block 450 to store the determined relevance information from blocks 420-445 and/or to optionally provide some or all of that determined relevance information to the requester, such as if the information was determined dynamically in response to a request or is being supplied to accommodate a previous request. The determined relevance information from blocks 420-445 may be stored in various manners, including in volatile memory and/or non-volatile storage, and as discussed in greater detail elsewhere, may be stored in various forms (e.g., neural networks, Bayesian networks, decision trees, etc.).

If it is instead determined in block 410 that another type of request or information is received, the routine continues instead to block 460 to determine whether a request has been received to provide determined relevance information for an indicated domain. Such determined relevance information may be provided for various reasons and at various times, such as in response to a search request or as part of assisting a user in specifying information regarding one or more themes of interest, as well as in various manners (e.g., as part of a Web page or other information screen provided to a user for display or other presentation on a client device of the user, to another service in response to a request for information to be used by that service, etc.). If it is determined in block 460 that a request has been received to provide determined relevance information for an indicated domain, the routine continues to block 465 to determine whether the requested relevance information has already been determined and stored for later use in blocks 415-450, or if some or all of the requested relevance information is to be dynamically generated. In other embodiments, such a determination may not be made, such as if relevance information provided in response to such requests is always previously determined and stored, or is always dynamically determined, or if the request specifies whether to provide stored or dynamically determined information. In the illustrated embodiment, if it is determined in block 465 to use stored relevance information, the routine continues to block 470 to obtain the requested relevance information from information that was previously determined and stored.

In addition, the actions of block 470 may be performed in various manners in various embodiments. For example, in some embodiments at least some types of determined relevance information may be available to only a subset of users or other entities who are authorized to receive the information, and if so the actions for one or more of blocks 460-475 may further include determining whether the requester is authorized to receive the requested information (e.g., has provided an appropriate fee for paid access to the information, has a particular identity that is verified as being authorized to receive confidential requested information, etc.). In addition, requests may be received and information may be provided in various manners, including in electronic messages or via programmatic interactions using one or more APIs provided by the DSRD service, such as by an affiliated service. Alternatively, a Web-based request may be received from a user (e.g., based a Web-based information search GUI or other GUI provided by the DSRD service or other affiliated service), and the requested information may be supplied to the user as part of one or more generated Web pages that are sent in response to the request.

If it is instead determined in block 465 to dynamically obtain at least some of the requested relevance information, the routine continues instead to block 475 to perform the dynamic obtaining of the information. In particular, as is illustrated in the example routine 400, the performance of block 475 may include executing one or more of the other routines corresponding to blocks 420-445 (as well as optional block 447 if present) and obtaining resulting information from the routines. In addition, while not illustrated here, in some embodiments the performance of block 475 may further include obtaining documents or other content to be analyzed, such as by initiating performance of block 415 as well, or instead such content to be used may be received in block 405 and provided to one or more of the routines corresponding to blocks 420-445 (and/or optional block 447) as part of the performance of block 475. After blocks 470 or 475, the routine continues to block 480 to provide the obtained information to the user or other requester, which may be performed in various manners in various embodiments, as discussed in greater detail elsewhere. Furthermore, it will be appreciated that the performance of block 480 may involve multiple interactions with the user or other requester in at least some situations, such as to initially provide some information, and to later provide additional information or perform other interactions with the user or other requester based on actions taken by the user or other requester after the initial provision of information. After block 480, the routine continues to block 485 to optionally obtain or determine feedback from the use of the provided relevance information by the user or other requester, and if so retains the feedback in the illustrated embodiment for later use in performing learning actions to improve previously determined relevance information—in other embodiments, the routine may instead immediately use any such obtained feedback in at least some situations, such as to re-perform the routines corresponding to one or more of blocks 420-445 using the feedback information.

If it is instead determined in block 460 that a request has not been received to provide determined relevance information for an indicated domain, the routine continues instead to block 462 to determine whether a request has been received from or on behalf of a user (e.g., from another service that is interacting with the user) that relates to providing user-specific recommendations for the user based on determined relevance information for one or more indicated domains. If so, the routine continues to block 464 to perform a Term Relationship Recommendation Generation Manager routine to generate user-specific recommendations for the user for the indicated domain(s) based on probabilistic representations of relationships between particular terms for the domain(s), such as probabilistic representations that were previously generated with respect to block 445 or that are instead dynamically generated at a time of responding to the current request. In other embodiments, another service may instead provide such user-specific recommendations using probabilistic representation information generated by the DSRD Service, such that the routine executed in block 445 may merely generate the probabilistic representations of the inter-term relationship information for later use and provide that generated information to the other service (e.g., with respect to one or more of blocks 450, 480, 490, etc.). After block 464, the routine continues to block 480 to provide the generated recommendation information to the requester.

If it is instead determined in block 462 that a request has not been received to provide recommendations based on determined relevance information for an indicated domain, the routine continues instead to block 490 to perform one or more other indicated operations as appropriate. For example, domain-specific content may be received in block 490 and stored for later analysis, such as information for a new domain to be analyzed and/or new or updated information for a domain for which relevance information was previously determined. Alternatively, other types of information may be received and used in block 490, such as feedback information related to the use of previously determined relevance information, and may be used in various manners. For example, if one or more predefined criteria are satisfied by the feedback received in block 490 and/or stored in block 485 (e.g., based on a minimum or maximum amount of feedback that is obtained, a minimum or maximum amount of time since a previous determination of corresponding relevance information, etc.), an additional performance of the routines corresponding to one or more of blocks 420-445 may be triggered using the feedback information in order to learn and update previously determined relevance information, as described in greater detail elsewhere. In addition, other types of requests may be received and processed in block 490, such as requests to update previously determined relevance information (e.g., based on subsequent feedback information, subsequent additional domain-specific content that is available, etc.), such as a request from a user or other entity with which the DSRD service interacts or from a human operator of the DSRD service. Similarly, various administrative requests from a human operator of the DSRD service may be received and processed.

After blocks 450, 485 or 490, the routine continues to block 495 to determine whether to continue, such as until an explicit indication to terminate is received. If it is determined to continue, the routine returns to block 405, and if not continues to block 499 and ends.

Figure 5:
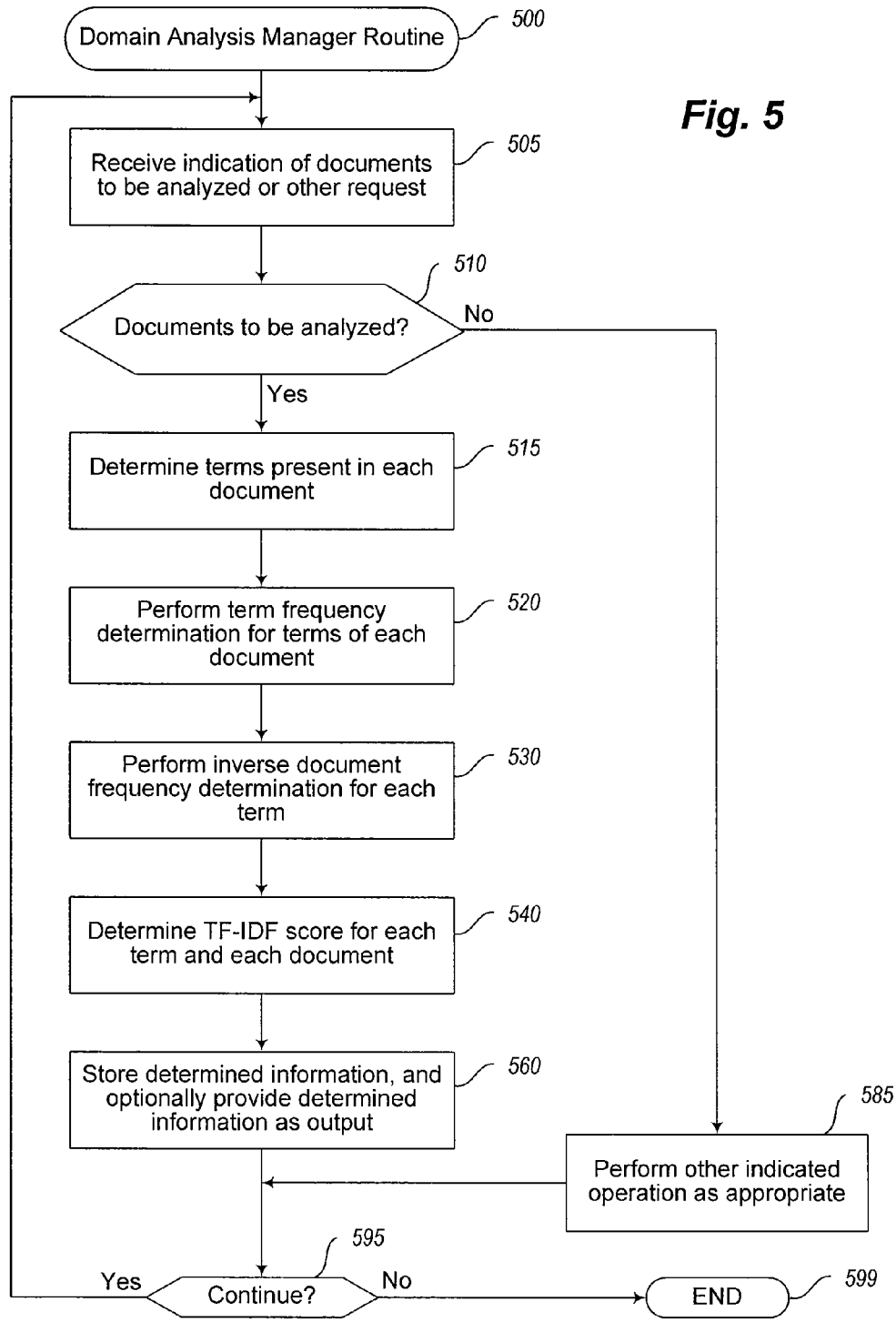
FIG. 5 illustrates a flow diagram of an example embodiment of a Domain Analysis Manager routine.

FIG. 5 is a flow diagram of an example embodiment of a Domain Analysis Manager routine 500. The routine may be provided by, for example, execution of the Domain Analysis Manager module 110 of the DSRD service 105 of FIG. 1A and/or a module of the DSRD system 340 of FIG. 3, such as to analyze domain-specific content for a domain in order to determine the use of particular terms in particular documents and across the group of all the documents. In addition, in at least some situations, the routine 500 may be performed based on execution of block 420 of FIG. 4. In this example, the routine 500 is performed with respect to an initial analysis of domain-specific content for a domain, but in other embodiments may be similarly performed to update previously analyzed information, such as to analyze additional documents that become available for a domain after a prior analysis of other documents has been completed. Furthermore, in a manner similar to that of the other routines, the routine 500 may determine term analysis information for a domain in advance of the use of that determined information, as well as dynamically in response to a request for such information.

The illustrated embodiment of the routine begins in block 505, where an indication of documents to be analyzed for a domain or another request is received. The routine continues to block 510 to determine whether documents to be analyzed were received. If so, the routine continues to block 515 to analyze each of the documents to determine terms that are present in the documents. In addition, as discussed in greater detail elsewhere, the determination of terms for a document may include a variety of types of term processing in various embodiments, such as to normalize terms (e.g., using term stemming to combine related terms), to remove common terms (e.g., "the", "a", "an", "of", "and", etc.) or other indicated terms, to aggregate multiple words together into single terms for purposes of the later analysis, to generate an index of the terms in the document, etc. After block 515, the routine continues to block 520 to perform a term frequency determination for the terms of each document, and in block 530 performs an inverse document frequency determination for each term across all of the documents. In block 540, the routine then determines a TF-IDF score for each term and document combination based on the information generated in blocks 520 and 530. After block 540, the routine continues to block 560 to store the determined information for later use, and to optionally provide the determined information as output (e.g., as a response to a dynamic invocation of the routine 500 for the determined information, such as with respect to block 475 of FIG. 4; or for use by the Relevant Theme Determination Manager routine 600 of FIG. 6 and/or the Relevant Document Determination Manager routine 700 of FIG. 7, such as corresponding to blocks 430 and/or 440 of FIG. 4).

If it is instead determined in block 510 that documents to be analyzed were not received, the routine continues instead to block 585 to perform one or more other indicated operations as appropriate. For example, the other operations may include receiving and responding to requests for previously generated document term analysis information, to requests to update previously determined document analysis information to reflect new domain-specific content that is available, to administrative requests from a human operator of the DSRD service, etc. As discussed in greater detail elsewhere, when updating previously determined document analysis information to reflect new domain-specific documents that are available, the routine may in some embodiments perform steps 515-560 for those new documents, while in other embodiments may analyze or otherwise incorporate such new documents in other manners (e.g., by identifying one or more other previously analyzed documents to which a new document is most similar based on one or more similarity measures, and by averaging or otherwise using analyzed relevance information for the other identified document(s) to represent the new document, such as using determined TF-IDF scores for terms in the other identified document(s) to represent the new document).

After blocks 560 or 585, the routine continues to block 595 to determine whether to continue, such as until an explicit indication to terminate is received. If it is determined to continue, the routine returns to block 505, and if not continues to block 599 and ends. It will be appreciated that various of the blocks of FIG. 5 may be performed in various manners in various embodiments, including by analyzing different documents in a serial or parallel manner (e.g., in a distributed manner on multiple computing systems).

Figure 6:
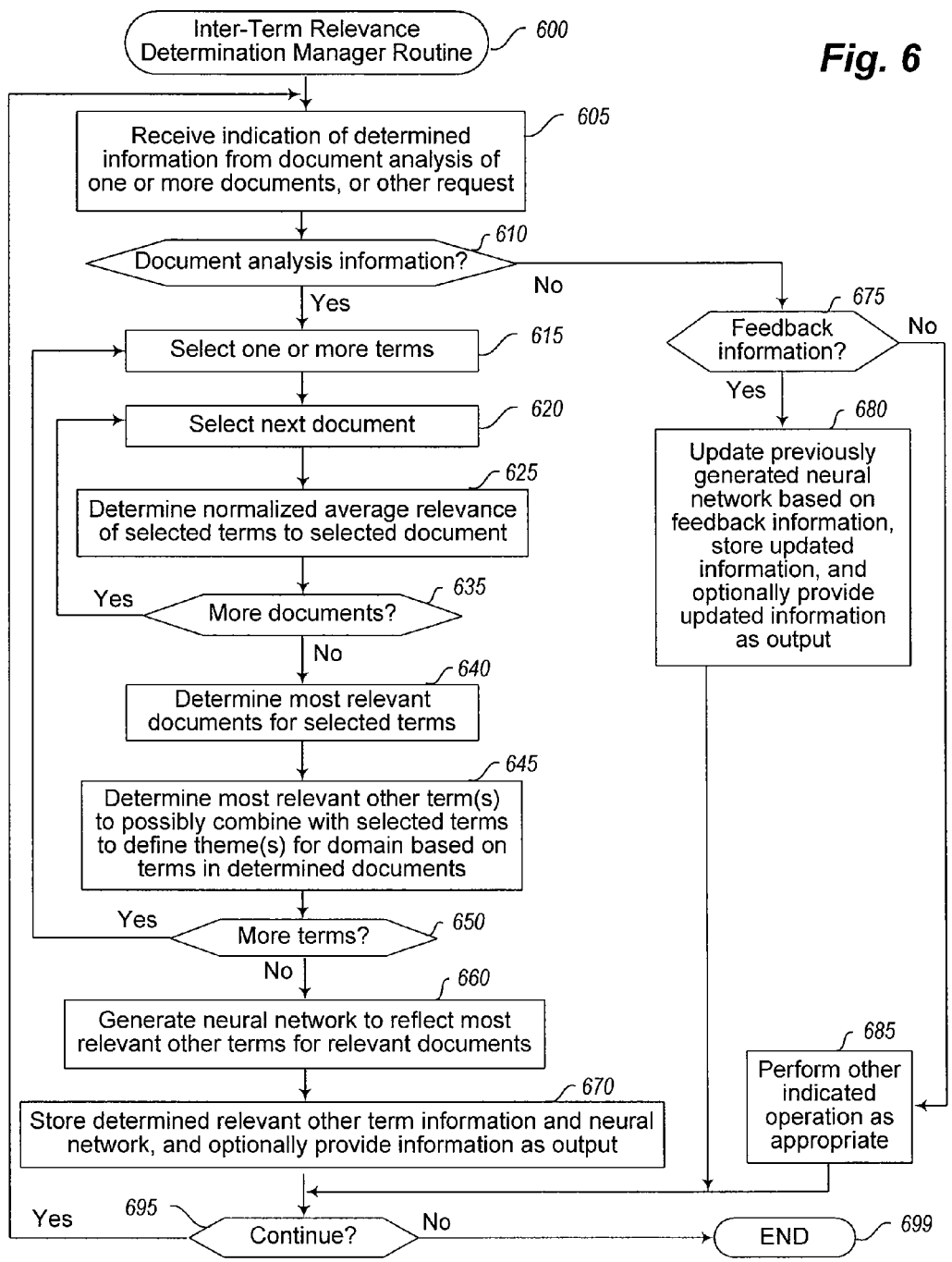
FIG. 6 illustrates a flow diagram of an example embodiment of an Inter-Term Relevance Determination Manager routine.

FIG. 6 is a flow diagram of an example embodiment of an Inter-Term Relevance Determination Manager routine 600. The routine may be provided by, for example, execution of the Inter-Term Relevance Determination Manager module 130 of FIG. 1A and/or a module of the DSRD system 340 of FIG. 3, such as to use document term analysis information for documents of a domain to determine relationships between terms, including possible inter-term themes for the domain. The routine 600 may be initiated by, for example, execution of block 430 of FIG. 4, or instead in other manners. In addition, the illustrated embodiment of the routine describes an initial determination of relevant inter-term relationship information for a domain, as well as updating previously determined inter-term relationship information to reflect subsequent feedback and/or other information about possible themes for the domain. Furthermore, in a manner similar to that of the other routines, the routine 600 may determine relevance information for a domain in advance of the use of that determined relevance information, as well as dynamically in response to a request for such information.

Figure 7:
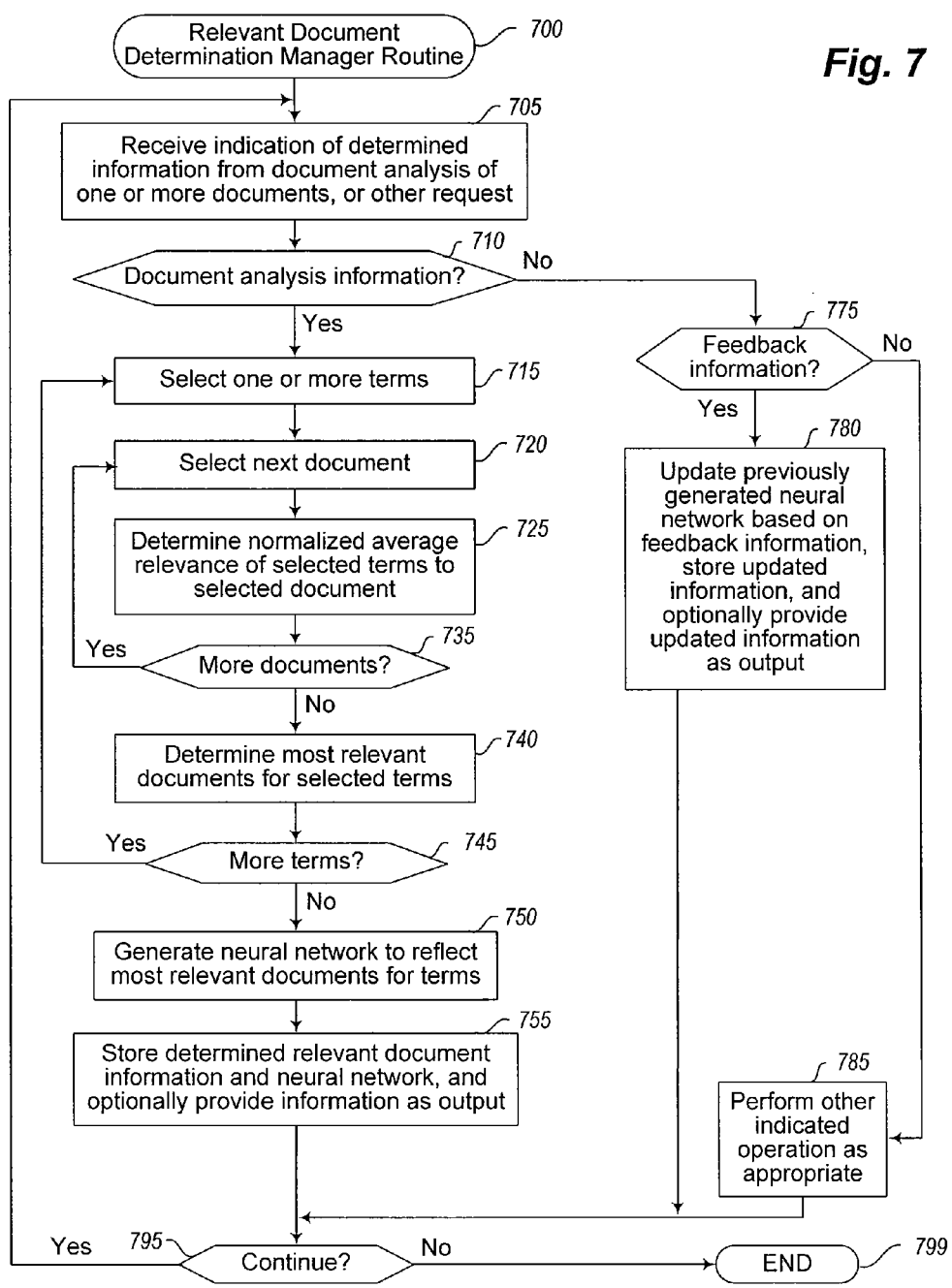
FIG. 7 illustrates a flow diagram of an example embodiment of a Relevant Document Determination Manager routine.

In addition, in the illustrated embodiment, the determination of inter-term relationship relevance information for a domain in FIG. 6 is illustrated as being performed separately from the determination of document-related relevance information for the domain in FIG. 7, although in other embodiments the determination of such types of relevance information may be performed in other manners. For example, only one of inter-term relationship relevance information and document-related relevance information may be determined in a particular embodiment, the determination of both inter-term relationship-related and document-related relevance information for a domain may be performed together as part of a single routine, information that is common to both types of determinations may be performed once and then shared between two distinct routines, etc.

The illustrated embodiment of the routine begins at block 605, where document term analysis information for the documents of a domain is received (e.g., as output of routine 500 of FIG. 5, as information supplied as part of a dynamic determination request, etc.), or another request is received. The routine continues to block 610 to determine if document term analysis information is received, and if so continues to block 615. In the illustrated embodiment, blocks 615-650 are performed to determine theme-related information for each group of one or more terms of the domain that are of interest. Terms to be analyzed may be selected by, for example, using each term present in any of the documents (optionally excluding common terms and/or other indicated terms). Alternatively, the groups of terms to be analyzed may include, for example, each combination of two terms or of another indicated quantity of terms that are present in the documents of the domain, each combination of two terms or of another indicated quantity of terms that are determined to be sufficiently potentially related to each other (e.g., above a specified threshold), etc. In addition, the blocks 615-650 may be performed repeatedly to evaluate and revise information about the inter-relatedness of multiple terms, such as to initially perform the blocks 615-650 for each term individually, to next perform the determination for at least some combinations of two terms (e.g., based on information available from the performance of the blocks 615-650 for those terms individually), to next perform the determination for at least some combinations of three terms (e.g., based on information available from the performance of the blocks 615-650 for particular terms that are sufficiently related to previously selected combinations of two terms), etc. Alternatively, in some embodiments, some or all of the blocks 615-650 may instead be performed in a parallel manner (e.g., in a distributed manner on multiple computing systems) for some or all groups of one or more terms to be considered.

In particular, in the illustrated embodiment, the routine in block 615 selects the next group of one or more terms to be considered, beginning with the first such group, and in block 620 similarly selects the next document of the domain to be considered, beginning with the first document. In block 625, the routine then determines the normalized average relevance of the selected term(s) to the selected document, such as based on averaging or otherwise aggregating normalized TF-IDF scores for each selected term for the selected document. In block 635, the routine then determines whether there are more documents to be analyzed, and if so returns to block 620. Otherwise, the routine continues to block 640 to determine the most relevant documents for the currently selected term(s) based on the relevant scores determined in block 625. Next, in block 645, the routine identifies one or more of the determined most relevant documents, and uses the identified documents to determine other terms that are potentially most relevant to the selected term(s), such as based on the term frequency of those other terms in the identified document(s) or other indication of the relevance of those other terms to the identified document(s).

In addition, in some embodiments, the other terms that are determined to be most relevant to the selected term(s) may optionally be combined with the one or more of the selected term(s) for possible use as a theme and/or for possible later analysis with respect to blocks 615-650 for the combined group of those terms, such as to optionally find additional other terms that may be related to that combined group of terms. Such an ongoing analysis of possible relationships of additional other terms to currently selected terms may be performed in various manners, such as by individually combining the group of selected terms with each of the most relevant other terms, with all of the most relevant other terms, with some or all sub-combinations of the most relevant other terms, etc. Alternatively, in other embodiments, some or all of the most relevant other terms may be combined with some or all of the selected terms to identify possible themes in other manners, and/or later feedback from the use of terms together by users may be used to refine which groups of terms are related together as themes for the domain.

After block 645, the routine continues to block 650 to determine if there are more groups of one or more terms to consider, and if so returns to block 615. Otherwise the routine continues to block 660 to, in the illustrated embodiment, generate a neural network to reflect the relevance of terms in the domain to other terms in the domain, such as based in part on the information generated with respect to blocks 625, 640 and 645. As discussed with respect to block 680, such a generated neural network may also later be updated based on feedback to refine the determination of the inter-relatedness of particular terms for the domain, such as for some or all of the input terms and/or output terms in a parallel manner. After block 660, the routine continues to block 670 to store the determined relevant theme-related information and the generated neural network, and optionally provides some or all of the determined information as output if appropriate (e.g., as a response to a request to dynamically generate that information).

If it is instead determined in block 610 that document term analysis information is not received, the routine continues instead to block 675 to determine if feedback information is received or determinable, such as based on use of previously determined and provided relevance information. If so, the routine continues to block 680 to use the feedback information to update a previously generated neural network that corresponds to the feedback, as discussed in greater detail elsewhere. The performance of block 680 further stores the updated neural network information, and optionally provides the updated information to a requester as output of the routine. If it is instead determined in block 675 that feedback information is not received, the routine continues instead to block 685 to perform one or more other indicated operations as appropriate. For example, such other indicated operations may include receiving a request to supply previously determined theme-related information for a domain (e.g., the theme-related information from a current version of a particular previously generated neural network for the domain, such as after the neural network has been updated), receiving user feedback information to later use in refining determined theme-related information for the domain (e.g., particular groups of terms that are selected together to represent a theme), receiving a request from a user or other entity or other human operator to perform an update to previously determined theme-related information (e.g., based on user feedback and/or additional domain-specific content that is available for the domain), receiving other administrative requests from a human operator of the DSRD service, etc. Feedback information that is received for later use may be handled in various manners. For example, if one or more predefined criteria are satisfied by the feedback (e.g., based on a minimum or maximum amount of feedback that is obtained, a minimum or maximum amount of time since a previous determination of corresponding relevance information, etc.), the performance of block 685 may trigger a subsequent performance of the routine 600 in which that feedback information is supplied for use in block 680.

After blocks 670, 680 or 685, the routine continues to block 695 to determine whether to continue, such as until an explicit indication to terminate is received. If it is determined to continue, the routine returns to block 605, and if not continues to block 699 and ends.

FIG. 7 is a flow diagram of an example embodiment of a Relevant Document Determination Manager routine 700. The routine may be provided by, for example, execution of the Relevant Document Determination Manager module 120 of FIG. 1A and/or a module of the DSRD system 340 of FIG. 3, such as to use document term analysis information for documents of a domain to determine relationships between terms and documents for the domain. The routine 700 may be initiated by, for example, execution of block 440 of FIG. 4, or instead in other manners. In addition, the illustrated embodiment of the routine describes the initial determination of relevant document-related information for a domain, as well as updating previously determined document-related relevance information to reflect subsequent feedback and/or other information about documents for the domain. Furthermore, in a manner similar to that of the other routines, the routine 700 may determine document-related relevance information for a domain in advance of the use of that determined relevance information, as well as dynamically in response to a request for such information.

The illustrated embodiment of the routine begins at block 705, where document term analysis information for the documents of a domain is received (e.g., as output of routine 500 of FIG. 5, as information supplied as part of a dynamic determination request, etc.), or another request is received. The routine continues to block 710 to determine if document term analysis information is received, and if so continues to block 715. In the illustrated embodiment, blocks 715-745 are performed to determine document-related information for each group of one or more terms of the domain that are of interest, such as in a manner similar to blocks 615-650 of FIG. 6. Terms to be analyzed may be selected by, for example, using each term present in any of the documents (optionally excluding common terms and/or other indicated terms), or in other manners as described in greater detail with respect to FIG. 6.

In particular, in the illustrated embodiment, the routine in block 715 selects the next group of one or more terms to be considered, beginning with the first such group, and in block 720 similarly selects the next document of the domain to be considered, beginning with the first document. In block 725, the routine then determines the normalized average relevance of the selected term(s) to the selected document, such as based on averaging or otherwise aggregating normalized TF-IDF scores for each selected term for the selected document. In block 735, the routine then determines whether there are more documents to be analyzed, and if so returns to block 720. Otherwise, the routine continues to block 740 to determine the most relevant documents for the currently selected term(s) based on the relevant scores determined in block 725. Next, in block 745, the routine determines if there are more groups of one or more terms to consider, and if so returns to block 715. In a manner similar to that discussed with respect to FIG. 6, the blocks 715-745 may be performed repeatedly to evaluate and revise information about the relatedness of multiple terms and multiple documents, such as to initially perform the blocks 715-745 for each term individually, to next perform the determination for at least some combinations of two terms (e.g., based on information available from the performance of the blocks 715-745 for those terms individually), to next perform the determination for at least some combinations of three terms (e.g., based on information available from the performance of the blocks 715-745 for particular terms that are sufficiently related to previously selected combinations of two terms), etc. Alternatively, in some embodiments, some or all of the blocks 715-745 may instead be performed in a parallel manner (e.g., in a distributed manner on multiple computing systems) for some or all groups of one or more terms and/or one or more documents to be considered.

Otherwise the routine continues to block 750 to, in the illustrated embodiment, generate a neural network to reflect the relevance of terms in the domain to documents in the domain, such as based in part on the information generated with respect to blocks 725 and 740. As discussed with respect to block 780, such a generated neural network may also later be updated based on feedback to refine the determination of the relatedness of particular terms for the domain to particular documents of the domain, such as for some or all of the terms and/or documents in a parallel manner. After block 750, the routine continues to block 755 to store the determined relevant document-related information and the generated neural network, and optionally provides some or all of the determined information as output if appropriate (e.g., as a response to a request to dynamically generate that information).

If it is instead determined in block 710 that document term analysis information is not received, the routine continues instead to block 775 to determine if feedback information is received or determinable, such as based on use of previously determined and provided relevance information. If so, the routine continues to block 780 to use the feedback information to update a previously generated neural network that corresponds to the feedback, as discussed in greater detail elsewhere. The performance of block 780 further stores the updated neural network information, and optionally provides the updated information to a requester as output of the routine. If it is instead determined in block 775 that feedback information is not received, the routine continues instead to block 785 to perform one or more other indicated operations as appropriate. For example, such other indicated operations may include receiving a request to supply previously determined document-related information for a domain (e.g., the document-related information from a current version of a particular previously generated neural network for the domain, such as after the neural network has been updated), receiving user feedback information to later use in refining determined document-related information for the domain (e.g., particular documents that are selected for use corresponding to a specified theme or other group of terms), receiving a request from a user or other entity or other human operator to perform an update to previously determined document-related information (e.g., based on user feedback and/or additional domain-specific content that is available for the domain), receiving other administrative requests from a human operator of the DSRD service, etc. Feedback information that is received for later use may be handled in various manners. For example, if one or more predefined criteria are satisfied by the feedback (e.g., based on a minimum or maximum amount of feedback that is obtained, a minimum or maximum amount of time since a previous determination of corresponding relevance information, etc.), the performance of block 785 may trigger a subsequent performance of the routine 700 in which that feedback information is supplied for use in block 780.

After blocks 755, 780 or 785, the routine continues to block 795 to determine whether to continue, such as until an explicit indication to terminate is received. If it is determined to continue, the routine returns to block 705, and if not continues to block 799 and ends.

Figure 8A:
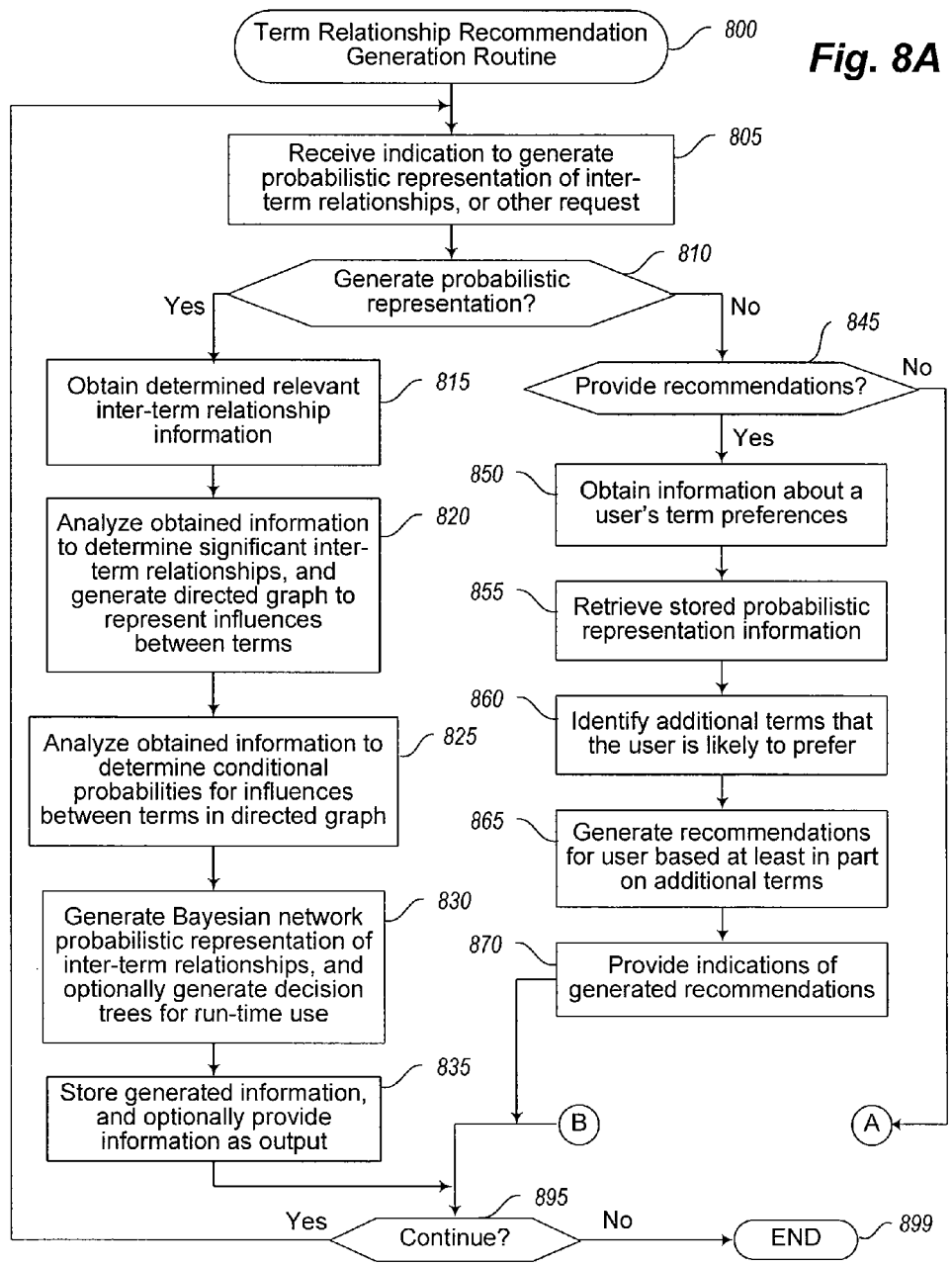
FIGS. 8A-8B illustrate a flow diagram of an example embodiment of a Term Relationship Recommendation Generation Manager routine.
Figure 8B:
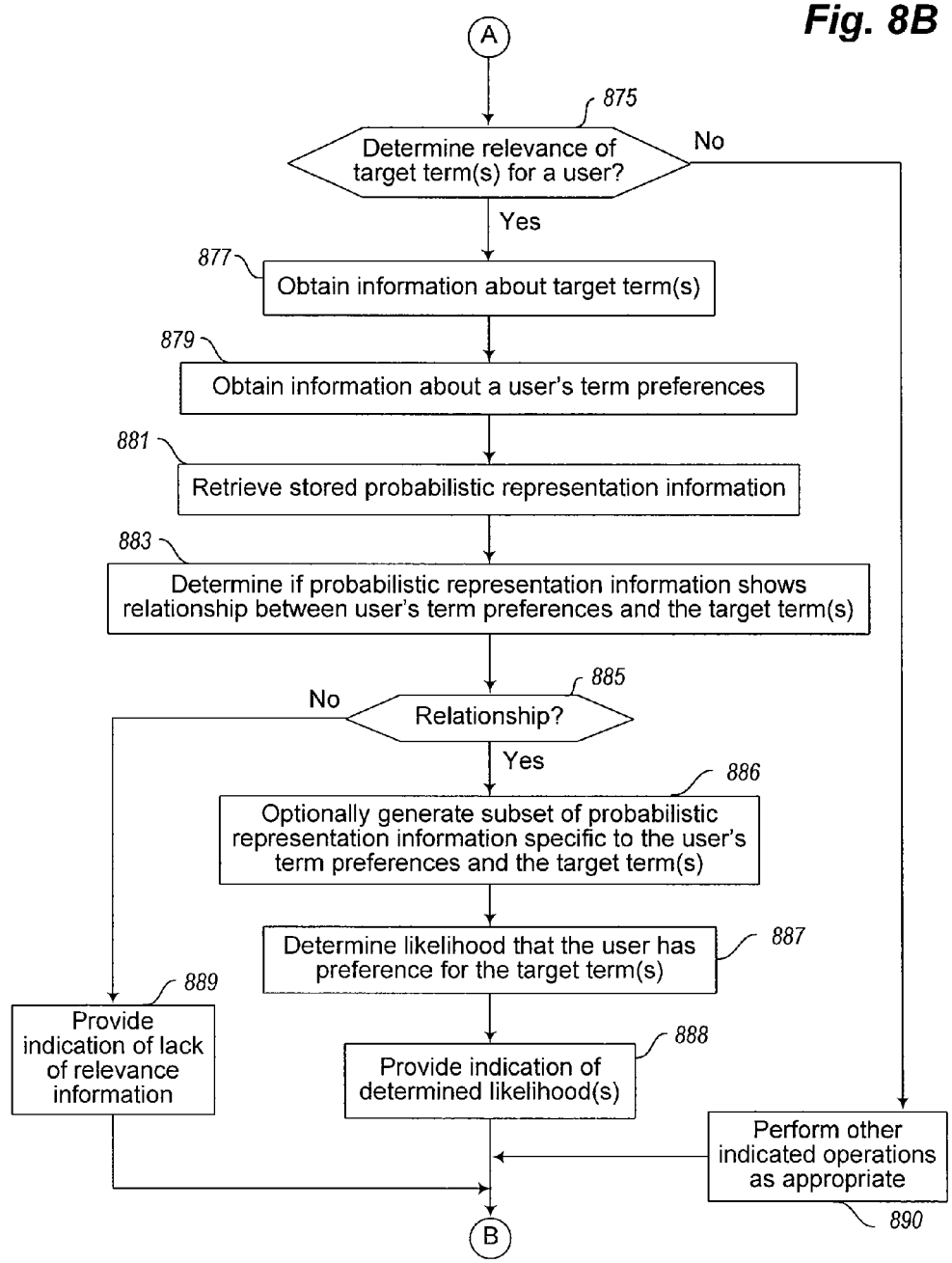

FIGS. 8A-8B illustrate a flow diagram of an example embodiment of a Term Relationship Recommendation Generation Manager routine 800. The routine may be provided by, for example, execution of the Term Relationship Recommendation Generation Manager module 125 of FIG. 1A and/or a module of the DSRD system 340 of FIG. 3, such as to generate probabilistic representations of relationships between terms for one or more domains, and/or to use generated probabilistic representation of inter-term relationship information to provide user-specific recommendations or other information to users. The routine 800 may be initiated by, for example, execution of blocks 445 and/or 464 of FIG. 4, or instead in other manners.

In the illustrated embodiment, the routine 800 generates Bayesian network probabilistic representation data structures and optionally corresponding decision trees based on inter-term relationship information generated by another module (e.g., by module 130 of FIG. 1A and as described with respect to FIG. 6, such as based on document term analysis information for documents of a domain), although in other embodiments may use other types of representations (e.g., non-probabilistic representations) of inter-term relationship data, and/or may determine inter-term relationship information in manners other than based on analysis of domain documents. In addition, in the illustrated embodiment, routine 800 performs both the generation of the probabilistic representations of the inter-term relationship information and the subsequent use of that generated inter-term relationship information probabilistic representation to provide user-specific recommendations to users, although in other embodiments such types of functionality may be separated into distinct routines (whether both are performed by an embodiment of the DSRD service, or one or both are performed by another service). While the illustrated embodiment of the routine describes the initial generation of inter-term relationship information probabilistic representations for a domain but does not explicitly discuss updating such previously generated information to reflect subsequent feedback and/or other information about inter-term relationships for the domain, other embodiments of the routine may perform such updating, or instead any such updating may instead occur with respect to the underlying inter-term relationship information that is used by the routine and the routine may generate new inter-term relationship information probabilistic representations for a domain to reflect the updated underlying information. Furthermore, in a manner similar to that of the other routines, the routine 800 may generate inter-term relationship information probabilistic representations for a domain in advance of the use of that generated information, as well as dynamically in response to a request for such information.

In addition, in the illustrated embodiment, the generation of the inter-term relationship information probabilistic representations for a domain in FIG. 8 is illustrated as being performed separately from the determination of underlying inter-term relationship relevance information for a domain in FIG. 6, although in other embodiments these activities may be performed in other manners. For example, only one of the underlying inter-term relationship relevance information and inter-term relationship information probabilistic representations may be generated or otherwise determined in a particular embodiment, the determination of both underlying inter-term relationship-related information and inter-term relationship information probabilistic representations for a domain may be performed together as part of a single routine, information that is common to both types of activities may be performed once and then shared between two distinct routines, etc.

The illustrated embodiment of the routine begins at block 805, where an indication is received to generate probabilistic representations of inter-term relationships for one or more domains of interest, or another request is received. In some embodiments, the routine may receive input that includes information about underlying determined inter-term relevance information (e.g., when the routine is executed as part of block 445 of FIG. 4, to receive data as input that was generated by block 430), information about particular term-related preferences of a particular user for use in determining user-specific recommendations based on related terms, etc. The routine continues to block 810 to determine if probabilistic representations of inter-term relationships are to be generated (e.g., based on an explicit request, based on the receipt of underlying determined inter-term relevance information, etc.), and if so continues to block 815. In the illustrated embodiment, blocks 815-835 are performed to generate inter-term relationship probabilistic representation data for later use, and blocks 850-870 are performed to use previously generated probabilistic representations of inter-term relationships to determine and provide user-specific recommendations to users.

In particular, with respect to block 815, the routine obtains underlying determined relevance information about inter-term relationships for the one or more domains of interest, such as based on information received in block 805, by retrieving stored information that was generated by routine 600, and/or by dynamically interacting with routine 600 to obtain such information. The routine continues to block 820 to analyze the underlying relevance information to determine significant inter-term relationships that each include one or more first terms having an influence on one or more other second terms (e.g., with the second terms being causally dependent or otherwise dependent on the first terms). The routine then continues in block 820 to generate one or more directed graphs (e.g., a DAG, or directed acyclic graph) in which the selected terms are represented with random variable nodes corresponding to a preference for or interest in that term within the domain(s), and in which the dependencies or other influences are represented with directed links or edges between those nodes. The routine then continues to block 825 to determine probability information to use for the generated directed graph(s), including conditional probability tables for those nodes that are dependent on one or more other nodes, and optionally prior probability values to represent uncertainty for those nodes that are not dependent on other nodes. As discussed in greater detail elsewhere, the determination of the inter-term relationships to model in the directed graph(s) and the determination of the probability information for the graph nodes may be performed in various manners in various embodiments, including based at least in part on the determined relevance information from the analysis of domain documents and/or based on learning or other modifications that have been made based on user feedback. Furthermore, if multiple directed graphs are created that are not inter-dependent, in some embodiments the multiple graphs will be combined into a single larger directed graph (e.g., by modeling additional less relevant inter-term relationships), while in other embodiments the multiple directed graphs will instead be used to represent the domain(s).

After block 825, the routine continues to block 830 to generate one or more Bayesian network probabilistic representations of the relevant inter-term relationships for the domain(s) from the directed graph(s) and determined probability information. It will be appreciated that in at least some embodiments, the generated Bayesian network may have tens of thousands or millions of nodes and corresponding numbers of inter-node edges to represent a particular domain of interest. Furthermore, in at least some embodiments, the routine in block 830 further generates one or more (e.g., hundreds or thousands or hundreds of thousands) of decision trees that each represent a subset of the generated Bayesian networks, such as to enable later run-time processing that may be performed in a more rapid manner than use of the entire Bayesian network. As discussed in greater detail elsewhere, the generation of the Bayesian network(s) and decision tree(s) may be performed in various manners in various embodiments. For example, in some embodiments, after information about a user's term preferences and one or more target terms of interest are identified (e.g., as discussed with respect to blocks 877-888), a partial Bayesian network and/or one or more partial decision tree(s) may be instantiated that correspond to a portion of the Bayesian network (if any) that connects the term preferences and target term(s), such as to further include evidence nodes or other evidence information about the term preferences and user-specific term relevance information for the target term(s). After block 830, the routine continues to block 835 to store the generated information for later use, and optionally also provides some or all of the generated information as output (e.g., if the generation of the information was performed in response to a request for particular generated information).

If it is instead determined in block 810 that probabilistic representations of inter-term relationships are not to be generated, the routine continues instead to block 845 to determine whether user-specific recommendations are to be determined and provided (e.g., based on an explicit request, based on the receipt of specified term-related preferences for a user, etc.), and if so continues to block 850. In block 850, the routine obtains information about a target user's preferences for or other interest in one or more particular terms from one or more indicated domains, such as may be received in block 805, retrieved from stored preference information for the user, determined by dynamically interacting with the user (whether directly or via an intermediate service), etc. In block 855, the routine retrieves the stored probabilistic representation information corresponding to the user's domain(s) and indicated preferences, such as one or more of the decision trees previously generated and stored with respect to blocks 830 and 835, or instead an entire Bayesian network that was previously generated and stored with respect to blocks 830 and 835. In other embodiments, the routine may instead dynamically initiate the execution of some or all of blocks 815-835 to obtain desired inter-term relationship probabilistic information.

After block 855, the routine continues to block 860 to identify and select one or more additional user-specific target terms that are sufficiently probable to be of interest to the target user based on the available information about the target user's known interests used as evidence. As discussed elsewhere, such target terms may be identified in various manners, such as the following: determining the probability of one or more target terms of interest that are indicated in the request and selecting some or all of them; determining the probability of the target user's interest in some or all terms modeled in the generated Bayesian network (e.g., other terms that are not directly or indirectly independent of the known evidence interest terms), and selecting a subset of those terms with the highest determined probabilities; etc.

After block 860, the routine continues to block 865 to determine one or more recommendations for the target user based at least in part on the selected additional target term(s), and in block 870 to provide indications of the determined recommendation(s) to the target user (e.g., directly, via one or more intermediate services, etc.). For example, the generated recommendations may in some embodiments include one or more domain documents, and if so the routine in block 860 may further retrieve information about various candidate documents (e.g., information about relevance of the various candidate documents to the selected target terms), and determine particular candidate documents to recommend based on those having the most relevance to the selected target term(s) (or to the combination of the selected target term(s) and the target user's known evidence terms of interest). In some embodiments, the recommendations may be generated in other manners and/or have other forms. For example, some or all of the candidate documents may be supplied as part of the request, and/or some or all of the candidate documents may be related to domains other than those to which the target user's known evidence terms of interest are known to correspond (e.g., if the target user's known evidence terms of interest are known to correspond to one or more first domains of interest, to identify additional target terms that are determined to be related to the known evidence terms of interest for one or more other second domains, such as to enable recommendations in second domain(s) for which no information is available about the target user's interests and/or about any users' interests). In addition, in at least some embodiments, the selected additional target term(s) may be determined to be used as some or all of the provided recommendations, such as to be provided to the target user for possible selection or other identification of those terms as being of actual interest to the target user or otherwise being relevant for a current activity of the target user. Furthermore, in other embodiments, the selected additional target term(s) and/or the determined recommendation(s) for the target user may be used in other manners, whether instead of or in addition to providing them to the target user and/or using them to generate recommendations, such as to store the selected additional target term(s) as likely or actual interests of the target user for later use, proactively push the determined recommendation(s) to the target user even if the target user has not requested recommendations, identify advertisements or other third-party information that may be of interest to the target user based on the selected additional target term(s), etc.

If it is instead determined in block 845 that user-specific recommendations are not to be determined and provided, the routine continues instead to block 875 to determine whether the relevance of one or more indicated target terms are to be determined for a particular user in a user-specific manner (e.g., based on an explicit request, based on the receipt of specified term-related preferences for a user and/or target term(s) of interest, etc.), and if so continues to block 877. Such a request may be initiated in various manners, such as from a third-party service that interacts with the DSRD service to determine if a particular user is likely to have interest in one or more particular target terms for which the third-party service has related content, by the DSRD service or another service to determine if a particular user is likely to have interest in an advertisement related to one or more target terms, etc. In block 877, the routine obtains information about one or more target terms of interest for which a particular user's likely preference for or other interest in is to be determined, and in block 879 obtains information about the particular user's preferences for or other interest in one or more particular terms for one or more domain(s). The information in blocks 877 and/or 879 may be obtained in various manners in various embodiments, such as by being received in block 805, being retrieved from stored preference information for a particular identified user, determined by dynamically interacting with a particular identified user (whether directly or via an intermediate service), etc. Furthermore, in some embodiments and situations, the particular user may be identified, while in other embodiments the received request may indicate the term preferences of the particular user but without identifying the particular user (e.g., for a particular user that is known by the requester but not identified in the request, such as if the requester instead supplies preference information for that unidentified user; for an anonymous user for whom preference information is available, and optionally with information about the requester indicating likely preferences of the anonymous user or other contextual information related to possible preferences of the anonymous user; for a hypothetical user with hypothetical term preferences; etc.). In addition, in some embodiments the user for whom the relevance of the target term(s) is determined refers to a single person, while in other embodiments the user may have other forms (e.g., a non-human entity, such as a business or organization; a collection or group of multiple people, such as a club or other aggregation of people with at least some common preferences or otherwise aggregated preferences; etc.). In block 881, the routine then retrieves the stored probabilistic representation information corresponding to the relevant domain(s), such as one or more of the decision trees previously generated and stored with respect to blocks 830 and 835, or instead a single or multiple entire Bayesian networks that were previously generated and stored with respect to blocks 830 and 835. In other embodiments, the routine may instead dynamically initiate the execution of some or all of blocks 815-835 to obtain desired inter-term relationship probabilistic information.

After block 881, the routine continues to block 883 to determine if the retrieved probabilistic representation information shows a relationship between the user's term preferences and the target term(s), such as one or more paths of a Bayesian network that connect one or more of the term preferences to the target term(s). If it is determined in block 885 that the retrieved probabilistic representation information does not show such a relationship, the routine continues to block 889 to provide an indication to the requester of a lack of relevance information to determine the likely preference of the particular user for the target term(s) given the user's current term preferences. Otherwise, the routine continues to block 886 to optionally generate or select a subset of the probabilistic representation information that corresponds to the relationship between the user's term preferences and the target term(s), such as a sub-graph of the Bayesian network that includes the one or more paths from the term preferences to the target term(s), and/or one or more decision trees that correspond to the influences between the term preferences and the target term(s). In other embodiments, the existing Bayesian network and/or decision trees may be used without generating any new data structure specific to the particular user.

After block 886, the routine continues to block 887 to determine the probability or other likelihood that the particular user has a preference for or other interest in the target term(s), such as for each target term individually and/or for a combination of multiple target terms, based on the optionally generated probabilistic representation information subset or other previously generated probabilistic representation information. In block 888, the routine then provides an indication to the requester of the determined likelihood for the target term(s).

If it is instead determined in block 875 that a user-specific relevance of one or more indicated target terms for a particular user are not to be determined and provided, the routine continues instead to block 890 to perform one or more other indicated operations as appropriate. For example, in some embodiments, the routine may receive updates related to previously generated probabilistic representation information (e.g., updates to underlying inter-term relevance information, updates from user feedback or other learning related to inter-term relevance, etc.), and if so may optionally modify the previously generated probabilistic representation information to reflect the updates and/or may initiate the generation of new probabilistic representation information to reflect the updates. In addition, in some embodiments, the routine may receive and respond to requests to supply previously generated probabilistic representation information, periodically initiate the generation of new probabilistic representation information based on whatever underlying inter-term relevance information is currently available (e.g., in embodiments in which the domain documents and other content items may change, in which the determined inter-term relevance information may change based on user feedback, etc.), perform various periodic housekeeping operations, etc.

After blocks 835, 870 or 890, the routine continues to block 895 to determine whether to continue, such as until an explicit indication to terminate is received. If it is determined to continue, the routine returns to block 805, and if not continues to block 899 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method for providing information based on automatically determined relationships, the method comprising:
   under control of one or more computing systems configured to provide recommendation information based on automatically determined relationships between terms,
   receiving one or more indications of a group of multiple content items whose contents are representative of a subject area of interest, the contents including a plurality of terms;
   automatically analyzing the multiple content items of the group to identify relationships between at least some of the plurality of terms, a first of the identified relationships indicating an assessed degree of relevance of one or more first terms of the plurality of terms to one or more other second terms of the plurality of terms;
   obtaining information about one or more indicated terms that are specified by a first user as search terms for a search to be performed, the indicated terms including at least one of the first terms but not including any of the second terms;
   for each of one or more of the second terms, automatically determining a likelihood that the second term is of interest to the first user based at least in part on the at least one first term included in the indicated terms and on the assessed degree of relevance of the one or more first terms to the one or more second terms;
   generating search results for the search, including identifying one or more search results using at least one second term of the one or more second terms that is selected based on one or more determined criteria for assessing the determined likelihoods; and
   providing the generated search results for display to the first user.

2. The method of claim 1 wherein the generated search results include one or more of the multiple content items of the group.

3. The method of claim 1 wherein the generated search results include one or more content items that are related to the subject area of interest but are not part of the group of content items.

4. The method of claim 1 wherein the one or more search results include the at least one second term, and wherein the providing of the generated search results includes providing the at least one second term for selection by the first user as being a preference of the first user.

5. The method of claim 1 wherein the one or more search results include the at least one second term, and wherein the providing of the generated search results includes providing the at least one second term for selection by the first user as being part of a common multi-term theme with the one or more indicated terms for the subject area of interest.

6. The method of claim 1 wherein the automatic determining of the likelihood that the one or more second terms are of interest to the first user is based on the assessed degree of relevance of the one or more first terms to the one or more second terms from the automatic analyzing of the multiple content items and is performed without using any information about any actual preferences of any users related to the one or more second terms.

7. The method of claim 1 further comprising:
automatically analyzing a plurality of content items of a second group to identify one or more additional inter-term relationships related to a second subject area of interest to which the plurality of content items of the second group relate, the second subject area of interest being distinct from the subject area of interest and the plurality of content items of the second group being distinct from the multiple content items of the group, the identified additional relationships including a second relationship between the one or more first terms and one or more other third terms that are not part of the plurality of terms; and
providing an indication of at least one of the third terms that is selected to enable one or more recommendations to be provided to the first user based on the at least one third term, the at least one third terms being selected without using any information about any actual preferences of any users related to the one or more third terms.

8. The method of claim 1 further comprising automatically analyzing a plurality of content items of a second group related to a second subject area of interest to identify one or more of the plurality of content items that are related to the at least one second term, and including the identified one or more content items related to the at least one second term as part of the generated search results.

9. The method of claim 1 wherein the at least one second terms are selected to represent unexpressed preferences of the first user.

10. The method of claim 1 wherein the one or more determined criteria are based on a defined threshold for the determined likelihoods of the one or more second terms such that the selected at least one second term has a determined likelihood above the defined threshold.

11. The method of claim 1 wherein the content items of the group include at least one of textual documents whose text contains at least some of the plurality of terms, audio information, image information, video information, biological information, alphanumeric data structures, symbolic data structures, or mathematical data structures, and wherein the one or more configured computing systems are part of a relevance determination system that performs the providing of the recommendation information based on the automatically determined relationships between terms.

12. A non-transitory computer-readable medium having stored contents that cause a computing system of a relevance determination system to provide information based on automatically determined relationships, by performing a method comprising:
under control of the computing system,
automatically analyzing contents of multiple related content items in order to identify relationships between at least some of a plurality of terms included in the contents, a first of the identified relationships indicating an assessed relevance of a first term of the plurality of terms to one or more other second terms of the plurality of terms;
obtaining information about one or more indicated terms of interest to a first user, the indicated terms including the first term but not including any of the second terms;
automatically determining a likelihood that one of the second terms is of interest to the first user based at least in part on the assessed relevance of the first term to the one or more second terms;
generating search results based on the one or more indicated terms of interest, including identifying one or more search results using the one second term based at least in part on the determined likelihood; and
providing the generated search results for display to the first user.

13. A computing system configured to provide information based on automatically determined relationships, comprising:
one or more hardware processors; and
a relevance determination system that, when executed by at least one hardware processor of the one or more hardware processors, causes the at least one hardware processor to provide information based on automatically determined relationships by:
automatically analyzing multiple content items related to a subject area of interest in order to identify inter-term relationships between a plurality of terms related to the multiple content items, each of the inter-term relationships indicating an assessed relevance of at least one first term of the plurality of terms to at least one other second term of the plurality of terms;
automatically generating a probabilistic representation of selected inter-term relationships based at least in part on the assessed relevances for the selected inter-term relationships, the probabilistic representation including information related to a determined likelihood of a relationship between the at least one first term and the at least one second term for each of the selected inter-term relationships;
generating search results based on one or more indicated terms that include the at least one first term for one of the selected inter-term relationships but do not include the at least one second term for the one selected inter-term relationship, including identifying, based at least in part on the determined likelihood for the one selected inter-term relationship, one or more search results using the at least one second term for the one selected inter-term relationship; and
providing the generated search results for display to one or more users.

* * * * *